US012706070B2

(12) United States Patent
Shao et al.

(10) Patent No.: US 12,706,070 B2
(45) Date of Patent: Aug. 11, 2026

(54) IMAGE PROCESSING METHOD AND ELECTRONIC DEVICE

(71) Applicant: HONOR DEVICE CO., LTD., Shenzhen (CN)

(72) Inventors: Tao Shao, Shenzhen (CN); Liyou Wu, Shenzhen (CN); Guoqiao Chen, Shenzhen (CN); Yue Ding, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 19/297,095

(22) Filed: Aug. 12, 2025

(65) Prior Publication Data

US 2025/0363965 A1 Nov. 27, 2025

Related U.S. Application Data

(63) Continuation of application No. PCT/CN2023/133535, filed on Nov. 23, 2023.

(30) Foreign Application Priority Data

Feb. 27, 2023 (CN) ......................... 202310209578.7

(51) Int. Cl.
*G09G 5/10* (2006.01)

(52) U.S. Cl.
CPC ....... *G09G 5/10* (2013.01); *G09G 2320/0242* (2013.01); *G09G 2320/029* (2013.01);
(Continued)

(58) Field of Classification Search
CPC ............ G09G 5/10; G09G 2320/0242; G09G 2320/029; G09G 2320/0626;
(Continued)

(56) References Cited

U.S. PATENT DOCUMENTS 10,089,960 B2 10/2018 Greenebaum et al.
10,916,000 B2 2/2021 Van Der Vleuten et al.
(Continued)

FOREIGN PATENT DOCUMENTS

CN 103843058 A 6/2014
CN 107690811 A 2/2018
(Continued)

*Primary Examiner* — Temesghen Ghebretinsae
*Assistant Examiner* — Ivelisse Martinez Quiles

(57) ABSTRACT

This application relates to image processing and provides a method and electronic device. The method includes: capturing a to-be-displayed image; detecting a display operation on the image; obtaining brightness channel data in response; acquiring a pixel brightness value based on the channel data; determining a target brightness value based on a current screen brightness and a first brightness value; selecting a first or second gain coefficient according to the pixel brightness value to process the pixel and generate a processed image; and adjusting the display screen to the target brightness value to display the processed image. This solution avoids image brightness distortion and expands the dynamic range, making the displayed image more vivid and closer to actual scenarios.

20 Claims, 72 Drawing Sheets

(52) U.S. Cl.
CPC ............... *G09G 2320/0626* (2013.01); *G09G 2320/0666* (2013.01); *G09G 2320/0673* (2013.01); *G09G 2340/06* (2013.01)

(58) Field of Classification Search
CPC ... G09G 2320/0666; G09G 2320/0673; G09G 2340/06; G09G 2320/0271; G09G 2320/066; G09G 2354/00; G09G 2360/16; G09G 2320/0646; H04N 23/71; H04N 23/76; G06T 7/90
See application file for complete search history.

(56) References Cited

U.S. PATENT DOCUMENTS

| | | | | |
|---|---|---|---|---|
| 11,375,128 | B2 | 6/2022 | Liu | |
| 11,715,184 | B2 | 8/2023 | Johnson et al. | |
| 2014/0210847 | A1* | 7/2014 | Knibbeler | G06T 5/50 345/589 |
| 2016/0255360 | A1 | 9/2016 | Hattori et al. | |
| 2017/0302858 | A1* | 10/2017 | Porter | H04N 23/72 |
| 2019/0347777 | A1 | 11/2019 | Meng et al. | |
| 2023/0154396 | A1* | 5/2023 | Zhang | G09G 5/10 345/690 |
| 2024/0312385 | A1* | 9/2024 | Li | G09G 3/34 |
| 2025/0022111 | A1 | 1/2025 | Lei et al. | |

FOREIGN PATENT DOCUMENTS

| | | | |
|---|---|---|---|
| CN | 108200441 | A | 6/2018 |
| CN | 108629738 | A | 10/2018 |
| CN | 109391855 | A | 2/2019 |
| CN | 112164007 | A | 1/2021 |
| CN | 113554973 | A | 10/2021 |
| CN | 114092360 | A | 2/2022 |
| CN | 114219723 | A | 3/2022 |
| CN | 114257750 | A | 3/2022 |
| CN | 115239578 | A | 10/2022 |
| CN | 114897745 | B | 12/2022 |
| CN | 115496668 | A | 12/2022 |
| CN | 115691396 | A | 2/2023 |
| KR | 102243928 | B1 | 4/2021 |
| WO | 2019085705 | A1 | 5/2019 |
| WO | 2021143248 | A1 | 7/2021 |

* cited by examiner

IMAGE PROCESSING METHOD AND ELECTRONIC DEVICE

CROSS-REFERENCE TO RELATED APPLICATIONS

This application is a continuation of International Application No. PCT/CN2023/133535, filed on Nov. 23, 2023, which claims priority to Chinese Patent Application No. 202310209578.7, filed on Feb. 27, 2023, both of which are incorporated herein by reference in their entireties.

TECHNICAL FIELD

This application relates to the field of images, and in particular, to an image processing method and an electronic device.

BACKGROUND

As technologies of display screens in electronic devices develop, a dynamic range of image display can be expanded by increasing brightness values of the display screens at present. For example, assuming that the brightness value of the display screen is increased from 200 nits to 1000 nits, the dynamic range of image display increases 5 fold. However, when brightness of the display screen is increased, because brightness of a pixel in a displayed image is increased, the brightness of all the pixels in the image is increased by a same multiple, which is inconsistent with brightness of an actual photographing scenario. As a result, the image displayed on the display screen is distorted to some extent. In addition, when the brightness of the display screen is increased, the brightness of the pixel in the displayed image is increased. As a result, the image displayed on the display screen is excessively bright, and users viewing the image are prone to visual fatigue.

Therefore, when image brightness distortion is avoided, how to expand the dynamic range of the image becomes an urgent problem to be resolved.

SUMMARY

This application provides an image processing method, so that when image brightness distortion is avoided, a dynamic range of a to-be-displayed image can be expanded, thereby enabling the to-be-displayed image to be more vivid and close to an actual photographing scenario.

According to a first aspect, an image processing method is provided. The image processing method is applied to an electronic device that includes a display screen, and includes:

- capturing a to-be-displayed image;
- detecting a display operation performed on the to-be-displayed image;
- obtaining brightness channel data of the to-be-displayed image in response to the display operation;
- obtaining a brightness value of a pixel in the to-be-displayed image based on the brightness channel data of the to-be-displayed image;
- determining a target brightness value based on a current brightness value of the display screen and a first brightness value, where the first brightness value indicates brightness that is supported by the display screen;
- selecting a first gain coefficient or a second gain coefficient based on the brightness value of the pixel in the to-be-displayed image to process the pixel in the to-be-displayed image, and generating a processed image, where the first gain coefficient is configured to adjust a pixel that is in the to-be-displayed image and whose brightness value is less than a first threshold, the second gain coefficient is configured to adjust a pixel that is in the to-be-displayed image and whose brightness value is greater than or equal to the first threshold, the first threshold is related to brightness of a photographing scenario in which the electronic device is located, the first gain coefficient is 1, the second gain coefficient is linearly directly proportional to the brightness value of the pixel in the to-be-displayed image, and the second gain coefficient is greater than 1; and adjusting the display screen to the target brightness value, and displaying the processed image.

In this embodiment of this application, when the display operation performed on the to-be-displayed image is detected, the brightness channel data of the to-be-displayed image may be obtained. The brightness value of the pixel in the to-be-displayed image is obtained based on the brightness channel data of the to-be-displayed image. In addition, the target brightness value is determined based on a current brightness value of the display screen and the first brightness value. The pixel that is in the to-be-displayed image and whose brightness value is less than the first threshold is adjusted based on the first gain coefficient (for example, 1), and the pixel that is in the to-be-displayed image and whose brightness value is greater than or equal to the first threshold is adjusted based on the second gain coefficient. Therefore, when the display screen of the electronic device displays the processed image at the target brightness value, a bright light zone in the to-be-displayed image may be brighter, and a dark light zone may remain unchanged. This increases light and shade contrast of the to-be-displayed image, and expands the dynamic range of the to-be-displayed image, thereby enabling a to-be-displayed image to be more vivid and close to an actual photographing scenario.

It should be understood that the second gain coefficient being linearly directly proportional to the brightness value of the pixel in the to-be-displayed image means that when the brightness value of the pixel in the to-be-displayed image is larger, a second gain coefficient corresponding to the pixel is larger. It may be understood that a pixel in a high light zone in the to-be-displayed image becomes brighter via the second gain coefficient.

With reference to the first aspect, in some implementations of the first aspect, if the to-be-displayed image is an image captured by the electronic device, the obtaining a brightness value of a pixel in the to-be-displayed image based on the brightness channel data of the to-be-displayed image includes:

- obtaining an inverse gamma curve of the to-be-displayed image;
- processing the brightness channel data of the to-be-displayed image based on the inverse gamma curve, to obtain processed brightness data; and
- processing the processed brightness data based on a second coefficient, to obtain the brightness value of the pixel in the to-be-displayed image, where the second coefficient is directly proportional to a dynamic range value of the to-be-displayed image.

In this embodiment of this application, if the to-be-displayed image is an image generated after brightness processing is performed by a camera module in the electronic device, the electronic device may not directly obtain brightness information of the to-be-displayed image. For example, the to-be-displayed image is an image that is captured by a camera application and on which beauty processing is performed. The electronic device may convert the to-be-displayed image into YUV color space, to obtain a YUV image; and may generate the brightness information of the to-be-displayed image based on an image of a Y channel in the YUV image. Therefore, the electronic device may obtain the brightness information of the to-be-displayed image, to implement the image processing method in this application. That is, when the to-be-displayed image is displayed, the bright light zone in the to-be-displayed image may be brighter, and the dark light zone may remain unchanged. This increases the light and shade contrast of the to-be-displayed image, and expands the dynamic range of the to-be-displayed image, thereby enabling a to-be-displayed image to be more vivid and close to an actual photographing scenario.

With reference to the first aspect, in some implementations of the first aspect, if the to-be-displayed image is an image downloaded or received by the electronic device, the obtaining a brightness value of a pixel in the to-be-displayed image based on the brightness channel data of the to-be-displayed image includes:

obtaining a first parameter based on color space in which the to-be-displayed image is located, where the first parameter is an index of a gamma curve;

obtaining an inverse gamma curve of the to-be-displayed image based on the first parameter;

processing the brightness channel data of the to-be-displayed image based on the inverse gamma curve, to obtain processed brightness data; and processing the processed brightness data based on a second coefficient, to obtain the brightness value of the pixel in the to-be-displayed image, where the second coefficient is directly proportional to a dynamic range value of the to-be-displayed image.

In this embodiment of this application, if the to-be-displayed image is the image downloaded or received by the electronic device from another device, the electronic device may not directly obtain the brightness information of the to-be-displayed image. The electronic device may convert the to-be-displayed image into YUV color space, to obtain a YUV image; and may generate the brightness information of the to-be-displayed image based on the image of the Y channel in the YUV image. Therefore, the electronic device may obtain the brightness information of the to-be-displayed image, to implement the image processing method in this application. That is, when the to-be-displayed image is displayed, the bright light zone in the to-be-displayed image may be brighter, and the dark light zone may remain unchanged. This increases light and shade contrast of the to-be-displayed image, and expands the dynamic range of the to-be-displayed image, thereby enabling a to-be-displayed image to be more vivid and close to an actual photographing With reference to the first aspect, in some implementations of the first aspect, the selecting a first gain coefficient or a second gain coefficient based on the brightness value of the pixel in the to-be-displayed image to process the pixel in the to-be-displayed image, and generating a processed image includes:

performing compression processing on a pixel value of the pixel in the to-be-displayed image based on a first coefficient, to obtain a second image, where the first coefficient is a ratio of the current brightness value to the target brightness value;

if the brightness value of the pixel in the to-be-displayed image is less than the first threshold, adjusting a pixel value of a pixel in the second image based on the first gain coefficient; or if the brightness value of the pixel in the to-be-displayed image is greater than or equal to the first threshold, adjusting a pixel value of a pixel in the second image based on the second gain coefficient; and generating the processed image.

In this embodiment of this application, to avoid an area of an overexposure zone in the to-be-displayed image from increasing when tone adjustment is directly performed on the to-be-displayed image, before tone mapping processing is performed on the to-be-displayed image, compression processing may be performed on the pixel value in the to-be-displayed image first, and then tone mapping processing is performed on the image on which compression processing is performed, thereby improving accuracy of the image on which tone mapping processing is performed, and enabling the image to be more vivid.

With reference to the first aspect, in some implementations of the first aspect, the method further includes:

determining a gain function based on the first threshold and the first brightness value, where the gain function is a directly proportional function; and determining the second gain coefficient based on the brightness value of the pixel in the to-be-displayed image and the gain function. With reference to the first aspect, in some implementations of the first aspect, the gain function is $G(x)=(K1-1)/(K2-V1)*(V-V1)+1$, where K1 represents a third gain value, and the third gain value is directly proportional to the dynamic range value of the to-be-displayed image; K2 represents a maximum value of a pixel value corresponding to a number of bits of the to-be-displayed image; V represents the brightness value of the pixel in the to-be-displayed image; and V1 represents the first threshold.

With reference to the first aspect, in some implementations of the first aspect, the selecting a first gain coefficient or a second gain coefficient based on the brightness value of the pixel in the to-be-displayed image to process the pixel in the to-be-displayed image, and generating a processed image includes:

if the brightness value of the pixel in the to-be-displayed image is less than the first threshold, adjusting the pixel value of the pixel in the to-be-displayed image based on the first gain coefficient; or if the brightness value of the pixel in the to-be-displayed image is greater than or equal to the first threshold, adjusting the pixel value of the pixel in the to-be-displayed image based on the second gain coefficient; and generating the processed image.

With reference to the first aspect, in some implementations of the first aspect, after the displaying the processed image, the method further includes:

if a first operation performed on the electronic device is detected, adjusting brightness of the display screen to the current brightness value, where the first operation is an operation to exit displaying of the to-be-displayed image.

With reference to the first aspect, in some implementations of the first aspect, after the displaying the processed image, the method further includes:

if detecting that the electronic device is in a screen-off state, or if detecting that the current brightness value is less than a second threshold, deleting the processed image.

With reference to the first aspect, in some implementations of the first aspect, the method further includes:

if detecting a second operation or a third operation performed on the display screen, generating the processed image, where the second operation is an unlocking operation performed on the electronic device, and the third operation is a screen-on operation performed on the display screen; and adjusting the display screen to the target brightness value, and displaying the processed image.

According to a second aspect, an electronic device is provided. The electronic device includes one or more processors and a memory. The memory is coupled to the one or more processors. The memory is configured to store computer program code, the computer program code includes computer instructions, and the one or more processors invoke the computer instructions to enable the electronic device to perform the following steps:

capturing a to-be-displayed image;

detecting a display operation performed on the to-be-displayed image;

obtaining brightness channel data of the to-be-displayed image in response to the display operation;

obtaining a brightness value of a pixel in the to-be-displayed image based on the brightness channel data of the to-be-displayed image;

determining a target brightness value based on a current brightness value of the display screen and a first brightness value, where the first brightness value indicates brightness that is supported by the display screen;

selecting a first gain coefficient or a second gain coefficient based on the brightness value of the pixel in the to-be-displayed image to process the pixel in the to-be-displayed image, and generating a processed image, where the first gain coefficient is configured to adjust a pixel that is in the to-be-displayed image and whose brightness value is less than a first threshold, the second gain coefficient is configured to adjust a pixel that is in the to-be-displayed image and whose brightness value is greater than or equal to the first threshold, the first threshold is related to brightness of a photographing scenario in which the electronic device is located, the first gain coefficient is 1, the second gain coefficient is linearly directly proportional to the brightness value of the pixel in the to-be-displayed image, and the second gain coefficient is greater than 1; and adjusting the display screen to the target brightness value, and displaying the processed image.

With reference to the second aspect, in some implementations of the second aspect, if the to-be-displayed image is an image obtained by the electronic device, the one or more processors invoke the computer instructions to enable the electronic device to perform the following steps:

obtaining an inverse gamma curve of the to-be-displayed image;

processing the brightness channel data of the to-be-displayed image based on the inverse gamma curve, to obtain processed brightness data; and processing the processed brightness data based on a second coefficient, to obtain the brightness value of the pixel in the to-be-displayed image, where the second coefficient is directly proportional to a dynamic range value of the to-be-displayed image.

With reference to the second aspect, in some implementations of the second aspect, if the to-be-displayed image is an image downloaded or received by the electronic device, the one or more processors invoke the computer instructions to enable the electronic device to perform the following steps:

obtaining a first parameter based on color space in which the to-be-displayed image is located, where the first parameter is an index of a gamma curve;

obtaining an inverse gamma curve of the to-be-displayed image based on the first parameter;

processing the brightness channel data of the to-be-displayed image based on the inverse gamma curve, to obtain processed brightness data; and processing the processed brightness data based on a second coefficient, to obtain the brightness value of the pixel in the to-be-displayed image, where the second coefficient is directly proportional to a dynamic range value of the to-be-displayed image.

With reference to the second aspect, in some implementations of the second aspect, the one or more processors invoke the computer instructions to enable the electronic device to perform the following steps:

performing compression processing on a pixel value of the pixel in the to-be-displayed image based on a first coefficient, to obtain a second image, where the first coefficient is a ratio of the current brightness value to the target brightness value;

if the brightness value of the pixel in the to-be-displayed image is less than the first threshold, adjusting the pixel value of the pixel in the second image based on the first gain coefficient; or if the brightness value of the pixel in the to-be-displayed image is greater than or equal to the first threshold, adjusting the pixel value of the pixel in the second image based on the second gain coefficient; and generating the processed image.

With reference to the second aspect, in some implementations of the second aspect, the one or more processors invoke the computer instructions to enable the electronic device to perform the following steps:

determining a gain function based on the first threshold and the first brightness value, where the gain function is a directly proportional function; and determining the second gain coefficient based on the brightness value of the pixel in the to-be-displayed image and the gain function.

With reference to the second aspect, in some implementations of the second aspect, the gain function is $G(x)=(K1-1)/(K2-V1)*(V-V1)+1$, where K1 represents a third gain value, and the third gain value is directly proportional to the dynamic range value of the to-be-displayed image; K2 represents a maximum value of a pixel value corresponding to a number of bits of the to-be-displayed image; V represents the brightness value of the pixel in the to-be-displayed image; and V1 represents the first threshold.

With reference to the second aspect, in some implementations of the second aspect, the one or more processors invoke the computer instructions to enable the electronic device to perform the following steps:

if the brightness value of the pixel in the to-be-displayed image is less than the first threshold, adjusting the pixel value of the pixel in the to-be-displayed image based on the first gain coefficient; or if the brightness value of the pixel in the to-be-displayed image is greater than or equal to the first threshold, adjusting the pixel value of the pixel in the to-be-displayed image based on the second gain coefficient; and generating the processed image.

With reference to the second aspect, in some implementations of the second aspect, after the displaying the processed image, the one or more processors invoke the computer instructions to enable the electronic device to perform the following steps:

if a first operation performed on the electronic device is detected, adjusting brightness of the display screen to the current brightness value, where the first operation is an operation to exit displaying of the to-be-displayed image.

With reference to the second aspect, in some implementations of the second aspect, after the displaying the processed image, the one or more processors invoke the computer instructions to enable the electronic device to perform the following steps:

if detecting that the electronic device is in a screen-off state, or if detecting that the current brightness value is less than a second threshold, deleting the processed image.

With reference to the second aspect, in some implementations of the second aspect, the one or more processors invoke the computer instructions to enable the electronic device to perform the following steps:

if detecting a second operation or a third operation performed on the display screen, generating the processed image, where the second operation is an unlocking operation performed on the electronic device, and the third operation is a screen-on operation performed on the display screen; and adjusting the display screen to the target brightness value, and displaying the processed image. According to a third aspect, an electronic device is provided, including modules/units configured to perform the image processing method according to any one of the first aspect or the implementations of the first aspect.

According to a fourth aspect, an electronic device is provided. The electronic device includes: one or more processors and a memory, where the memory is coupled to the one or more processors, and the memory is configured to store computer program code. The computer program code includes computer instructions, and the one or more processors invoke the computer instructions to enable the electronic device to perform the image processing method according to any one of the first aspect or the implementations of the first aspect.

According to a fifth aspect, a chip system is provided, where the chip system is used in an electronic device. The chip system includes one or more processors. The processors are configured to invoke computer instructions to enable the electronic device to perform the image processing method according to any one of the first aspect or the first aspect.

According to a sixth aspect, a computer-readable storage medium is provided, where the computer-readable storage medium has computer program code stored thereon, and when the computer program code is executed by an electronic device, the electronic device is enabled to perform the image processing method according to any one of the first aspect or the implementations of the first aspect.

According to a seventh aspect, a computer program product is provided, where the computer program product stores computer program code, and when the computer program code is executed by an electronic device, the electronic device is enabled to execute the image processing method according to the first aspect or the implementations of the first aspect.

In this embodiment of this application, when the display operation performed on the to-be-displayed image is detected, the brightness channel data of the to-be-displayed image may be obtained. The brightness value of the pixel in the to-be-displayed image is obtained based on the brightness channel data of the to-be-displayed image. In addition, the target brightness value is determined based on a current brightness value of the display screen and the first brightness value. The pixel that is in the to-be-displayed image and whose brightness value is less than the first threshold is adjusted based on the first gain coefficient (for example, 1), and the pixel that is in the to-be-displayed image and whose brightness value is greater than or equal to the first threshold is adjusted based on the second gain coefficient. Therefore, when the display screen of the electronic device displays the processed image at the target brightness value, a bright light zone in the to-be-displayed image may be brighter, and a dark light zone may remain unchanged. This increases light and shade contrast of the to-be-displayed image, and expands the dynamic range of the to-be-displayed image, thereby enabling a to-be-displayed image to be more vivid and close to an actual photographing scenario.

DESCRIPTION OF EMBODIMENTS

In embodiments of this application, the following terms such as "first" and "second" are merely used for description, and should not be understood as indicating or implying relative importance or implicitly indicating a quantity of technical features that are indicated. Therefore, features defining "first" and "second" may explicitly or implicitly include one or more such features. In the description of embodiments, unless otherwise specified, "a plurality of" means two or more.

For ease of understanding of embodiments of this application, first, a brief description of the related concepts involved in embodiments of this application is provided.

1. Dynamic Range (Dynamic Range, DR)

The dynamic range is for representing a ratio of a maximum value to a minimum value of a signal. For example, a DR value may be represented by a logarithm with a base number of 10. It should be understood that, that the DR value is reflected in an image may be understood as that there is a high light zone and a dark light zone in the image, and a ratio of a brightness value of the high light zone to a brightness value of the dark light zone.

Figure 1:
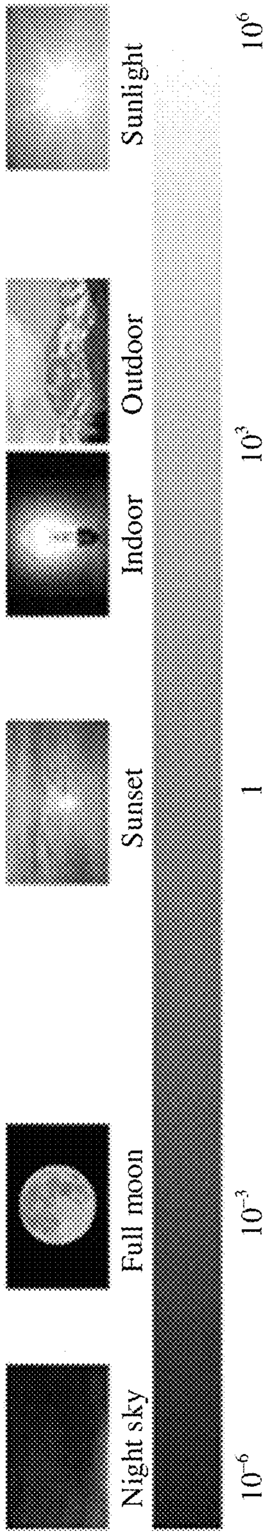
FIG. 1 is a schematic diagram of brightness of different photographing scenarios.

For example, a dynamic range of brightness of a photographing scenario is usually high. For example, brightness of starlight in a night sky is $10^{-6}$ nit, brightness of the night sky with a full moon is $10^{-3}$ nit, brightness of a sky at sunset is 1 nit, indoor brightness is usually less than $10^{3}$ nit, outdoor brightness in the daytime is usually more than $10^{3}$ nit, and brightness of sunlight at midday is $10^{6}$ nit, as shown in FIG. 1.

2. High Dynamic Range (High Dynamic Range, HDR)

A high dynamic range indicates that a ratio (that is, a dynamic range) of a maximum value to a minimum value of a signal is greater than or equal to a preset first threshold. The HDR being reflected in an image may be understood that there is a high light zone and a dark light zone in the image, and a ratio of a brightness value of the high light zone to a brightness value of the dark light zone exceeds the first threshold. The image may also be referred to as an HDR image.

3. Standard Dynamic Range (Standard Dynamic Range, SDR)

The standard dynamic range indicates that a ratio (namely, a dynamic range) of a maximum value to a minimum value of a signal is less than a preset first threshold and greater than or equal to a preset second threshold (the second threshold is less than the first threshold). That the SDR is reflected in an image may be understood as that there is a high light zone and a dark light zone, and a ratio of a brightness value of the high light zone to a brightness value of the dark light zone is less than the preset first threshold and greater than or equal to the preset second threshold. The image may also be referred to as an SDR image.

4. Standard Red Green Blue (standard Red Green Blue, sRGB)

The sRGB represents standard red, green, and blue, that is namely, three basic pigments used for color reproduction in a display, a panel, a projector, a printer, or another device. Color space of the sRGB is based on independent color coordinates. Therefore, colors may correspond to a same color coordinate system while being used in different devices, but are not affected by different color coordinates of the devices.

5. Gamma (Gamma) Processing

Gamma processing is for adjusting brightness, contrast, a dynamic range, and the like of an image by adjusting a gamma curve.

As technologies of display screens in electronic devices develop, a dynamic range of image display can be expanded by increasing a brightness of the display screen at present. For example, assuming that a brightness value of the display screen is increased from 200 nits to 1000 nits, the dynamic range of image display increases 5 fold. However, when the brightness of the display screen is increased, because brightness of pixels in the image is increased, the brightness of all the pixels in the image is increased by a same multiple, which is inconsistent with brightness of an actual photographing scenario. As a result, the displayed image is distorted to some extent.

Figure 2A:
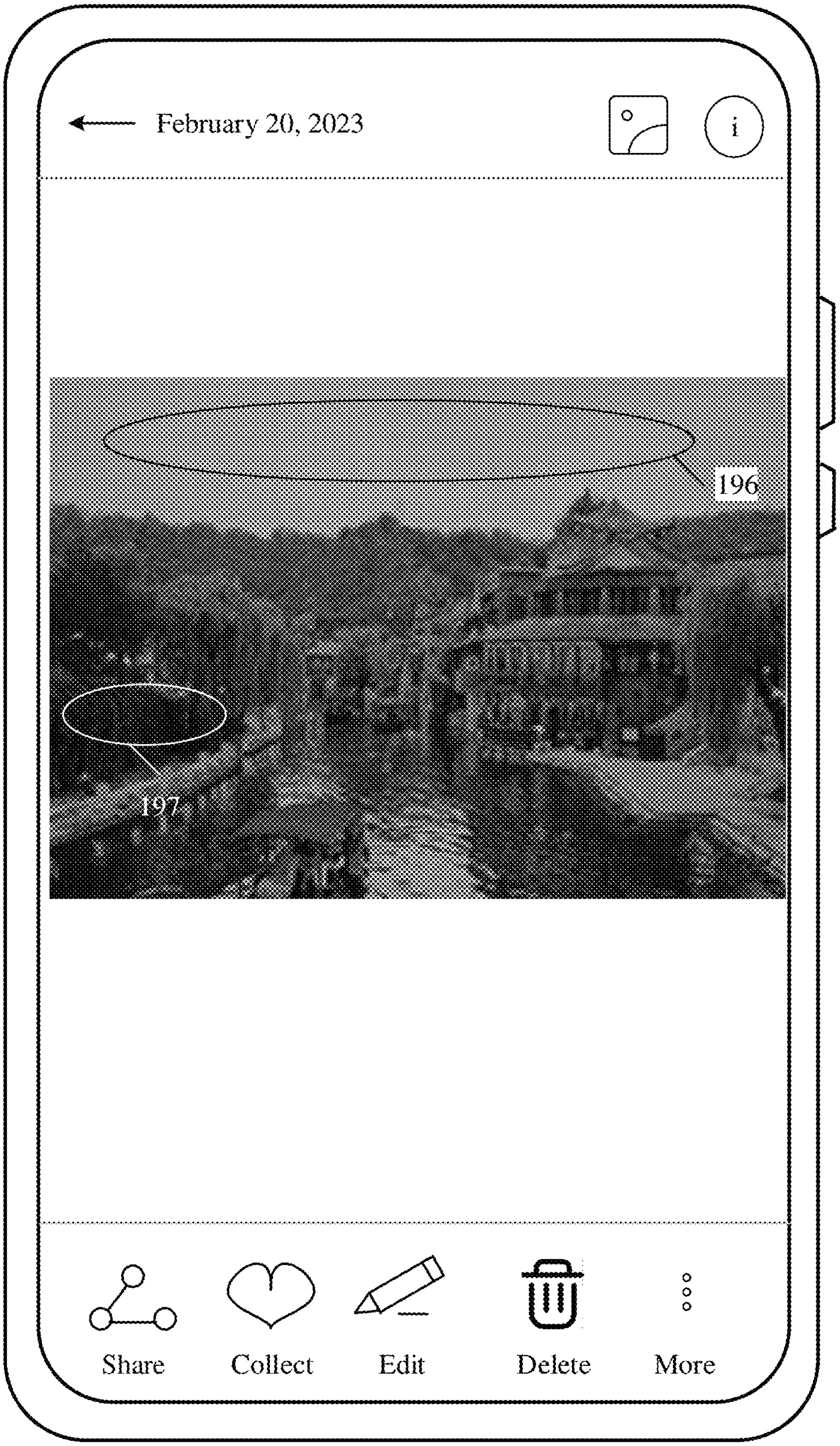
FIG. 2A and FIG. 2B are a schematic diagram for expanding a dynamic range of an image by increasing brightness of a display screen.
Figure 2B:
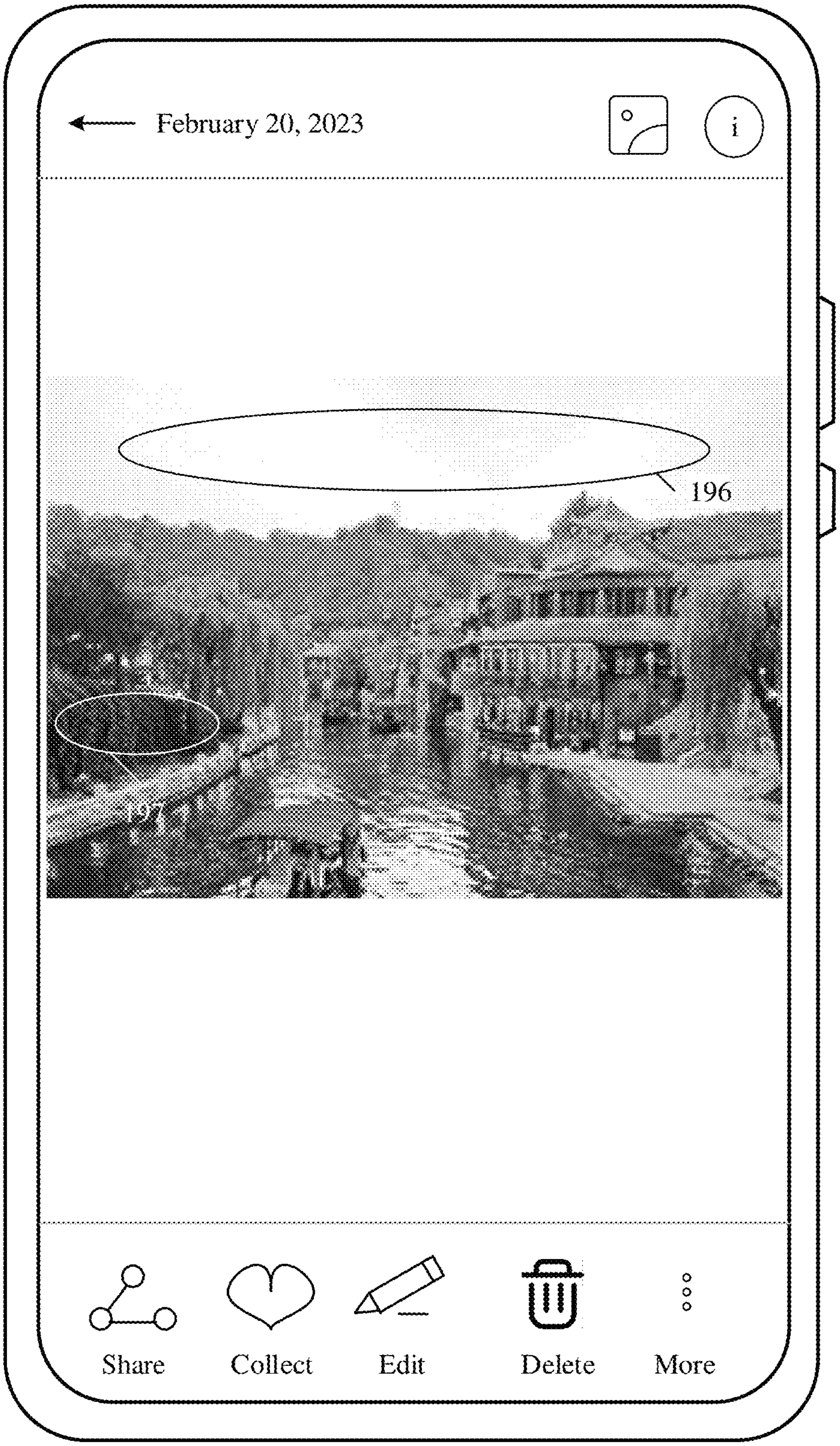

For example, a display interface as shown in FIG. 2A is a display interface before the brightness value of the display screen is increased; and a display interface as shown in FIG. 2B is a display interface after the brightness value of the display screen is increased. It may be learned from the images as shown in FIG. 2A and FIG. 2B that both brightness of an image zone 196 (for example, a bright light zone) and brightness of an image zone 197 (for example, a dark light zone) are increased. However, in the actual photographing scenario, the image zone 197 is the dark light zone. Therefore, when the brightness of the display screen is increased at present, the brightness of the pixels in the image is increased. As a result, the displayed image is distorted to some extent. In addition, because when the brightness of the display screen is increased, the brightness of the pixel in the displayed image is increased. As a result, the image displayed on the display screen is excessively bright, and users viewing the image are prone to visual fatigue.

In view of this, embodiments of this application provide an image processing method and an electronic device. In this embodiment of this application, when a display operation performed on a to-be-displayed image is detected, brightness channel data of the to-be-displayed image may be obtained. A brightness value of a pixel in the to-be-displayed image is obtained based on the brightness channel data of the to-be-displayed image. In addition, a target brightness value is determined based on a current brightness value of the display screen and a first brightness value. A pixel that is in the to-be-displayed image and whose brightness value is less than a first threshold is adjusted based on a first gain coefficient (for example, 1), and a pixel that is in the to-be-displayed image and whose brightness value is greater than or equal to the first threshold is adjusted based on a second gain coefficient. Therefore, when the display screen of the electronic device displays a processed image at the target brightness value, a bright light zone in the to-be-displayed image may be brighter, and a dark light zone may remain unchanged. This increases light and shade contrast of the to-be-displayed image, and expands a dynamic range of the to-be-displayed image, thereby enabling the to-be-displayed image to be more vivid and close to an actual photographing scenario.

Optionally, the image processing method provided in embodiments of this application may be applied to a scenario in which the image is displayed, for example, may be an image captured by the electronic device is displayed, a scenario in which an image downloaded by the electronic device is displayed, or a scenario in which an image received by the electronic device from another device is displayed. For the scenario in which the image captured by the electronic device is displayed, a photographing mode used by a camera application is not limited. For example, the photographing mode may include, but is not limited to: a night mode, a photo mode, a portrait mode, an aperture mode, a professional mode, and the like.

For example, scenarios to which embodiments of this application are applicable are described by using examples.

Scenario 1

For example, the to-be-displayed image in the electronic device is a standard dynamic range image. The to-be-displayed image is processed using the image processing method provided in embodiments of this application based on the first gain coefficient or the second gain coefficient, to obtain the processed image. The processed image is a high dynamic range image. The processed image is displayed after brightness of the display screen of the electronic device is adjusted to the target brightness value.

Scenario 2

For example, the to-be-displayed image in the electronic device is a standard dynamic range image. After the brightness of the display screen of the electronic device is adjusted to the target brightness value, the processed image is displayed using the image processing method provided in embodiments of this application. The image displayed on the display screen is a high dynamic range image.

Scenario 3

For example, the to-be-displayed image in the electronic device is a high dynamic range image. After the brightness of the display screen of the electronic device is adjusted to the target brightness value, the processed image is displayed using the image processing method provided in embodiments of this application. The image displayed on the display screen is a high dynamic range image.

It should be understood that the foregoing describes the application scenarios of embodiments of this application by using examples. This is not limited in this application.

The following describes the image processing method and the electronic device provided in embodiments of this application with reference to the accompanying drawings.

Figure 3:
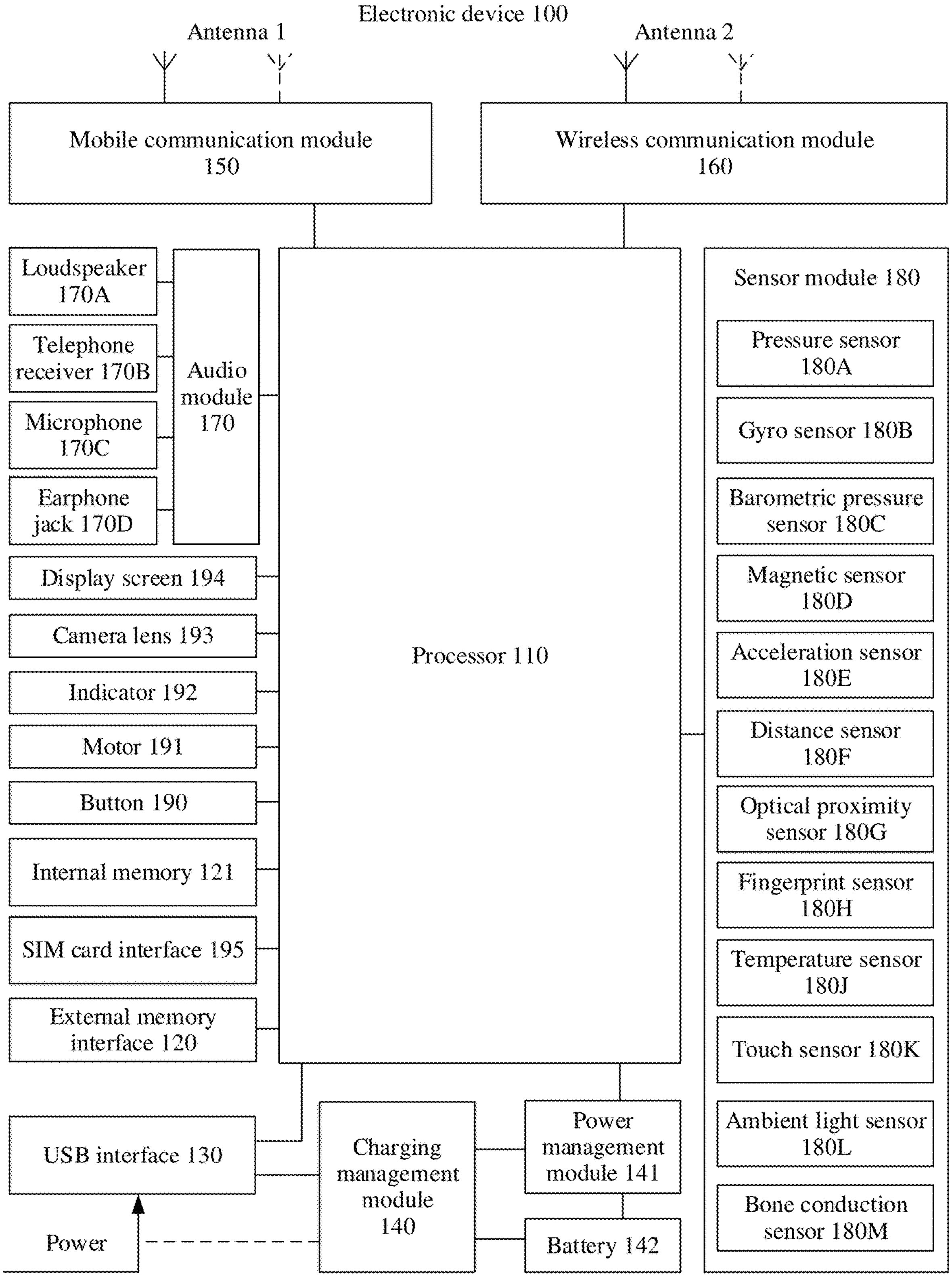
FIG. 3 is a schematic diagram of a hardware system of an electronic device to which this application is applicable.

FIG. 3 shows a hardware system of an electronic device applicable to this application.

For example, an electronic device 100 may be a mobile phone, a smart screen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

For example, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a telephone receiver 170B, a microphone 170C, an earphone jack 170D, a sensor module 180, a button 190, a motor 191, an indicator 192, a camera lens 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that a structure as shown in FIG. 3 does not constitute a specific limitation on the electronic device 100. In some other embodiments of this application, the electronic device 100 may include more or fewer components than the components as shown in FIG. 3, or the electronic device 100 may include a combination of some components in the components as shown in FIG. 3, or the electronic device 100 may include subcomponents of some components in the components as shown in FIG. 3. The components as shown in FIG. 3 may be implemented by using hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video encoder and decoder, a digital signal processor (digital signal processor, DSP), a baseband processor, and a neural-network processing unit (neural-network processing unit, NPU). Different processing units may be independent components, or may be integrated components. The controller may generate an operation control signal based on instruction operation code and a timing signal, to complete control of fetching an instruction and executing the instruction.

A memory may be further disposed in the processor 110, and is configured to store an instruction and data. In some embodiments, the memory in the processor 110 is a cache memory. The memory may store an instruction or data that has been used or cyclically used by the processor 110. If the processor 110 needs to use the instruction or the data again, the processor 110 may directly invoke the instruction or the data from the memory. This avoids repeated access, reduces waiting time of the processor 110, and improves system efficiency.

In some embodiments, the processor 110 may include one or more interfaces. For example, the processor 110 may include at least one of the following interfaces: an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, and a USB interface.

For example, in embodiments of this application, the processor 110 may be used to perform the image processing method provided in embodiments of this application, for example, capture a to-be-displayed image; detect a display operation performed on the to-be-displayed image; obtain brightness channel data of the to-be-displayed image in response to the display operation; obtain a brightness value of a pixel in the to-be-displayed image based on the brightness channel data of the to-be-displayed image; determine a target brightness value based on a current brightness value of the display screen and a first brightness value, where the first brightness value indicates brightness that is supported by the display screen; select a first gain coefficient or a second gain coefficient based on the brightness value of the pixel in the to-be-displayed image to process the pixel in the to-be-displayed image, and generating a processed image, where the first gain coefficient is configured to adjust a pixel that is in the to-be-displayed image and whose brightness value is less than a first threshold, the second gain coefficient is configured to adjust a pixel that is in the to-be-displayed image and whose brightness value is greater than or equal to the first threshold, the first threshold is related to brightness of a photographing scenario in which the electronic device is located, the first gain coefficient is 1, the second gain coefficient is linearly directly proportional to the brightness value of the pixel in the to-be-displayed image, and the second gain coefficient is greater than 1; and adjust the display screen to the target brightness value, and displaying the processed image.

A connection relationship between the modules as shown in FIG. 3 is merely an example for description and does not constitute a limitation on the connection relationship between the modules of the electronic device 100. Optionally, the modules of the electronic device 100 may alternatively use a combination of a plurality of connection manners in the foregoing embodiments.

A wireless communication function of the electronic device 100 may be implemented by using devices such as the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may also be multiplexed to improve a utilization rate of the antennas. For example, the antenna 1 may be multiplexed as a diversity antenna of a wireless local area network. In some other embodiments, the antenna may be used in combination with a tuning switch.

The electronic device 100 may implement a display function by using the GPU, the display screen 194, and the application processor. The GPU is a microprocessor for image processing and connects the display screen 194 to the application processor. The GPU is configured to perform mathematical and geometric calculations and graphics rendering. The processor 110 may include one or more GPUs, and the GPU executes program instructions to generate or change display information.

The display screen 194 may be configured to display an image or a video.

Optionally, the display screen 194 may be configured to display an image or a video. The display screen 194 includes a display panel. The display panel may be a liquid crystal display (liquid crystal display, LCD) screen, an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini light-emitting diode (mini light-emitting diode, Mini LED), a micro light-emitting diode (micro light-emitting diode, Micro LED), a micro OLED (Micro OLED), or a quantum dot light emitting diode (quantum dot light emitting diode, QLED). In some embodiments, the electronic device 100 may include 1 or N display screens 194, where N is a positive integer greater than 1.

For example, the electronic device 100 may implement a photographing function by using the ISP, the camera lens 193, the video encoder and decoder, the GPU, the display screen 194, the application processor, and the like.

For example, the ISP is configured to process data fed back by the camera lens 193. For example, during photographing, a shutter is enabled. Light is transferred to a camera photosensitive element by a camera lens, and an optical signal is converted into an electrical signal. The camera photosensitive element transfers the electrical signal to the ISP for processing, and therefore, the electrical signal is converted into an image visible to a naked eye. The ISP may perform algorithm optimization on noise, brightness, and a color of the image, and the ISP may further optimize parameters such as exposure and a color temperature of a photographing scenario. In some embodiments, the ISP may be provided in the camera lens 193.

For example, the camera lens 193 (also referred to as a lens) is configured to capture a still image or a video, and may be enabled through triggering by using an application instruction, to implement a photographing function, for example, capturing an image of any scenario through photographing. The camera lens may include parts such as an imaging lens, a light filter, and an image sensor. Light emitted or reflected by an object enters the imaging lens, passes through the light filter, and finally converges on the image sensor. The imaging lens is mainly configured to perform converging and imaging on light emitted or reflected by all objects (which may also be referred to as a to-be-photographed scenario or a target scenario, or may be understood as a scenario image expected to be photographed by the user) in a camera angle. The filter is mainly configured to filter out excess light waves (for example, light waves other than visible light, such as infrared) in light. The image sensor may be a charge coupled device (charge coupled device, CCD) or a complementary metal-oxide-semiconductor (complementary metal-oxide-semiconductor, CMOS) phototransistor. The image sensor is mainly configured to: perform photoelectric conversion on a received optical signal to convert the received optical signal into an electrical signal, and then transmit the electrical signal to the ISP to convert the electrical signal into a digital image signal. The ISP outputs the digital image signal to the DSP for processing. The DSP converts the digital image signal into an image signal in a standard format, for example, RGB or YUV.

For example, the digital signal processor may be configured to process a digital signal, and may process another digital signal in addition to the digital image signal. For example, when the electronic device 100 selects a frequency, the digital signal processor is configured to perform Fourier transform and the like on frequency energy.

For example, the video encoder and decoder is configured to compress or decompress a digital video. The electronic device 100 may support one or more types of video encoders and decoders. In this way, the electronic device 100 may play or record videos in a plurality of encoding formats, for example, moving picture experts group (moving picture experts group, MPEG) 1, MPEG2, MPEG3, and MPEG4.

For example, the gyro sensor 180B may be configured to determine a motion posture of the electronic device 100. In some embodiments, angular velocities of the electronic device 100 around three axes (that is, an x-axis, a y-axis, and a z-axis) may be determined by using the gyro sensor 180B. The gyro sensor 180B may be configured to image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 by performing reverse motion, to implement image stabilization. The gyro sensor 180B may be further used in scenarios such as navigation and a motion sensing game.

For example, the acceleration sensor 180E may detect acceleration of the electronic device 100 in all directions (generally in the x-axis, the y-axis, and the z-axis). When the electronic device 100 is static, a magnitude and direction of gravity may be detected. The acceleration sensor 180E may be further configured to identify an attitude of the electronic device 100 as an input parameter of an application such as switching between horizontal and vertical screens or a pedometer.

For example, the distance sensor 180F is configured to measure a distance. The electronic device 100 may measure a distance by infrared light or laser. In some embodiments, for example, in a photographing scenario, the electronic device 100 may measure a distance by using the distance sensor 180F, to implement quick focusing.

For example, the ambient light sensor 180L is configured to sense ambient light brightness. The electronic device 100 may adaptively adjust brightness of the display screen 194 based on the perceived ambient light brightness. The ambient light sensor 180L may be further configured to automatically adjust white balance during photographing. The ambient light sensor 180L may also cooperate with the optical proximity sensor 180G to detect whether the electronic device 100 is in a pocket, to prevent an accidental touch.

For example, the fingerprint sensor 180H is configured to collect a fingerprint. The electronic device 100 may use a feature of the obtained fingerprint to implement functions such as unlocking, accessing an application lock, photographing, and receiving a call.

For example, the touch sensor 180K is also referred to as a touch device. The touch sensor 180K may be disposed on the display screen 194. The touch sensor 180K and the display screen 194 form a touchscreen, and the touchscreen is also referred to as a touch control screen. The touch sensor 180K is configured to detect a touch operation performed on or near the touch sensor. The touch sensor 180K may transfer the detected touch operation to the application processor to determine a type of the touch event. A visual output related to the touch operation may be provided through the display screen 194. In some other embodiments, the touch sensor 180K may alternatively be disposed on a surface of the electronic device 100, at a position different from that of the display screen 194.

The hardware system of the electronic device 100 is described in detail above, and a software system of the electronic device 100 is described below.

Figure 4:
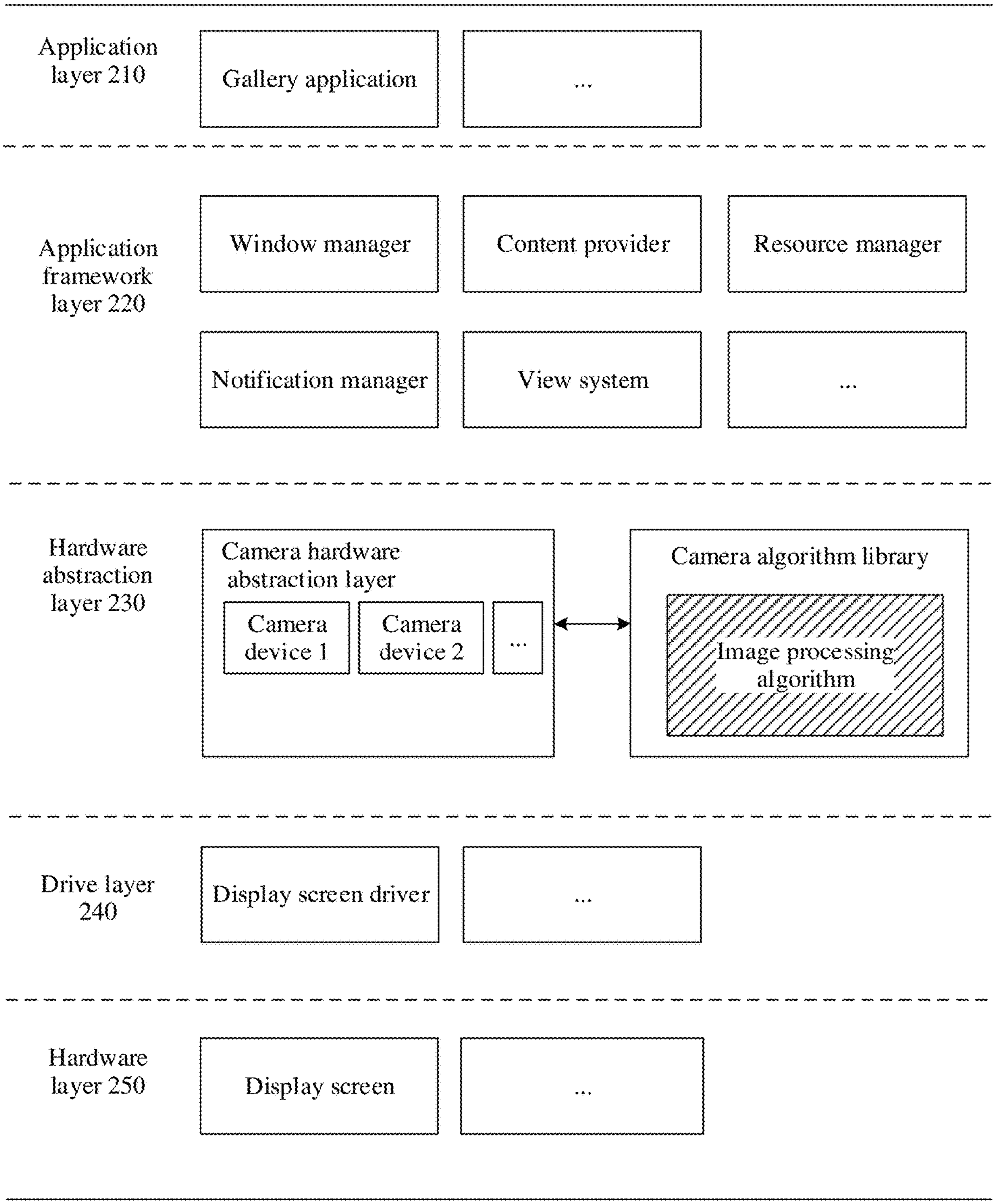
FIG. 4 is a schematic diagram of a software system of an electronic device to which this application is applicable.

FIG. 4 is a diagram of a software system of an electronic device according to an embodiment of this application.

As shown in FIG. 4, a system architecture may include an application layer 210, an application framework layer 220, a hardware abstraction layer 230, a drive layer 240, and a hardware layer 250.

The application layer 210 may include a gallery application.

For example, the application layer 210 may further include applications such as a Camera application, Calendar, Phone, Map, Navigation, WLAN, Bluetooth, Music, Videos, and Messages.

For example, the application framework layer 220 provides an application programming interface (application programming interface, API) and a programming framework for an application program at the application layer. The application framework layer may include some predefined functions.

For example, the application framework layer 220 includes a window manager, a content provider, a resource manager, a notification manager, a view system, and the like.

The window manager is used to manage a window program. The window manager may obtain a size of a display screen, determine whether there is a status bar, lock the screen, take a screenshot, and the like.

The content provider is configured to store and obtain data, and enable the data to be accessible to an application program. The data may include a video, an image, audio, calls made and answered, a browsing history and a bookmark, and a phone book.

The resource manager provides various resources for an application, such as a localized string, an icon, a picture, a layout file, and a video file.

The notification manager enables an application to display notification information in a status bar, and may be configured to convey a notification message that may automatically disappear after a short pause without requiring user interaction. For example, the notification manager is configured to provide a notification of download completion and a message notification. The notification manager may further manage a notification that appears in the status bar at a top of the system in a form of a graph or scroll bar text, for example, a notification of an application running in the background. The notification manager may further manage a notification that appears on the screen in a form of a dialog window. For example, text information is displayed in the status bar, a prompt tone is made, the electronic device vibrates, or an indicator light blinks.

The view system includes visual controls, such as a control for displaying a text and a control for displaying a picture. The view system may be configured to construct an application program. A display interface may include one or more views. For example, a display interface including a short message service message notification icon may include a view for displaying text and a view for displaying a picture.

For example, the hardware abstraction layer 230 is configured to abstract hardware. For example, the hardware abstraction layer may include a camera abstraction layer and another hardware device abstraction layer. The camera abstraction layer may include a camera device 1, a camera device 2, and the like. The camera hardware abstraction layer may be connected to a camera arithmetic library. The camera hardware abstraction layer may invoke an algorithm in the camera arithmetic library.

For example, the camera algorithm library may include an image processing algorithm, and when the image processing algorithm is run, the image processing method provided in this embodiment of this application is performed.

For example, the drive layer 240 is for providing drive for different hardware devices.

For example, the driver layer may include a display screen driver.

For example, the hardware layer 250 may include a display screen and another hardware device.

The following describes in detail the image processing method provided in embodiments of this application with reference to FIG. 5 to FIG. 8.

Figure 5:
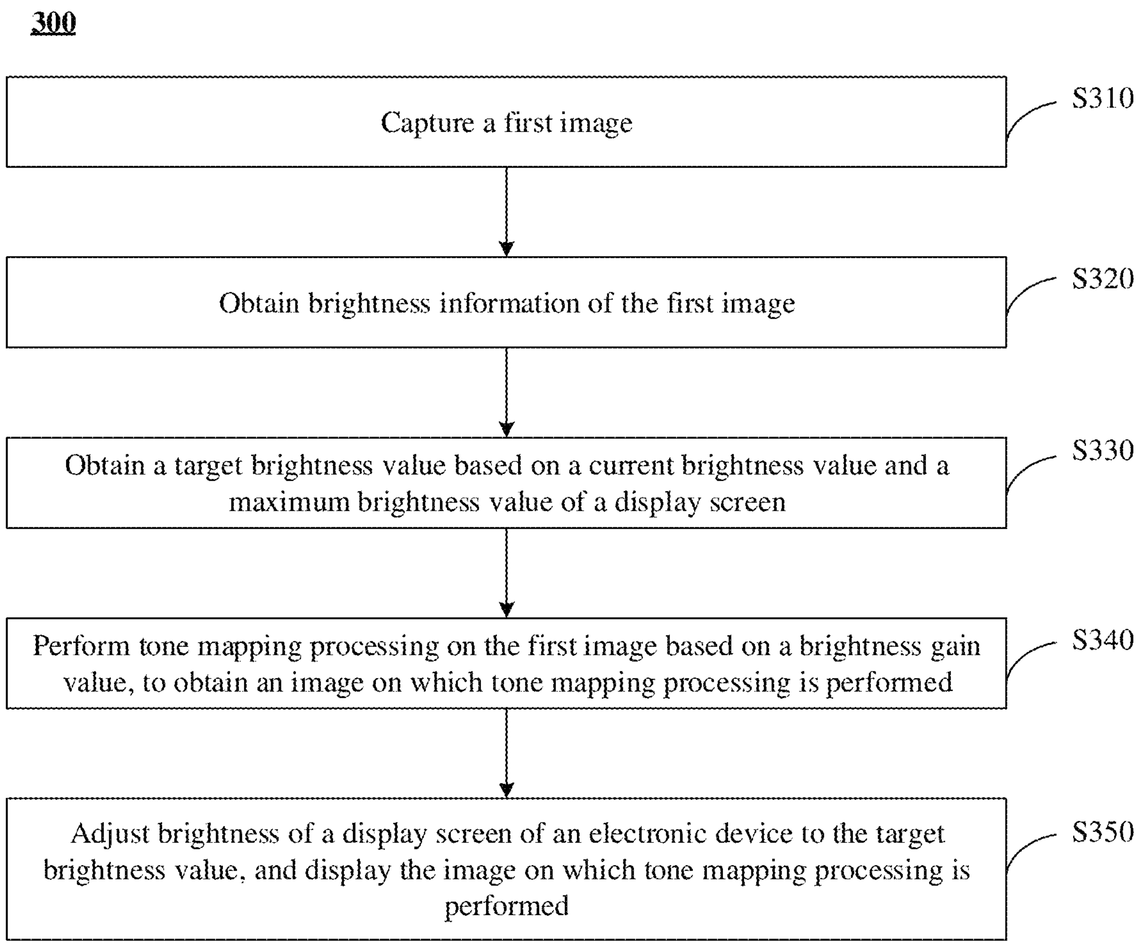
FIG. 5 is a schematic flowchart of an image processing method according to an embodiment of this application.

FIG. 5 is a schematic flowchart of an image processing method according to an embodiment of this application. The method 300 may be performed by the electronic device as shown in FIG. 1. The method 300 includes step S310 to step S360. The following separately describes step S310 to step S360 in detail.

S310: Capture a first image.

Optionally, an electronic device includes a camera module, and the first image may be an image captured by the camera module in the electronic device.

For example, the first image may be a standard dynamic range image. For example, the first image may be an image that is captured by an image sensor and that is generated based on a normally-exposed raw image.

For example, the electronic device may include a plurality of camera lenses. The plurality of camera lenses may separately obtain images, to obtain a plurality of frames of images. Fusing processing may be performed on the plurality of frames of images, to obtain the first image.

For example, the first image may be an image processed by the camera application. For example, the first image may be an image on which background blurring is performed by the camera application.

Optionally, the first image may be an image received by the electronic device from another device.

Optionally, the first image may be an image downloaded by the electronic device.

S320: obtain brightness information of the first image.

Optionally, the brightness information of the first image may be a grayscale image of the first image, for example, an image of a Y channel obtained based on data of the Y channel corresponding to the first image.

Optionally, a pixel value of each pixel in the first image may be obtained; and brightness information of the pixel is obtained through calculation based on the pixel value of each pixel.

For example, brightness information (for example, a brightness value L1) of the pixel may be obtained through calculation based on the pixel value (for example, R1, G1, and B1) of the pixel (for example, A1).

For example, the brightness value and the pixel value may satisfy an equation: $L=0.299R+0.587G+0.114B$, where L represents the brightness value. For example, if the pixel value of the pixel A1 is (R: 100, G: 100, and B: 100), it may be determined that the brightness value of the pixel A1 is $L1=0.299*100+0.587*100+0.114*100=100$.

Optionally, one pixel in the first image may correspond to one piece of brightness information.

For example, if a bit width of the brightness information is 8 bit, after the bit width is digitized, a range of the brightness value is between 0 and 255. It may be understood that one pixel may display 256 gray levels.

For example, if a bit width of the brightness information is 10 bit, after the bit width is digitized, a range of the brightness value is between 0 and 1023. It may be understood that one pixel may display 1,024 gray levels.

Optionally, a pixel matrix including n×m pixels in the first image may be classified as one group; and each group of pixels correspond to one piece of brightness information.

For example, if the pixel matrix including n×m pixels is classified as one group, brightness information of the group of pixels may be an average value of brightness values of all pixels in the group of pixels in the first image, or an average value of remaining brightness values after outliers of the brightness values of all the pixels are removed. This is not limited in this application.

In this embodiment of this application, the brightness information may be directly obtained based on the first image, and subsequently a brightness gain of the first image may be determined based on the brightness information and brightness of a display screen. Compared to an existing solution in which the brightness information is determined based on a short exposure image, the brightness gain is determined based on brightness information of the short exposure image, and brightness of a normal exposure image is adjusted based on the brightness gain, in this solution, the brightness information is determined based on the first image (for example, the normal exposure image), the brightness gain is determined based on the brightness information and the brightness of the display screen, and brightness of the first image is adjusted and processed based on the brightness gain. Therefore, pseudo-textures and the like in an image whose brightness is processed may be avoided. This improves image quality.

Figure 8:
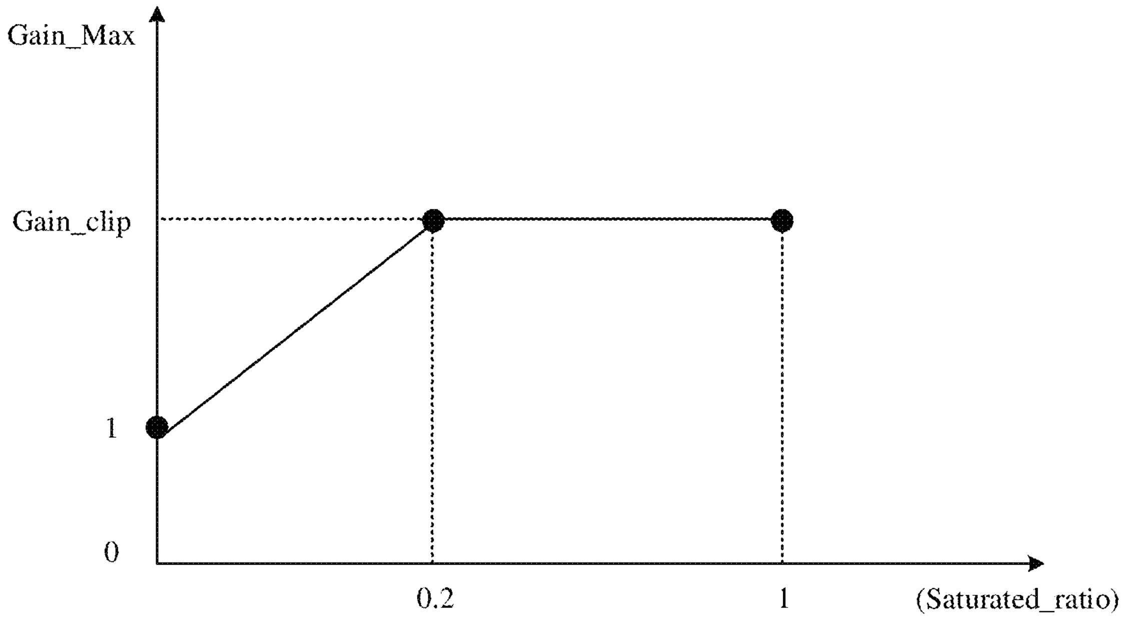
FIG. 8 is a schematic flowchart of a method for generating brightness information of an image according to an embodiment of this application.
Figure 9:
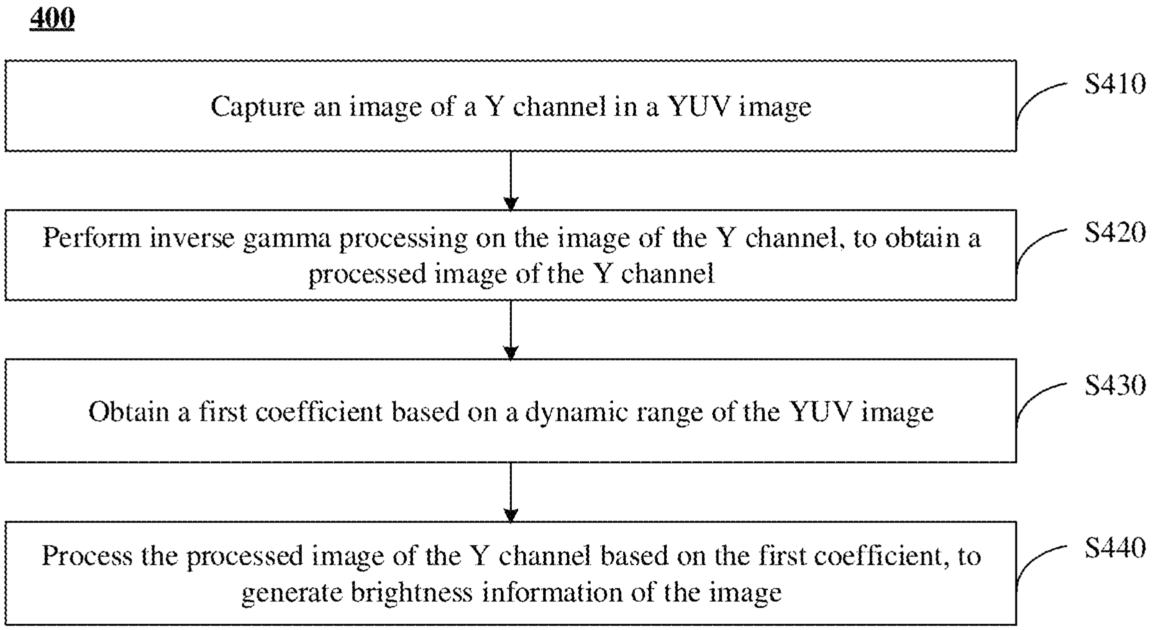
FIG. 9 is a schematic flowchart of another method for generating brightness information of an image according to an embodiment of this application.

Optionally, if the brightness information of the first image may not be directly obtained, for example, if the first image is the image whose brightness is adjusted and processed, the method as shown in FIG. 8 or FIG. 9 may be used to generate the brightness information of the first image.

For example, that the first image is the image whose brightness is adjusted and processed includes, but is not limited to the following scenarios:

The first image is an image processed according to a blurry algorithm. Alternatively, the first image is an image obtained according to a deformation algorithm. For example, the deformation algorithm includes: aberration correction (for example, optical aberration correction and portrait aberration correction), skin beautification (for example, face slimming, eye enlargement, and rhinoplasty), cropping, and the like. Alternatively, the first image is an image obtained by filtering, masking, and enhancement processing (including light spotting and CG lighting). The first image is an image on which multi-camera fusion is performed. For example, multi-camera fusion is performed based on a field of view (Field of view, FOV). Alternatively, the first image is an image on which local enhancement is performed, for example, according to a face super resolution (Face SR) algorithm. Alternatively, the first image is a post-edited image. For example, the first image is an image processed using third-party image processing software, or the first image is an image whose format is converted after being forwarded.

It should be understood that the first image generated after ISP processing is performed based on the raw image captured by the image sensor may be considered as an original first image. If the brightness of the first image is adjusted and processed again after the original first image is generated, the brightness information of the original first image cannot be obtained. In this case, the method as shown in FIG. 8 or FIG. 9 may be used to generate the brightness information of the first image.

S330: Obtain a current brightness value and a maximum brightness value of the display screen, and determine a target brightness value.

In this embodiment of this application, to enable the first image displayed by the electronic device to be brighter in visual effect, the brightness of the display screen may be increased. The maximum brightness value is maximum brightness that is supported by the display screen of the electronic device. When the target brightness is the brightness value of the display screen of the electronic device, the electronic device displays the first image.

Optionally, the electronic device may first determine a first brightness threshold based on the current brightness of the display screen; and determine the target brightness value by comparing the first brightness threshold with the maximum brightness value.

For example, the electronic device may use a preset multiple of the current brightness value of the display screen as the first brightness threshold. The preset multiple may be any value greater than 1, for example, 3. The electronic device may compare the first brightness threshold to the maximum brightness value. If the first brightness threshold is less than or equal to the maximum brightness value of the display screen, it is determined that the target brightness value is the first brightness threshold. If the first brightness threshold is greater than the maximum brightness value, it is determined that the target brightness value is a maximum brightness value.

Optionally, the target brightness value may be fixed to the maximum brightness value of the display screen. It may be understood that regardless of the brightness value of the display screen of the electronic device, the electronic device always takes the maximum brightness value as the target brightness value.

S340: Obtain, based on the brightness gain value and the first image, an image on which tone mapping processing is performed.

Optionally, the brightness gain coefficient may include a first gain coefficient with a second gain coefficient. The electronic device may first determine the first gain coefficient and the second gain coefficient. The electronic device may traverse the brightness value of each pixel in the first image based on the brightness information of the first image. If the brightness value of the pixel is less than a brightness threshold, the pixel value of the pixel is adjusted based on the first gain coefficient. If the brightness value of the pixel is greater than or equal to a brightness threshold, the pixel value of the pixel is adjusted based on the second gain coefficient, to obtain the image on which tone mapping processing is performed.

It may be understood that the first image includes a first zone and a second zone. The first zone is a dark light zone in the first image, and the second zone is a high light zone in the first image. A pixel value of the dark light zone in the first image is adjusted based on the first gain coefficient. A pixel value of the bright light zone in the first image is adjusted based on the second gain coefficient.

Case 1

Optionally, a first compression coefficient may be determined first based on the target brightness value of the display screen, and compression processing is performed on the pixel values of the first image based on the first compression coefficient, to obtain an image on which compression processing is performed. For any pixel in the image on which compression processing is performed, it may be determined, based on the brightness information of the first image, whether the brightness value of the pixel is less than a brightness threshold (V1). If the brightness value of the pixel is less than the brightness threshold, the first gain coefficient is multiplied by the pixel value of the pixel in the image on which compression processing is performed. If the brightness value of the pixel is greater than or equal to the brightness threshold (V1), the second gain coefficient is multiplied by the pixel value of the pixel in the image on which compression processing is performed, to obtain an image on which tone mapping processing is performed.

It may be understood that a comparison is made with the brightness threshold (V1) based on the brightness value of the pixel in the first image. It may be determined that the pixel is adjusted by using the first gain coefficient or the second gain coefficient, the first gain coefficient or the second gain coefficient is multiplied by the pixel value of the pixel in the image on which compression processing is performed, to obtain the image on which tone mapping processing is performed.

Figure 6:
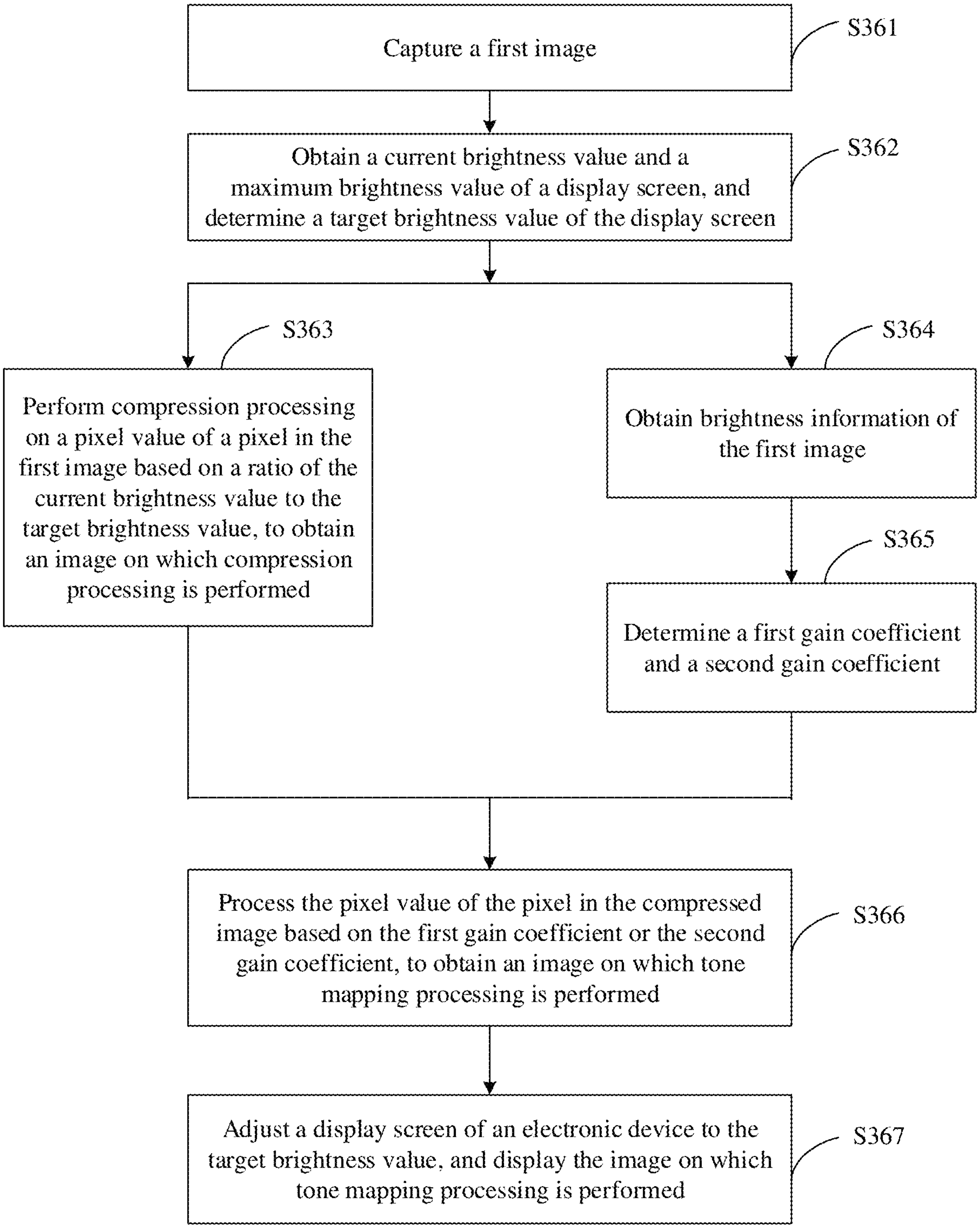
FIG. 6 is a schematic diagram of a correspondence relationship between a gain value and a brightness value according to an embodiment of this application.

The following describes in detail the image processing method provided in embodiments of this application with reference to FIG. 6. The method may be performed by the electronic device as shown in FIG. 1. The method includes step S361 to step S367. The following separately describes step S361 to step S367 in detail.

S361: Capture a first image.

For example, the first image is a to-be-displayed image of an electronic device. Optionally, the first image may be an image captured by the electronic device. Alternatively, the first image may be an image downloaded by the electronic device. Alternatively, the first image may be an image received by the electronic device from another electronic device.

Optionally, for implementations, refer to related descriptions of S310 in FIG. 5, and details are not described herein again.

S362: obtain a current brightness value and a maximum brightness value of a display screen, and determine a target brightness value of the display screen.

Optionally, for implementations of S362, refer to related descriptions of S330 in figures, and details are not described herein again.

S363: Perform compression processing on a pixel value of a pixel in the first image based on a ratio of the current brightness value to the target brightness value, to obtain an image on which compression processing is performed.

Optionally, the ratio of the current brightness value to the target brightness value may be multiplied by the pixel value of the pixel in the first image, to obtain the image on which compression processing is performed.

For example, the first compression coefficient is a ratio of the current brightness value to the target brightness value of the display screen. The target brightness value may be a first brightness threshold. Alternatively, the target brightness value may be the maximum brightness value. Optionally, refer to the related descriptions of S330, and details are not described herein again.

S364: obtain brightness information of the first image.

Optionally, the brightness information of the first image may be a grayscale image of the first image, for example, an image of a Y channel obtained based on data of the Y channel corresponding to the first image.

Optionally, a pixel value of each pixel in the first image may be obtained; and brightness information of the pixel is obtained through calculation based on the pixel value of each pixel.

Figure 10:
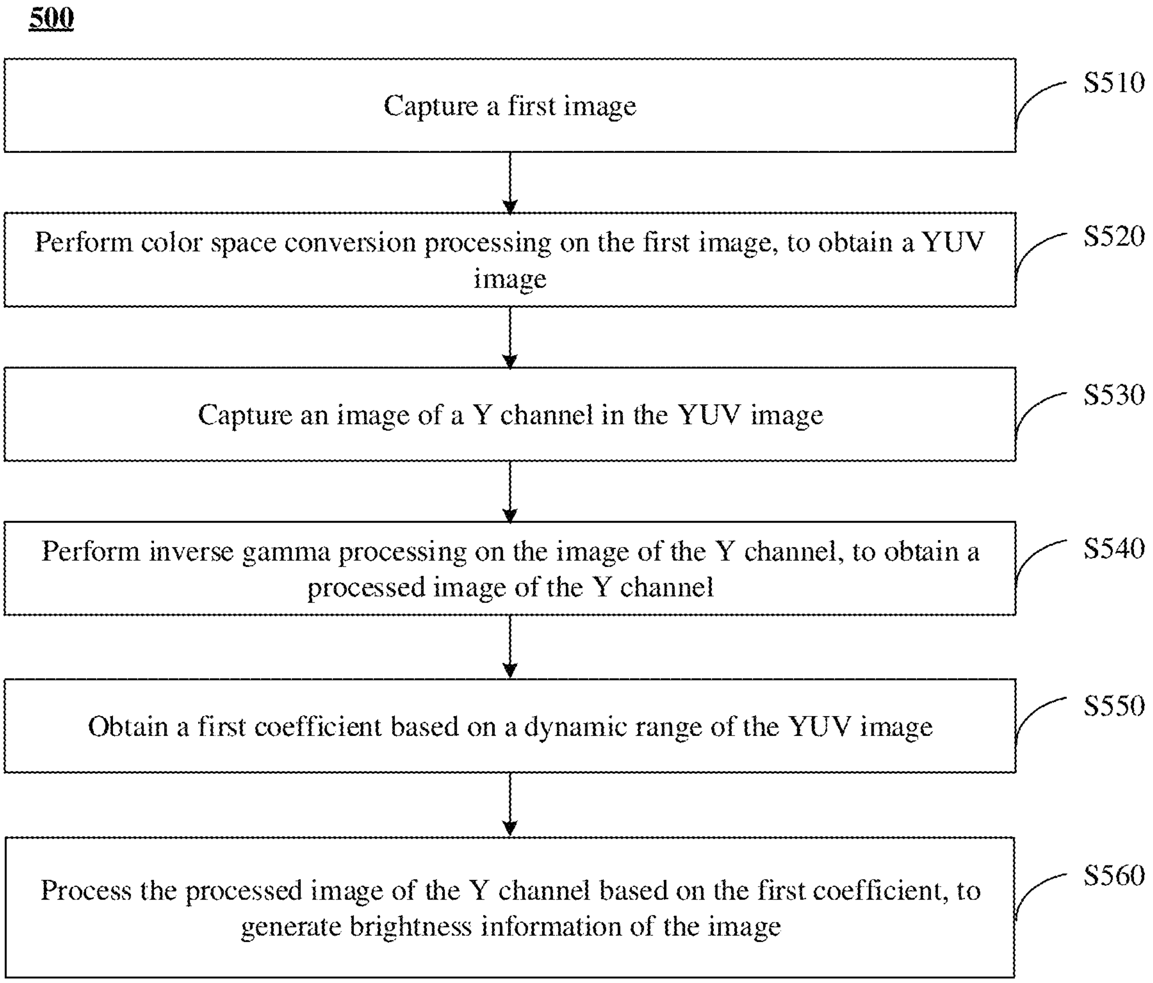
FIG. 10 is a schematic flowchart of another image processing method according to an embodiment of this application.

Optionally, if the brightness information of the first image may not be directly obtained, a method as shown in FIG. 9 or FIG. 10 may be used to generate the brightness information of the first image.

S365: Determine a first gain coefficient and a second gain coefficient.

Optionally, the first gain coefficient and the second gain coefficient may be determined based on a saturated ratio of the first image, a brightness value of a photographing scenario when the first image is captured, and a maximum brightness value supported by the display screen. The saturated ratio of the first image is a ratio of a quantity of pixels whose pixel values in the first image are greater than a preset threshold to a total quantity of pixels in the first image.

Figure 7:
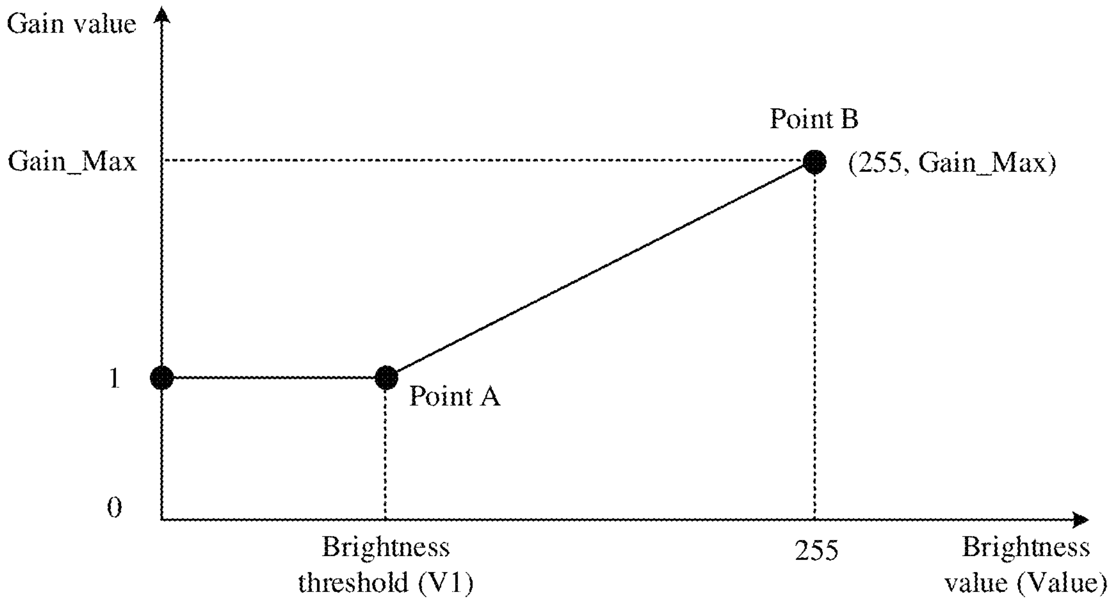
FIG. 7 is a schematic diagram of a correspondence relationship between a maximum gain value and a saturated ratio according to an embodiment of this application.

The following describes a process of determining the first gain coefficient and the second gain coefficient by using examples with reference to FIG. 7 and FIG. 8.

For example, as shown in FIG. 7, an example in which the first image is an 8-bit image is used for descriptions. The first gain coefficient may be a fixed value; and the second gain coefficient may be a variable value, and the second gain coefficient is related to brightness information of each pixel in a second zone. For example, the second gain coefficient may be represented by G(x), where x represents the brightness value of the pixel. If the brightness value of the pixel is less than a brightness threshold (V1), a gain value is 1. If the brightness value of the pixel is greater than or equal to a brightness threshold (V1), a gain value is G(x). It may be understood that the first gain value may be a fixed value of 1; and the second gain value is a variable value, and related to the brightness value of the pixel.

For example, as shown in FIG. 8, a function relationship G(x) of the second gain coefficient may be determined based on coordinates of a point A (255, Gain_Max) and coordinates of a point B (V1, 1), and G(x)=(Gain_Max−1)/(255−V1)*(x−V1)+1, where x represents the brightness value of the pixel.

Optionally, Gain_Max is related to a dynamic range (for example, a DR value) of the first image. Generally, when an overexposure zone in the image is larger, the DR is larger.

For example, an example in which the first image is an 8-bit image is used for descriptions, a ratio of the quantity of pixels with pixel values greater than 245 to the total quantity of pixels may be calculated. When the ratio is larger, the DR value is larger, where 245 indicates a threshold parameter 1, and the threshold parameter 1 may indicate a value less than or equal to 255.

Optionally, FIG. 8 is a schematic diagram of a correspondence between saturated_ratio (saturated_ratio) and Gain_Max. Assuming that 245 is used as the threshold parameter, saturated_ratio=the quantity of pixels with the pixel values greater than 245/the quantity of total pixels*100%. Gain_clip indicates a maximum value of a brightening multiple of the display screen. The maximum value of the brightening multiple depends on current brightness clearance of the display screen. The brightness clearance may be used to indicate a value of a quantity of nits for currently brightening the display screen. For example, assuming that the current brightness value of the display screen is 200 nit and the maximum brightness of the display screen is 1000 bit, the brightness clearance=1000 nit−200 nit=800 nit. In this case, Gain_clip=1000/200=5.

Optionally, the brightness threshold (V1) is related to brightness of an actual object in a current photographing scenario.

For example, the brightness threshold may be a brightness value corresponding an object with centered brightness in the current photographing scenario. For example, if brightness in the photographing scenario is 1000 lux, the brightness threshold (V1) may be a brightness value of a pixel corresponding to a 500-nit object. If brightness in the photographing scenario is 800 lux, the brightness threshold (V1) may be a brightness value of a pixel corresponding to a 400-nit object. The brightness means a brightness value of ambient light in the photographing scenario in lux, and the brightness means a response value of an object to brightness in nit.

For example, a raw image of the photographing scenario may be captured. According to ISO calibration of a camera module, a brightness value of a pixel corresponding to 500 nit in the raw image is recorded as the brightness threshold (V1).

For example, the ISO calibration of the camera module may be obtained by testing, for example, testing brightness of a perspective card of a light box and sequentially adjusting back light brightness of the light box, so that corresponding back light brightness and an exposure (expo=shutter time*ISO), and a mapping table of actual brightness values as shown in Table 1 can be found. It may be learned from Table 1 that there is a linear relationship between a magnitude of the back light brightness and magnitudes of the exposure and the brightness value.

TABLE 1

| Back light brightness (nit) | Exposure (shutter time * ISO) | Brightness value (normalized to 8 bit) |
|---|---|---|
| 100 | 10 ms * 100 | 56 |
| 200 | 10 ms * 100 | 112 |
| 300 | 10 ms * 100 | 168 |
| 400 | 10 ms * 100 | 224 |

S366: Perform, based on the first gain coefficient or the second gain coefficient, tone mapping processing on the pixel value of the pixel in the image on which compression processing is performed, to obtain the image on which tone mapping processing is performed.

Optionally, the brightness value of the pixel in the first image may be determined based on the brightness information of the pixel in the first image. If the brightness value of the pixel in the first image is less than the brightness threshold (V1), the first gain coefficient is multiplied by the pixel value of the pixel in the image on which compression processing is performed. If the brightness value of the pixel in the first image is greater than or equal to the brightness threshold (V1), the second gain coefficient is multiplied by the pixel value of the pixel in the image on which compression processing is performed, to obtain the image on which tone mapping processing is performed.

For example, the first image includes a pixel A, a pixel B, and a pixel C. Assuming that the brightness threshold is 120. If it is determined, based on the brightness information, that a brightness value of the pixel A is 100 and 100<120, a pixel value of a pixel A on which compression processing is performed is processed based on the first gain coefficient. If it is determined, based on the brightness information, that a brightness value of the pixel B is 166 and 166>120, a pixel value of a pixel A on which compression processing is performed is processed based on the second gain coefficient. If it is determined, based on the brightness information, that a brightness value of the pixel C is 180 and 180>120, a pixel value of a pixel A on which compression processing is performed is processed based on the second gain coefficient.

S367: Adjust the display screen of the electronic device to the target brightness value, and display the image on which tone mapping processing is performed.

Optionally, for implementations, refer to related descriptions of S350 in FIG. 5, and details are not described herein again.

In this embodiment of this application, to avoid an area of an overexposure zone in the first image from increasing when tone adjustment is directly performed on the first image, before tone mapping processing is performed on the first image, compression processing may be performed on the pixel value in the first image first, and then tone mapping processing is performed on the image on which compression processing is performed, thereby improving accuracy of the image on which tone mapping processing is performed, and enabling the image to be more vivid.

Case 2

Optionally, a brightness value of any pixel in the first image is determined based on the brightness information of the first image. If the brightness value of the pixel is less than the brightness threshold (V1), the first gain coefficient is multiplied by the pixel value of the pixel in the first image. If the brightness value of the pixel is greater than or equal to the brightness threshold (V1), the second gain coefficient is multiplied by the pixel value of the pixel in the first image, to obtain the image on which tone mapping processing is performed. It may be understood that the image on which tone mapping processing is performed is obtained by multiplying the first gain coefficient by a pixel in a dark light zone in the first image and multiplying the second gain coefficient by a pixel in a bright light zone in the first image. The first gain coefficient is a fixed value less than 1, and the second gain coefficient is a variable value less than or equal to 1.

For example, the first gain coefficient may be K1; and the second gain coefficient may be 1 or K1*G(x). If K1*G(x) is greater than or equal to 1, the second gain coefficient is 1. If K1*G(x) is less than 1, the second gain coefficient is K1*G(x). The first gain coefficient may be K1=current brightness value of the display screen/the maximum brightness value of the display screen.

It should be understood that compression processing does not need to be performed on the pixel value of the pixel in the first image in Case 2. The first image may be directly multiplied by a gain coefficient (for example, the gain coefficient includes a first gain coefficient and a second gain coefficient). However, the second gain coefficient needs to be constrained. For example, a constraint condition is that the second gain coefficient is less than or equal to 1. For example, Gain_Max as shown in FIG. 7 is less than or equal to 1.

Optionally, for the second gain coefficient, refer to related descriptions in Case 1, and details are not described herein again.

In this embodiment of this application, when compression processing is not performed on the pixel value of the pixel in the first image is not compressed, the overexposure zone in the image on which tone mapping processing is performed may not be increased to a certain extent by constraining the second gain coefficient.

Case 3

Optionally, a brightness value of any pixel in the first image is determined based on the brightness information of the first image. If the brightness value of the pixel is less than the brightness threshold (V1), the first gain coefficient is multiplied by the pixel value of the pixel in the first image. If the brightness value of the pixel is greater than or equal to the brightness threshold (V1), the second gain coefficient is multiplied by the pixel value of the pixel in the first image, to obtain the image on which tone mapping processing is performed. It may be understood that the image on which tone mapping processing is performed is obtained by multiplying the first gain coefficient by a pixel in a dark light zone in the first image and multiplying the second gain coefficient by a pixel in a bright light zone in the first image.

For example, the first gain coefficient may be K1; and the second gain coefficient may be K1*G(x). The first gain coefficient may be K1=current brightness value of the display screen/the maximum brightness value of the display screen.

It should be understood that compression processing does not need to be performed on the pixel value of the pixel in the first image in Case 3. The first image may be directly multiplied by a gain coefficient (for example, the gain coefficient includes a first gain coefficient and a second gain coefficient). A magnitude of the gain coefficient is not limited.

S350: Adjust the brightness of the display screen obtained by the electronic device to the target brightness value, and display the image on which tone mapping processing is performed.

For example, a relationship between observed brightness of a specific pixel and the brightness of the display screen may satisfy an equation: Lg=L*Lp, where Lg represents the observed brightness, Lp represents the brightness of the display screen, and L represents the brightness value of the pixel (for example, a gray level of the pixel). The observed brightness of the pixel may indicate light and shade of the pixel on the display screen.

The brightness value of the pixel is related to the pixel value of the pixel. When the pixel value is larger, the brightness of the pixel is larger. For example, the brightness value of the pixel and the pixel value may satisfy an equation: Gray=0.299R+0.587G+0.114B.

It may be learned that when an image is displayed on the display screen of the electronic device, both the brightness of the display screen of the electronic device and the pixel value of the pixel affect the light and shade of the pixel on the display screen. When the pixel value of the pixel is fixed, and when the brightness value of the display screen of the electronic device is larger, the observed brightness of the pixel is larger, that is, the pixel looks brighter. When the brightness of the display screen of the electronic device is fixed, and when the pixel value of the pixel is larger, the observed brightness of the pixel is larger, that is, the pixel looks brighter. On the contrary, when the brightness of the display screen is increased, if the observed brightness of the specific pixel remains unchanged, the pixel value of the pixel may be reduced.

It may be understood that for Case 1 in S340, the process of displaying the image on which tone mapping processing is performed in this application is actually as follows:

When the brightness of the display screen of the electronic device is increased, for a pixel (for example, the pixel in a first zone) in the first image whose brightness value is less than the brightness threshold, the pixel value of the pixel is first reduced, and then the pixel value of the reduced pixel remains unchanged, thereby enabling the observed brightness of the pixel in the first zone (for example, the dark light zone) in the first image to be close to the observed brightness before the brightness of the display screen is not adjusted. In addition, for the pixel (for example, the pixel in the second zone) that is in the first image and whose brightness value is greater than or equal to the brightness threshold, the pixel value of the pixel is first reduced, and then the pixel value of the reduced pixel is multiplied by the second gain coefficient greater than 1, thereby enabling the observed brightness of the pixel in the second zone in the second image to be greater than the observed brightness before the brightness of the display screen is not adjusted. In other words, if the brightness value of the display screen of the electronic device is increased, the brightness of the dark light zone in the first image remains unchanged, and the brightness of the bright light zone in the first image is increased. For different zones in the first image, different multiples of brightening are implemented, to enable the first image displayed on the display screen to be closer to the actual photographing scenario.

For example, an example in which the brightness of the display screen of the electronic device is adjusted from a current brightness value A to a target brightness value C, a compression coefficient is A/C, the first gain coefficient is 1, and the second gain coefficient is G(x) is used to describe a process of displaying the first image by the electronic device.

For example, the electronic device may first perform compression processing on the pixel value of the pixel in the first image based on the compression coefficient. For any pixel in the image on which compression processing is performed, it may be determined, based on the brightness information of the first image, whether the brightness value of the pixel is less than a brightness threshold (V1). If the brightness value of the pixel is less than the brightness threshold, the first gain coefficient is multiplied by the pixel value of the pixel in the image on which compression processing is performed. If the brightness value of the pixel is greater than or equal to the brightness threshold (V1), the second gain coefficient is multiplied by the pixel value of the pixel in the image on which compression processing is performed, to obtain the image on which tone mapping processing is performed. In the process of displaying the image on which tone mapping processing is performed, for a pixel that is in the first image and whose brightness value is less than the brightness threshold, the pixel value of the pixel decreases A/C fold first, and then the pixel value of the reduced pixel remains unchanged. For a pixel that is in the first image and whose brightness value is greater than or equal to the brightness threshold, the pixel value of the pixel decreases A/C fold first, and then increases G(x) fold. When the brightness of the display screen of the electronic device is adjusted from the current brightness value A to the target brightness value C, brightness of all pixels in the image on which tone mapping processing is performed increases C/A fold. It can be learned that when the image on which tone mapping processing is performed, for the pixel that is in the first image and whose brightness value is less than the brightness threshold, the observed brightness of the pixel decreases A/C fold first, and then increases C/A fold, to be the same as original observed brightness of the pixel. For the pixel that is in the first image and whose brightness value is greater than or equal to the brightness threshold, the observed brightness of the pixel increases G(x) fold, which is higher than the observed brightness of the pixel, thereby increasing light and shade contrast between the dark light zone and the bright light zone in the first image, and expanding the dynamic range of the first image.

In this embodiment of this application, in the process of displaying the first image, observed brightness (for example, visual brightness) of each pixel is increased by increasing the brightness of the display screen of the electronic device. In addition, the observed brightness of the pixel in the first zone is decreased by decreasing the pixel value of the pixel in the first zone (for example, the dark light zone) in the first image. The observed brightness of the pixel in the second zone is increased or maintained by increasing or maintaining the pixel value of the pixel in the second zone (for example, the bright light zone). Therefore, effect of increasing the observed brightness of the pixel in the first zone in the first image is implemented without changing the observed brightness of the pixel in the second zone. In other words, while the first image is displayed, the bright light zone in the first image may be brighter and the dark light zone remains unchanged. This increases light and shade contrast of the first image, and expands the dynamic range of the first image, thereby enabling the first image to be more vivid and close to the actual photographing scenario.

Optionally, the first image may be an image captured by the camera module of the electronic device. Alternatively, the first image may be an image downloaded by the electronic device. Alternatively, the first image may be an image received by the electronic device from another device. If the electronic device detects a tap operation performed on the first image, the electronic device performs S320 to S350. Because the observed brightness of the specific pixel is related to both the brightness of the display screen and the brightness of the pixel in the image, the image on which tone mapping processing is performed in S340 is not an image finally observed by a user. The image on which tone mapping processing is performed is displayed by adjusting the brightness of the display screen to the target brightness. Content of the image observed by the user is content of the image on which tone mapping processing is performed, and the brightness of the image is combined effect of the brightness of the pixel in the image on which tone mapping processing is performed and the brightness of the display screen. If the display screen of the electronic device is in a screen-off state, or the display screen of the electronic device is in a dark screen state, the electronic device may release the image on which tone mapping processing is performed. S310 to S350 may be re-performed after an operation of waking up the display screen or tapping on the display screen is detected.

Optionally, in some scenarios, the brightness information of the first image may not be directly obtained using the image processing method as shown in FIG. 5. For example, if the first image is the image whose brightness is adjusted and processed, the brightness information of the first image may not be directly obtained. In this case, the brightness information of the first image may be first generated using the method as shown in FIG. 9 or FIG. 10, and then the image processing method as shown in FIG. 5 is performed.

Example 1

Optionally, if the first image is an image that is captured by the camera application in the electronic device and whose brightness is adjusted and processed, for example, the first image is an image that is captured by the camera application and on which background blurring is performed, or the first image is an image that is captured by the camera application and on which beauty processing is performed, the brightness information of the first image is generated using the method as shown in FIG. 9.

FIG. 9 is a schematic flowchart of a method for generating brightness information of an image according to an embodiment of this application. The method 400 may be performed by the electronic device as shown in FIG. 1. The method 400 includes step S410 to step S440. The following separately describes step S410 to step S440 in detail.

S410: Capture an image of a Y channel in a YUV image.

Optionally, a raw image that is captured by a camera module may be captured, the raw image may be converted into YUV color space, and the image of the Y channel in the YUV image may be captured.

For example, a first image may be a raw image captured by a camera module of an electronic device. The raw image is output as the YUV image according to a YUV domain algorithm in an ISP. The YUV image includes data of a Y channel, data of a U channel, and data of a V channel. Based on the data of the Y channel in the YUV image, the image of the Y channel may be obtained.

Optionally, the YUV image may be an image output after being processed according to the last algorithm in the YUV domain algorithm in the ISP.

Optionally, if a bit width of brightness information of the YUV image is 8 bit, after the bit width is digitized, a range of the brightness value is between 0 and 255. It may be understood that one pixel may display 256 gray levels.

Optionally, if a bit width of the brightness information of the YUV image is 10 bit, after the bit width is digitized, a range of the brightness value is between 0 and 1023. It may be understood that one pixel may display 1,024 gray levels.

Optionally, in a possible implementation, the first image may be the YUV image, and the image of the Y channel in the YUV image may be directly captured.

S420: Perform inverse gamma processing on the image of the Y channel, to obtain a processed image of the Y channel.

It should be understood that the data of the Y channel may be changed from non-linearly varying data to linearly varying data by inverse gamma processing. The linearly varying data has less effect on color, to enable the processed image of the Y channel to be more accurate.

It should be noted that because gamma processing needs to be performed when the electronic device generates the first image, a gamma curve during gamma processing may be obtained, and inverse gamma processing may be performed on the image of the Y channel based on the gamma curve.

For example, gamma correction means performing gamma curve mapping on an input pixel value to obtain an output pixel value. Inverse gamma processing means performing inverse transforming on a gamma curve to obtain an inverse gamma curve, and performing inverse gamma curve mapping on an input pixel to obtain an output pixel.

S430: obtain a first coefficient based on a dynamic range of the YUV image.

Optionally, the first coefficient is more than 0 and less than or equal to 1. When the dynamic range of the YUV image is larger, the first coefficient is larger.

For example, information in a histogram of the YUV image may be obtained; a dynamic range value of the YUV image may be determined based on distribution information in the histogram; and the first coefficient may be obtained based on the dynamic range value.

S440: Process the processed image of the Y channel based on the first coefficient, to generate brightness information of the image.

Optionally, the first coefficient is multiplied by a brightness value of each pixel in the processed image of the Y channel, to obtain a new brightness value corresponding to each pixel separately, that is, obtain brightness information of each pixel.

In this embodiment of this application, if the first image is an image generated after brightness processing is performed by a camera module in the electronic device, the electronic device may not directly obtain brightness information of the first image. For example, the first image is an image that is captured by a camera application and on which beauty processing is performed. The electronic device may convert the first image into the YUV color space, to obtain the YUV image; and may generate the brightness information of the first image based on the image of the Y channel in the YUV image. Therefore, the electronic device may obtain the brightness information of the first image, to implement the image processing method as shown in FIG. 5. To be specific, while the first image is displayed, the bright light zone in the first image may be brighter and the dark light zone remains unchanged. This increases light and shade contrast of the first image, and expands the dynamic range of the first image, thereby enabling the first image to be more vivid and close to the actual photographing scenario.

Example 2

Optionally, if the first image is an image that is captured by a third-party camera application in the electronic device and whose brightness is adjusted and processed, or the first image is an image received by the electronic device from another device, or the first image is an image downloaded by the electronic device, the brightness information of the first image is generated using method as shown in FIG. 10.

FIG. 10 is a schematic flowchart of a method for generating brightness information of an image according to an embodiment of this application. The method 500 may be performed by the electronic device as shown in FIG. 1. The method 500 includes step S510 to step S560. The following separately describes step S510 to step S560 in detail.

S510: Capture a first image.

Optionally, an electronic device captures an image by a third-party camera application. Alternatively, an electronic device receives an image sent by another device. Alternatively, an electronic device downloads an image in RGB color space.

Optionally, a first image may be an image in a JPEG format.

S520: Perform color space conversion processing on the first image, to obtain a YUV image.

Optionally, the first image may be an image in the RGB color space. The image in the RGB color space may be converted into an image in YUV color space, to obtain the YUV image.

For example, if the first image is an 8-bit RGB image, when the RGB image is converted into the YUV image, the following equations are satisfied: Y=0.257R+0.504G+0.098B+16; U=0.439B−0.291G−0.148R+128; V=0.439R−0.368G−0.071B+128.

It should be understood that the foregoing describes color space conversion on the RGB image by using examples. Any color space conversion processing may be performed. This is not limited in this application.

S530: Capture an image of a Y channel in the YUV image.

For example, the image of the Y channel is obtained by obtaining data of the Y channel in the YUV image.

S540: Perform inverse gamma processing on the YUV image, to obtain a processed image of the Y channel.

Optionally, a gamma curve of the color space is obtained based on color space in which the first image is located, and inverse gamma processing is performed on the YUV image based on the gamma curve of the color space.

For example, gamma correction means performing gamma curve mapping on an input pixel value to obtain an output pixel value. Inverse gamma processing means performing inverse transforming on a gamma curve to obtain an inverse gamma curve, and performing inverse gamma curve mapping on an input pixel to obtain an output pixel.

For example, the gamma curve may be a power function curve. If the first image is an image in sRGB color space, an exponent of the power function curve may be 2.2. If the first image is an image in DCI-P3 color space, the exponent of the power function curve may be 2.4. Optionally, for different color space, the exponent of the power function curve may be different.

Optionally, the color space further includes: color space such as Adobe RGB, NTSC, DCI-P3, and the like. Adobe RGB has a wider range of colors and may show more vivid colors. NTSC is usually used to test a range of colors that are covered by a display screen of the electronic device. DCI-P3 is color space that focuses on visual impact, and is not comprehensive. Compared with other color space, the DCI-P3 color space has a wider range of red/green colors.

It should be understood that the data of the Y channel may be changed from non-linearly varying data to linearly varying data by inverse gamma processing. The linearly varying data has less effect on color, to enable the processed image of the Y channel to be more accurate.

S550: obtain a first coefficient based on a dynamic range of the YUV image.

Optionally, the first coefficient is more than 0 and less than or equal to 1. When the dynamic range of the YUV image is larger, the first coefficient is larger.

For example, information in a histogram of the YUV image may be obtained; a dynamic range value of the YUV image may be determined based on distribution information in the histogram; and the first coefficient may be obtained based on the dynamic range value.

S560: Process the processed image of the Y channel based on the first coefficient, to generate brightness information.

Optionally, the first coefficient is multiplied by a brightness value of each pixel in the processed image of the Y channel, to obtain a new brightness value corresponding to each pixel separately, that is, obtain brightness information of each pixel.

In this embodiment of this application, if the first image is the image downloaded or received by the electronic device from another device, the electronic device may not directly obtain the brightness information of the first image. The electronic device may convert the first image into the YUV color space, to obtain the YUV image; and may generate the brightness information of the first image based on the image of the Y channel in the YUV image. Therefore, the electronic device may obtain the brightness information of the first image, to implement the image processing method as shown in FIG. 5. To be specific, while the first image is displayed, the bright light zone in the first image may be brighter and the dark light zone remains unchanged. This increases light and shade contrast of the first image, and expands the dynamic range of the first image, thereby enabling the first image to be more vivid and close to an actual photographing scenario.

Figure 11:
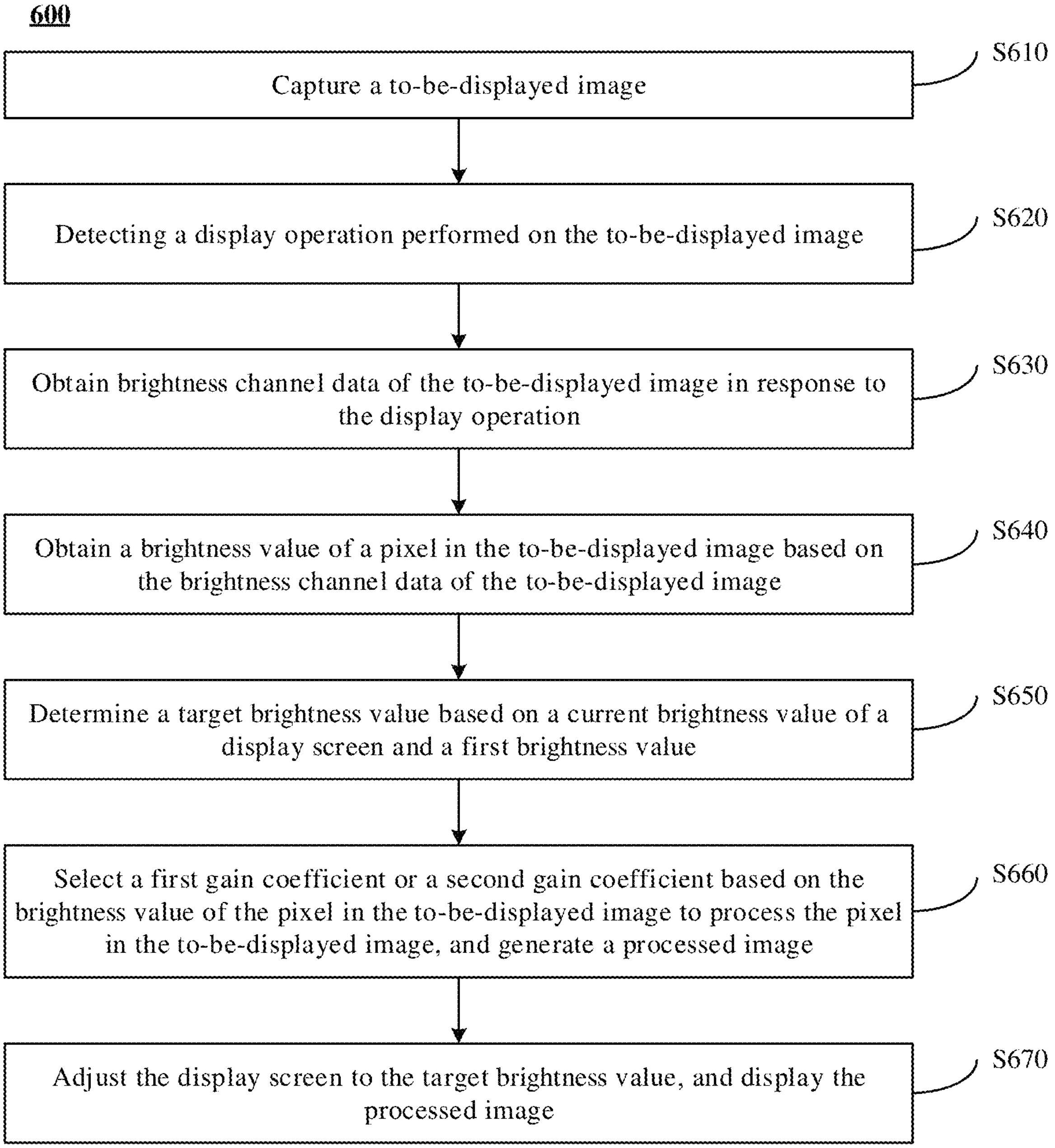
FIG. 11 is a schematic flowchart of another image processing method according to an embodiment of this application.

FIG. 11 is a schematic flowchart of an image processing method according to an embodiment of this application. The method 600 may be performed by the electronic device as shown in FIG. 1. The method 600 includes step S610 to step S670. The following separately describes step S610 to step S670 in detail.

S610: Capture a to-be-displayed image.

Optionally, the to-be-displayed image may be the first image as shown in FIG. 5 or FIG. 6. Refer to the related descriptions of FIG. 5 or FIG. 6, and details are not described herein again. S620: Detect a display operation performed on the to-be-displayed image.

Optionally, the display operation may be an operation of tapping an icon of the to-be-displayed image or a thumbnail of the to-be-displayed image. The display operation may also be another operation of indicating the displaying of the to-be-displayed image. This is not limited in this application.

S630: Obtain brightness channel data of the to-be-displayed image in response to the display operation.

Optionally, the brightness channel data of the to-be-displayed image may be data of a Y channel in the to-be-displayed image.

S640: Obtain a brightness value of a pixel in the to-be-displayed image based on the brightness channel data of the to-be-displayed image.

Optionally, if the to-be-displayed image is an image captured by the electronic device, the obtaining a brightness value of a pixel in the to-be-displayed image based on the brightness channel data of the to-be-displayed image includes:

obtaining an inverse gamma curve of the to-be-displayed image;

processing the brightness channel data of the to-be-displayed image based on the inverse gamma curve, to obtain processed brightness data; and processing the processed brightness data based on a second coefficient, to obtain the brightness value of the pixel in the to-be-displayed image, where the second coefficient is directly proportional to a dynamic range value of the to-be-displayed image.

In this embodiment of this application, if the to-be-displayed image is an image generated after brightness processing is performed by a camera module in the electronic device, the electronic device may not directly obtain brightness information of the to-be-displayed image. For example, the to-be-displayed image is an image that is captured by a camera application and on which beauty processing is performed. The electronic device may convert the to-be-displayed image into YUV color space, to obtain a YUV image; and may generate the brightness information of the to-be-displayed image based on the image of the Y channel in the YUV image. Therefore, the electronic device may obtain the brightness information of the to-be-displayed image, to implement the image processing method in this application. That is, when the to-be-displayed image is displayed, the bright light zone in the to-be-displayed image may be brighter, and the dark light zone may remain unchanged. This increases light and shade contrast of the to-be-displayed image, and expands the dynamic range of the to-be-displayed image, thereby enabling a to-be-displayed image to be more vivid and close to an actual photographing scenario.

Optionally, if the to-be-displayed image is the image downloaded or received by the electronic device, the obtaining a brightness value of a pixel in the to-be-displayed image based on the brightness channel data of the to-be-displayed image includes:

obtaining a first parameter based on color space in which the to-be-displayed image is located, where the first parameter is an index of a gamma curve;

obtaining an inverse gamma curve of the to-be-displayed image based on the first parameter;

processing the brightness channel data of the to-be-displayed image based on the inverse gamma curve, to obtain processed brightness data; and processing the processed brightness data based on a second coefficient, to obtain the brightness value of the pixel in the to-be-displayed image, where the second coefficient is directly proportional to a dynamic range value of the to-be-displayed image.

In this embodiment of this application, if the to-be-displayed image is the image downloaded or received by the electronic device from another device, the electronic device may not directly obtain the brightness information of the to-be-displayed image. The electronic device may convert the to-be-displayed image into YUV color space, to obtain a YUV image; and may generate the brightness information of the to-be-displayed image based on the image of the Y channel in the YUV image. Therefore, the electronic device may obtain the brightness information of the to-be-displayed image, to implement the image processing method in this application. That is, when the to-be-displayed image is displayed, the bright light zone in the to-be-displayed image may be brighter, and the dark light zone may remain unchanged. This increases light and shade contrast of the to-be-displayed image, and expands the dynamic range of the to-be-displayed image, thereby enabling a to-be-displayed image to be more vivid and close to an actual photographing

S650: Determine a target brightness value based on a current brightness value of the display screen and a first brightness value.

The first brightness value indicates brightness supported that is by the display screen.

Optionally, refer to related descriptions of S330 in FIG. 5, or refer to related descriptions of S362 in FIG. 6, and details are not described herein again.

S660: Select a first gain coefficient or a second gain coefficient based on the brightness value of the pixel in the to-be-displayed image to process the pixel in the to-be-displayed image, and generate a processed image.

The first gain coefficient is configured to adjust a pixel that is in the to-be-displayed image and whose brightness value is less than a pixel of a first threshold, the second gain coefficient is configured to adjust a pixel that is in the to-be-displayed image and whose brightness value is greater than or equal to the pixel of the first threshold, the first threshold is related to brightness of a photographing scenario in which the electronic device is located, the first gain coefficient is 1, the second gain coefficient is linearly directly proportional to the brightness value of the pixel in the to-be-displayed image, and the second gain coefficient is greater than 1.

Optionally, the first threshold may be the brightness threshold V1 as shown in FIG. 7.

It should be understood that the second gain coefficient being linearly directly proportional to the brightness value of the pixel in the to-be-displayed image means that when the brightness value of the pixel in the to-be-displayed image is larger, a second gain coefficient corresponding to the pixel is larger. It may be understood that the second gain coefficient enables the pixel in a high light zone in the to-be-displayed image to be brighter. In this embodiment of this application, the pixel that is in the to-be-displayed image and whose brightness value is less than the first threshold is adjusted based on the first gain coefficient (for example, 1), and the pixel that is in the to-be-displayed image and whose brightness value is greater than or equal to the first threshold is adjusted based on the second gain coefficient. Therefore, when the brightness value of the display screen of the electronic device is increased, the brightness of the dark light zone in the to-be-displayed image remains unchanged, and the brightness of the bright light zone in the to-be-displayed image is increased. For different zones in the to-be-displayed image, different multiples of brightening are implemented, to enable the to-be-displayed image displayed on the display screen to be closer to the actual photographing scenario.

S670: Adjust the display screen to the target brightness value, and display the processed image.

Optionally, refer to related descriptions of S350 in FIG. 5, or refer to related descriptions of S367 in FIG. 6, and details are not described herein again.

Optionally, the selecting a first gain coefficient or a second gain coefficient based on the brightness value of the pixel in the to-be-displayed image to process the pixel in the to-be-displayed image, and generating a processed image includes:

performing compression processing on a pixel value of the pixel in the to-be-displayed image based on a first coefficient, to obtain a second image, where the first coefficient is a ratio of the current brightness value to the target brightness value;

if the brightness value of the pixel in the to-be-displayed image is less than the first threshold, adjusting a pixel value of a pixel in the second image based on the first gain coefficient; or if the brightness value of the pixel in the to-be-displayed image is greater than or equal to the first threshold, adjusting a pixel value of a pixel in the second image based on the second gain coefficient; and generating the processed image.

Optionally, the image processing method further includes:

determining a gain function based on the first threshold, the first brightness value, and the first gain coefficient, where the gain function is a directly proportional function; and determining the second gain coefficient based on the brightness value of the pixel in the to-be-displayed image and the gain function.

Optionally, the gain function is $G(x)=(K1-1)/(K2-V1)*(V-V1)+1$, where K1 represents a third gain value, the third gain value is a gain value corresponding to the brightness value of a first pixel, and the brightness value of the first pixel is a maximum brightness value of a pixel in the to-be-displayed image; K2 represents a maximum brightness value of the to-be-displayed image; V represents a brightness value of the pixel in the to-be-displayed image; and V1 represents the first threshold.

Optionally, the gain function may be the functional relationship G(x) as shown in FIG. 7. Refer to related descriptions in FIG. 7 and FIG. 8, and details are not described herein again. The third gain value may be Gain_Max as shown in FIG. 7. For an 8 bit to-be-displayed image, the brightness value of the first pixel may be 255.

Optionally, the selecting a first gain coefficient or a second gain coefficient based on the brightness value of the pixel in the to-be-displayed image to process the pixel in the to-be-displayed image, and generating a processed image includes:

if the brightness value of the pixel in the to-be-displayed image is less than the first threshold, adjusting the pixel value of the pixel in the to-be-displayed image based on the first gain coefficient; or if the brightness value of the pixel in the to-be-displayed image is greater than or equal to the first threshold, adjusting the pixel value of the pixel in the to-be-displayed image based on the second gain coefficient; and generating the processed image.

Optionally, the second gain coefficient is less than or equal to 1.

Optionally, after the displaying the processed image, the method further includes:

if a first operation performed on the electronic device is detected, adjusting brightness of the display screen to the current brightness value, where the first operation is an operation to exit displaying of the to-be-displayed image.

Optionally, after the displaying the processed image, the method further includes:

if it is detected that the electronic device is in a screen-off state, or if detecting that the current brightness value is less than a second threshold, deleting the processed image.

Optionally, the method further includes:

if a second operation or a third operation performed on the display screen is detected, generating the processed image, where the second operation is an unlocking operation performed on the electronic device, and the third operation is a screen-on operation performed on the display screen; and adjusting the display screen to the target brightness value, and displaying the processed image.

In this embodiment of this application, when a display operation performed on a to-be-displayed image is detected, brightness channel data of the to-be-displayed image may be obtained. The brightness value of the pixel in the to-be-displayed image is obtained based on the brightness channel data of the to-be-displayed image. In addition, the target brightness value is determined based on a current brightness value of the display screen and the first brightness value. The pixel that is in the to-be-displayed image and whose brightness value is less than the first threshold is adjusted based on the first gain coefficient (for example, 1), and the pixel that is in the to-be-displayed image and whose brightness value is greater than or equal to the first threshold is adjusted based on the second gain coefficient. Therefore, when the display screen of the electronic device displays the processed image at the target brightness value, a bright light zone in the to-be-displayed image may be brighter, and a dark light zone may remain unchanged. This increases light and shade contrast of the to-be-displayed image, and expands the dynamic range of the to-be-displayed image, thereby enabling a to-be-displayed image to be more vivid and close to an actual photographing scenario.

Figure 12A:
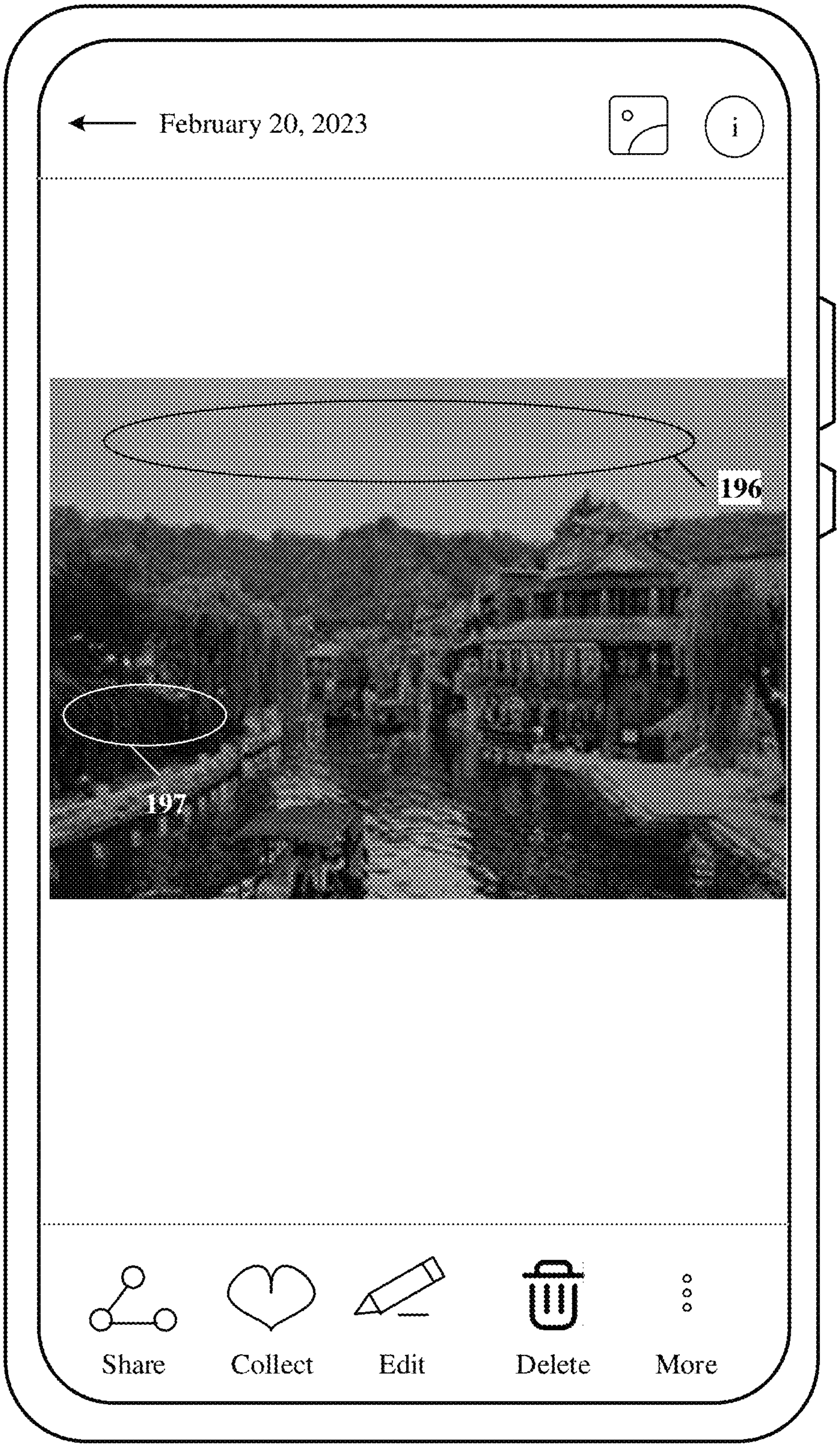
FIG. 12A to FIG. 12C are a schematic diagram of effect of an image processing method according to an embodiment of this application.
Figure 12B:
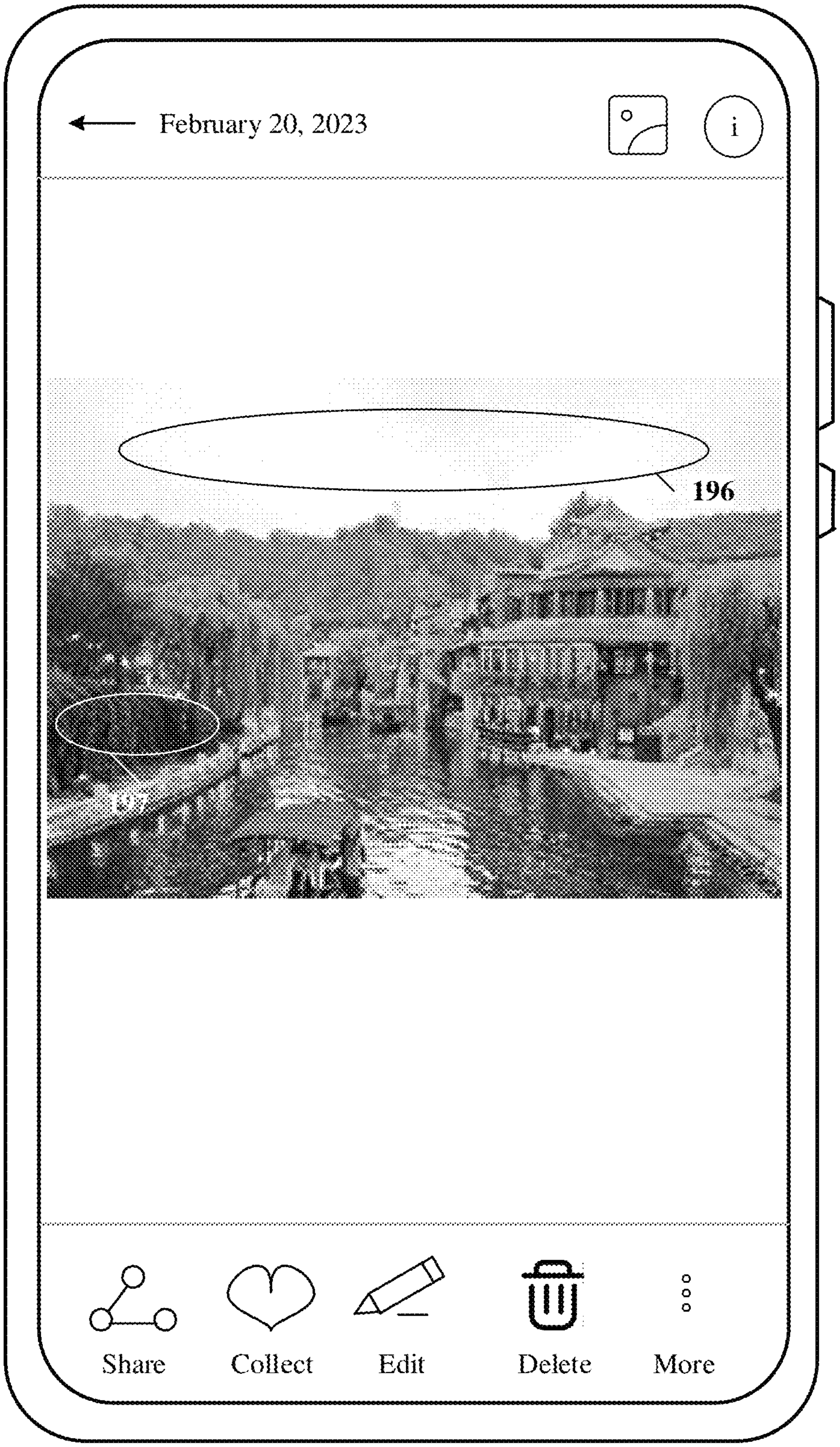
Figure 12C:
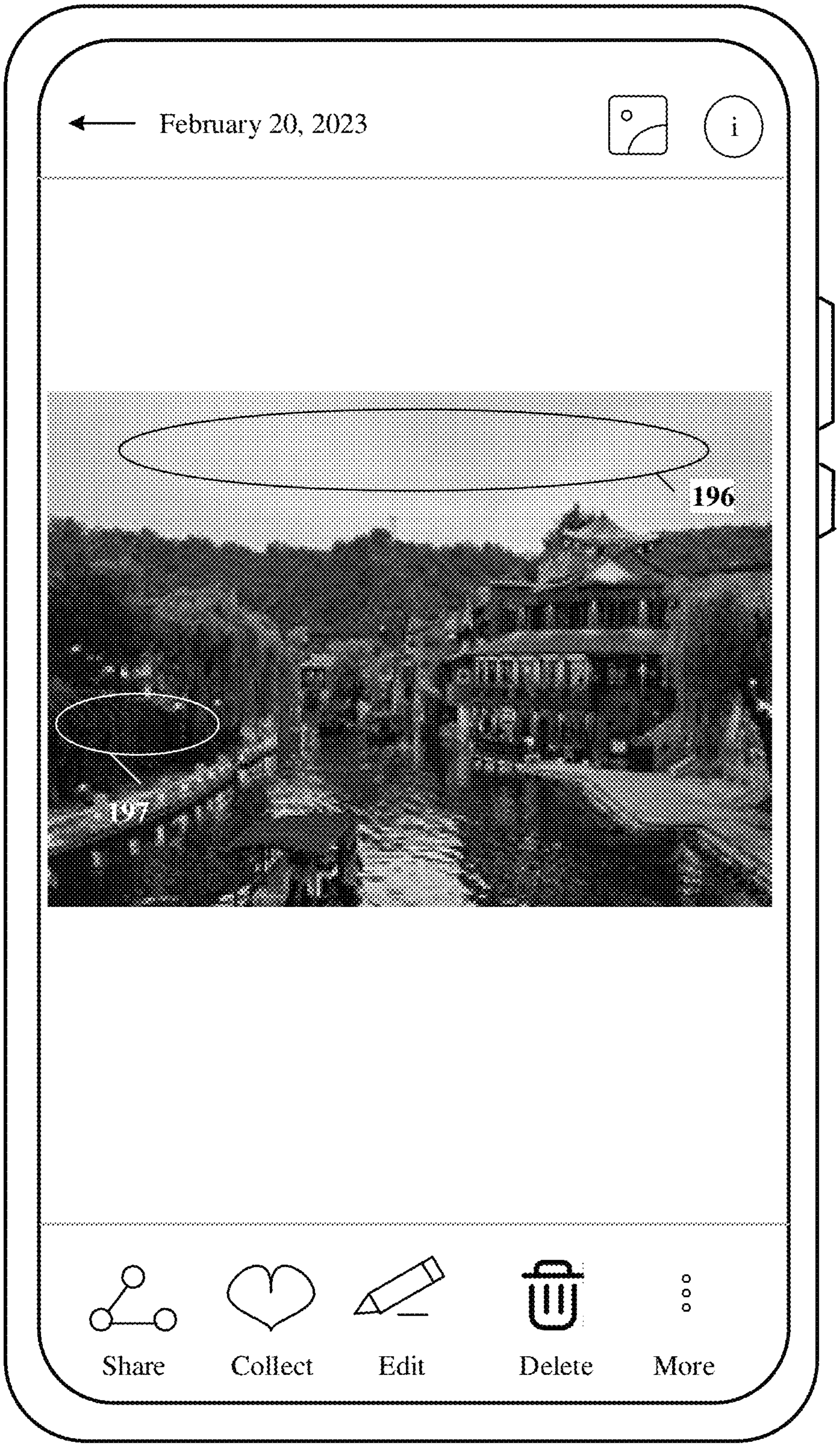

FIG. 12A to FIG. 12C are a schematic diagram of effect of an image processing method according to an embodiment of this application.

As shown in FIG. 12A to FIG. 12C, FIG. 12A shows a display interface displaying a first image before a display screen is brightened, FIG. 12B shows a display interface displaying a first image after a display screen is brightened using an existing method, and FIG. 12C shows a display interface displaying a first image on which tone mapping processing is performed after a display screen is brightened using the solutions in this application. It may be learned from the images in FIG. 12A and FIG. 12B that brightness of the pixel in a bright light zone 196 and a dark light zone 197 in the first image are all increased using the existing method, that is, all the pixels in the image as shown in FIG. 12B are brightened. It may be learned from the images in FIG. 12A and FIG. 12C that in the image in FIG. 12C, the bright light zone 196 in the first image is brighter, and the dark light zone 197 remains unchanged. To be specific, using the image processing method provided in embodiments of this application, the bright light zone in the first image is brighter, and the dark light zone remains unchanged. This increases light and shade contrast of the first image, and expands the dynamic range of the first image, thereby enabling the first image to be more vivid and close to an actual photographing scenario.

The following describes an example of a schematic diagram of an interface in an electronic device with reference to FIG. 13A to FIG. 27D.

In a possible implementation, after the electronic device detects a tap operation performed on a control for high dynamic display of an HDR image, the image processing method provided in embodiments of this application is performed when the electronic device displays the image.

Figure 13A:
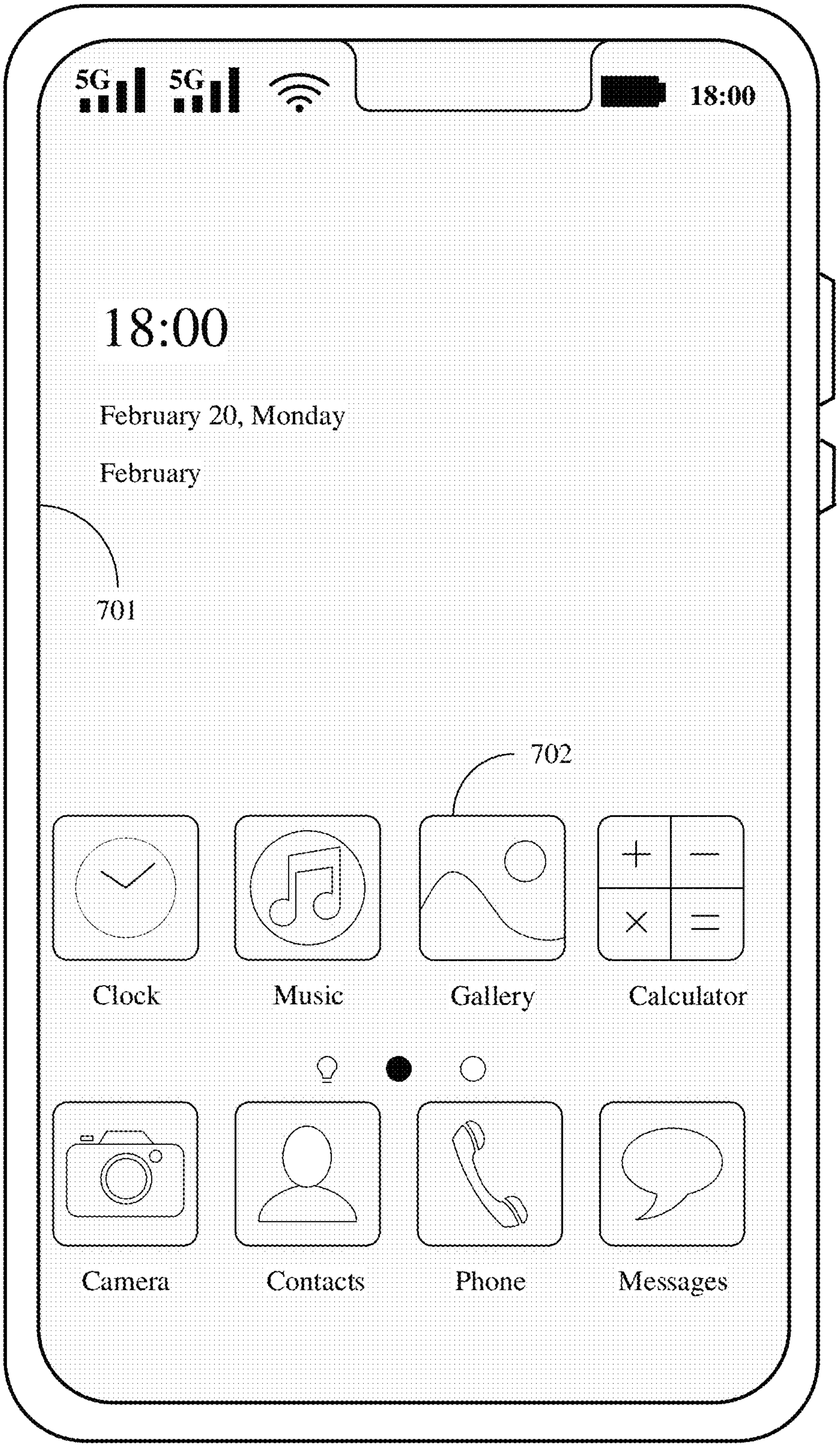
FIG. 13A to FIG. 13D are a schematic diagram of a graphical user interface according to an embodiment of this application.
Figure 13B:
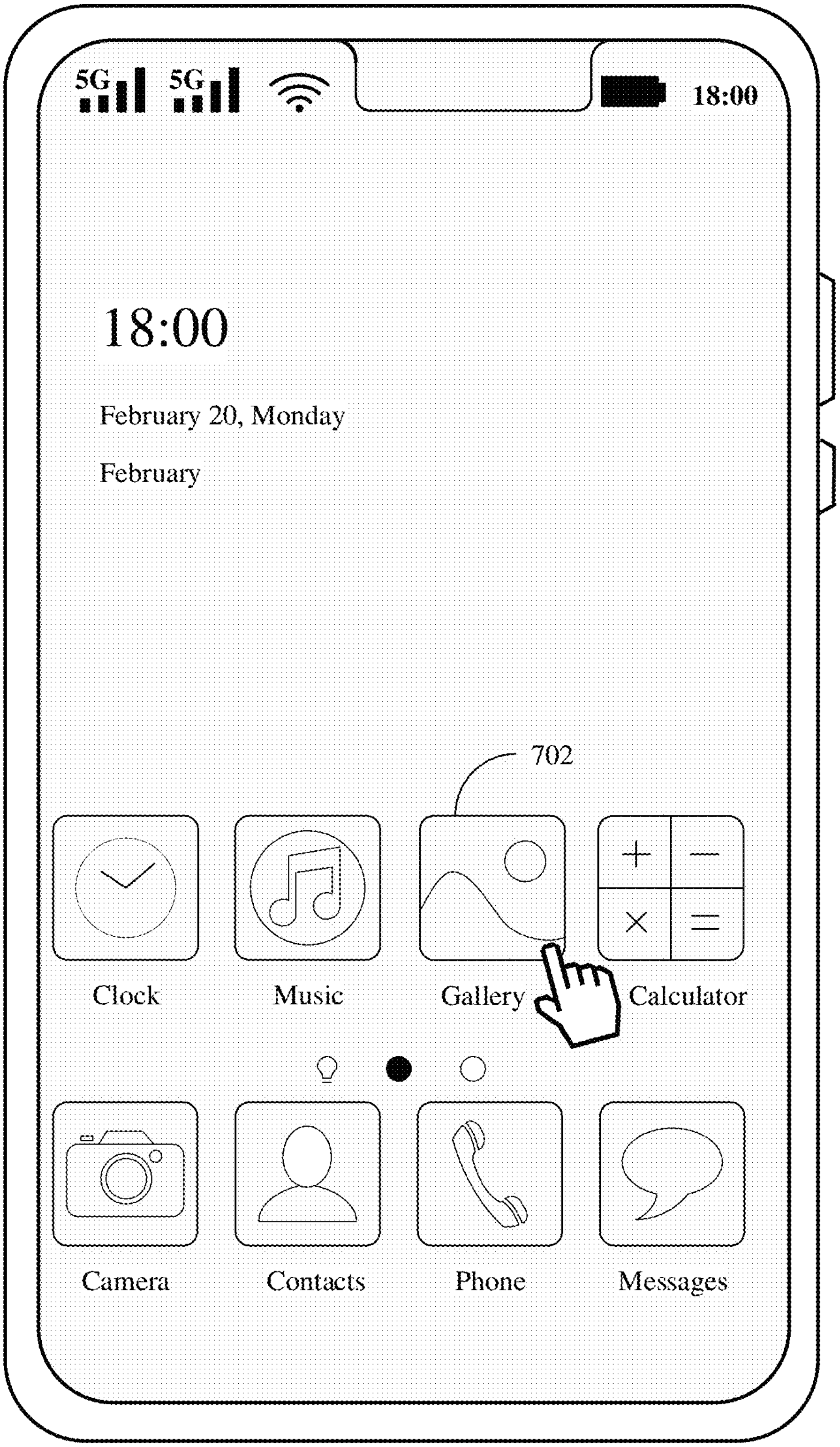
Figure 13C:
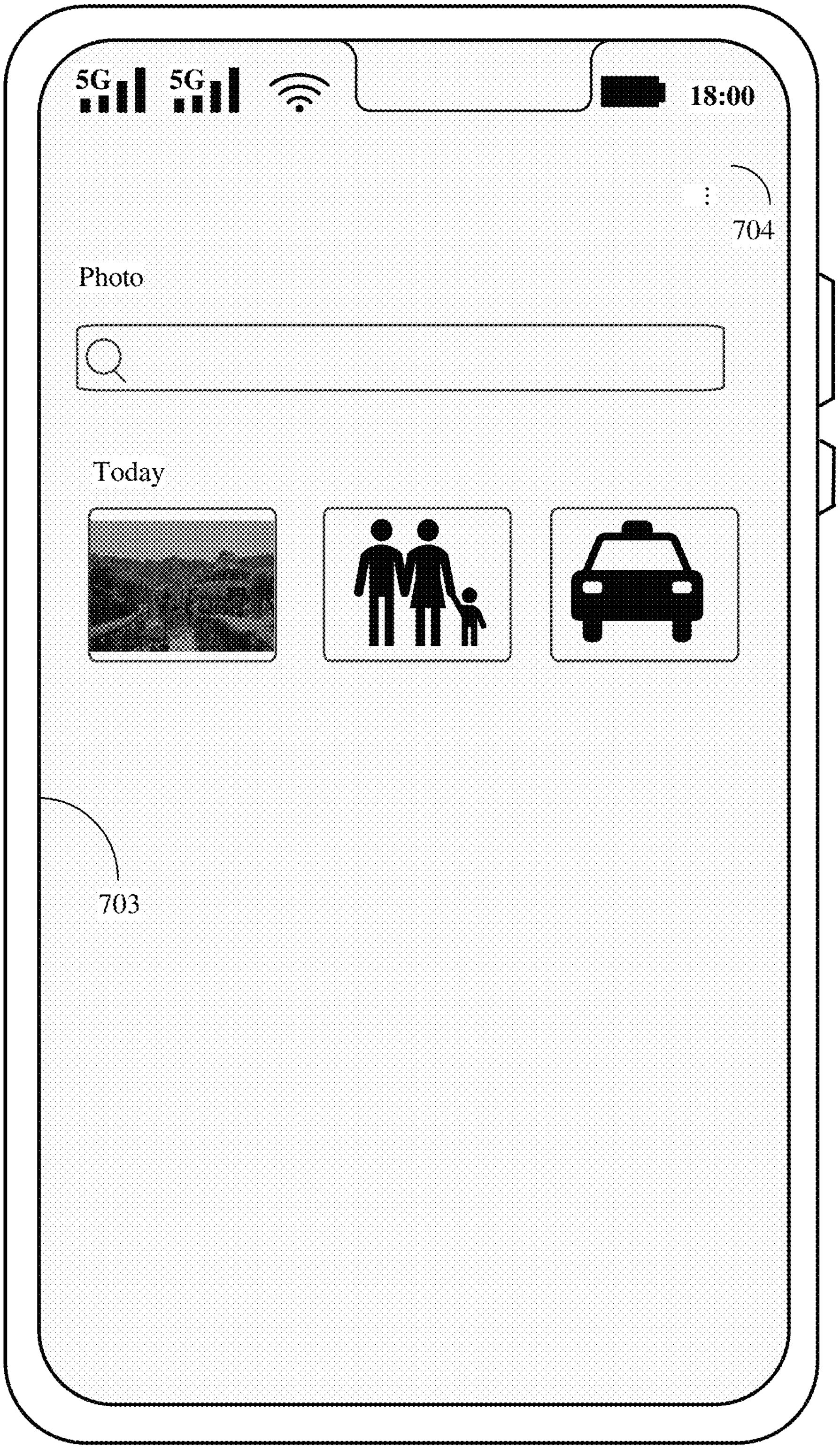
Figure 13D:
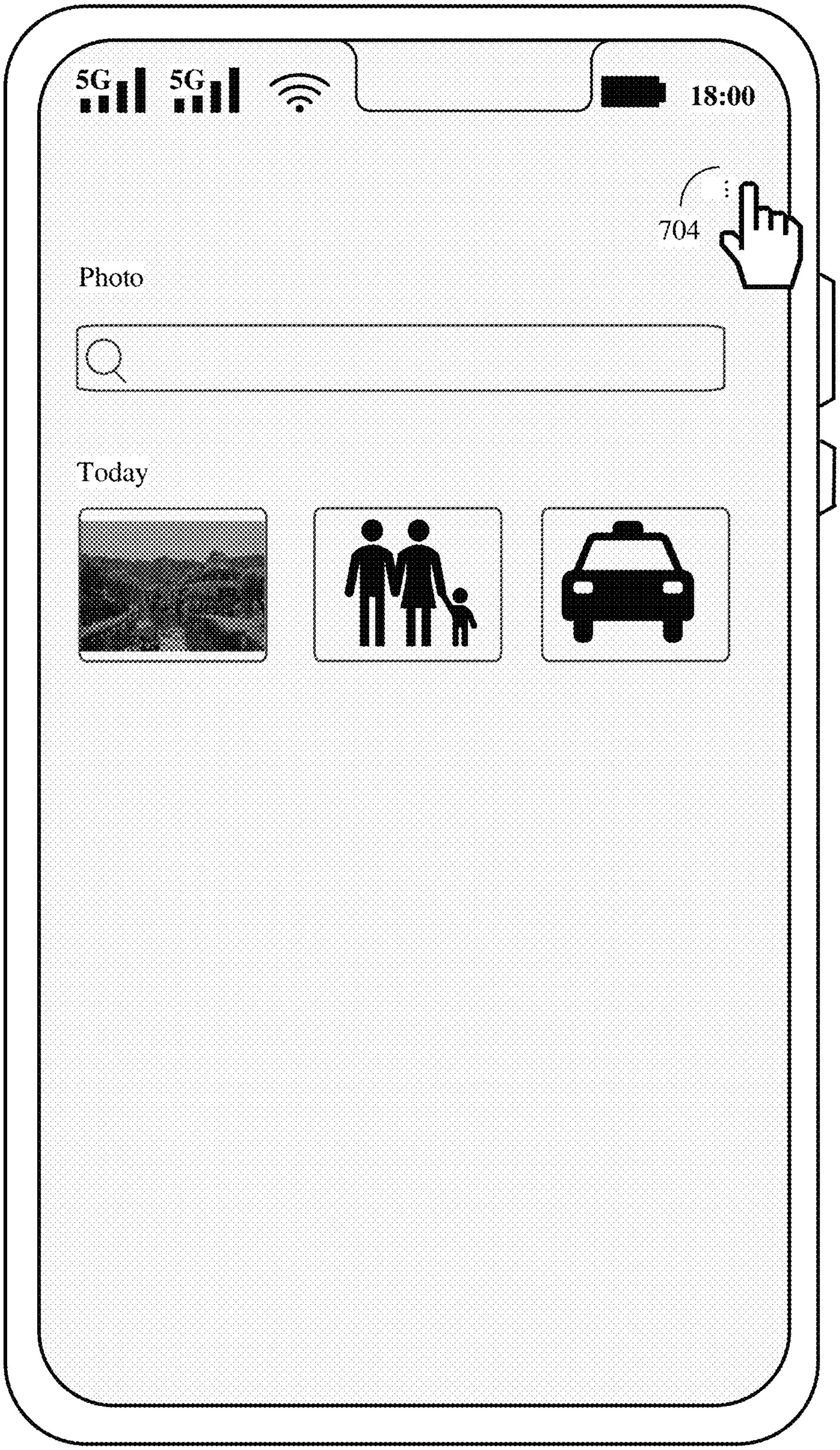
Figure 14A:
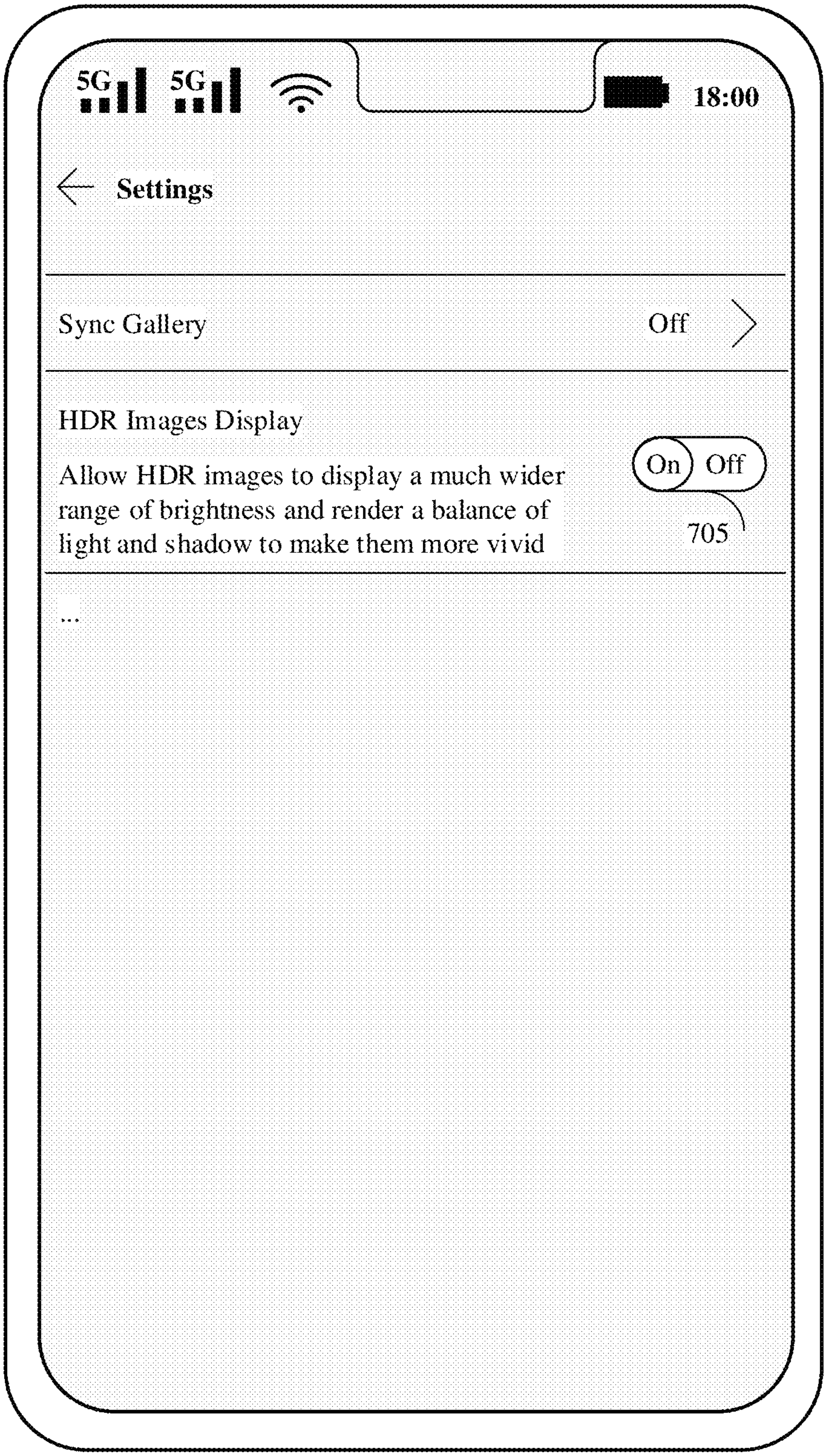
FIG. 14A to FIG. 14D are a schematic diagram of another graphical user interface according to an embodiment of this application.
Figure 14B:
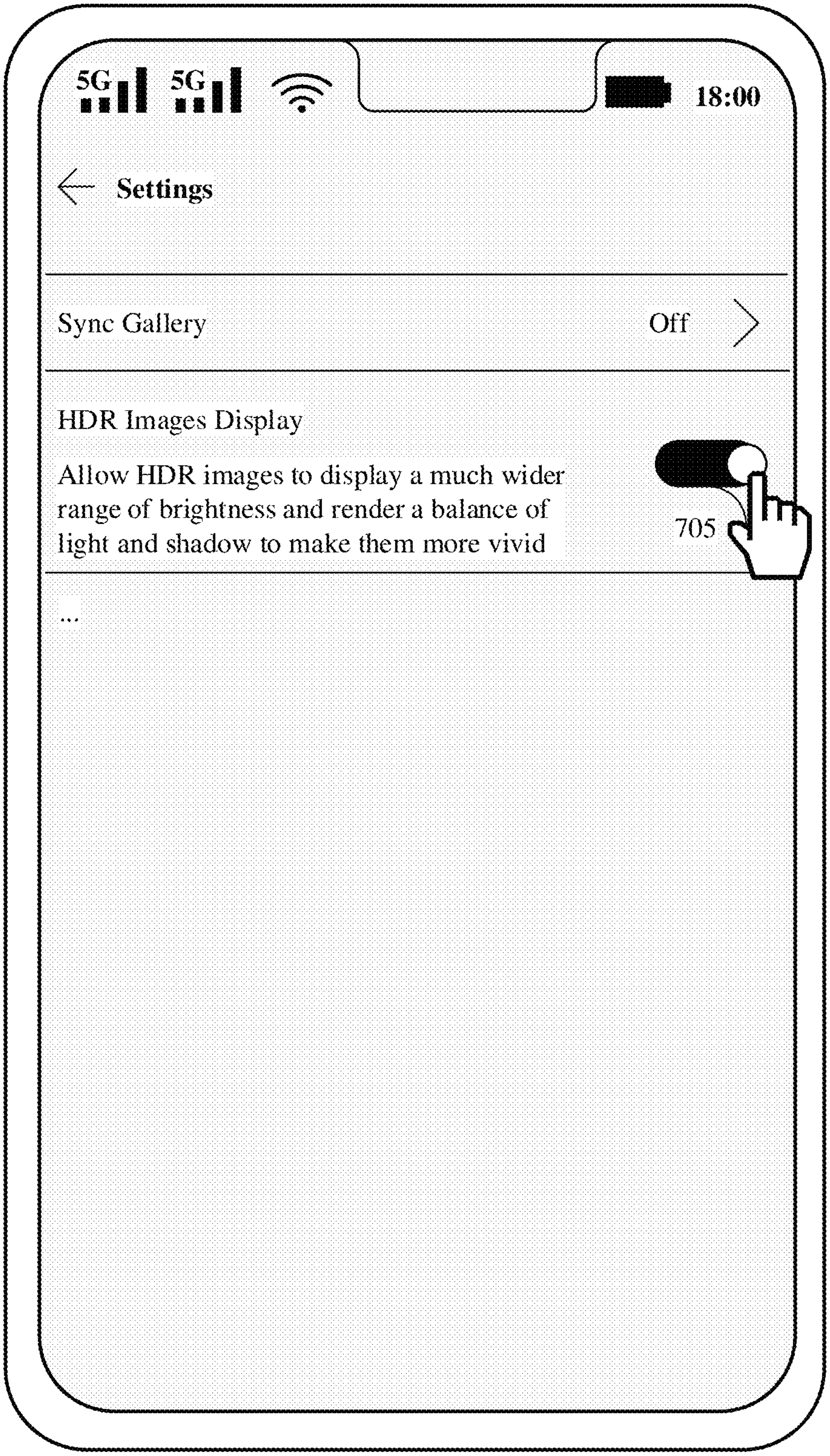
Figure 14C:
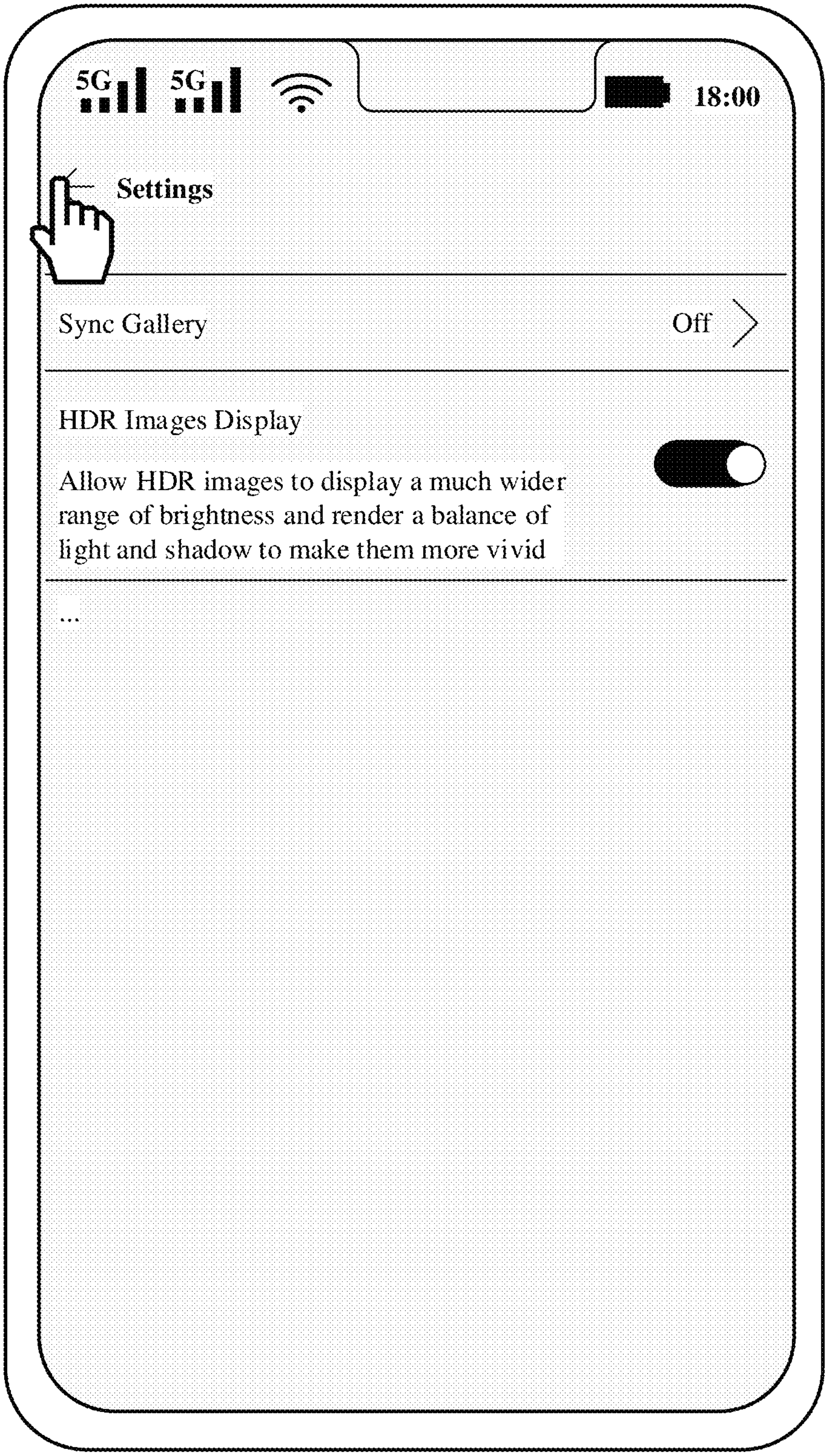
Figure 14D:
Figure 15A:
FIG. 15A and FIG. 15B are a schematic diagram of another graphical user interface according to an embodiment of this application.

For example, a graphical user interface (graphical user interface, GUI) as shown in FIG. 13A is a home screen 701 of an electronic device. The electronic device detects a tap operation performed on a control 702 of a gallery application on the home screen as shown in FIG. 13B. After the electronic device detects the tap operation performed on the control 702 of the gallery application on the home screen, a gallery display interface 703 is displayed as shown in FIG. 13C. The gallery display interface 703 includes thumbnails of all photos and a control 704 of more options. The electronic device detects the tap operation performed on the control 704 of the more options, as shown in FIG. 13D. After the electronic device detects the tap operation performed on the control 704 for the more options, a setting display interface is displayed as shown in FIG. 14A. The setting display interface includes a control for synchronization of gallery data and a control 705 for high dynamic display of an HDR image. The electronic device detects a tap operation performed on the control 705 for high dynamic display of the HDR image, as shown in FIG. 14B. After the electronic device detects that high dynamic display of the HDR image is enabled, the electronic device is triggered to perform the image processing method provided in embodiments of this application. The electronic device detects a tap operation performed on a return control, as shown in FIG. 14C. After the electronic device detects the tap operation performed on the return control, the electronic device exits the setting display interface and displays the gallery display interface. The gallery display interface includes a thumbnail 706, as shown in FIG. 14D. The electronic device detects a tap operation performed on the thumbnail 706, as shown in FIG. 15A. After detecting the tap operation performed on the thumbnail 706, the electronic device performs the image processing method provided in embodiments of this application, to adjust brightness of a display screen of the electronic device to a target brightness value and display an image on which tone mapping processing is performed, as shown in FIG. 15B.

When adjusting the brightness of the display screen to the target brightness value and displaying the image on which tone mapping processing is performed, the electronic device may directly display the image on which tone mapping processing is performed. Alternatively, the electronic device may display, in a jump manner or a slow variation display manner, the image on which tone mapping processing is performed. The following describes a plurality of different display methods by using examples.

Example 1: The image on which tone mapping processing is performed is directly displayed.

Figure 15B:
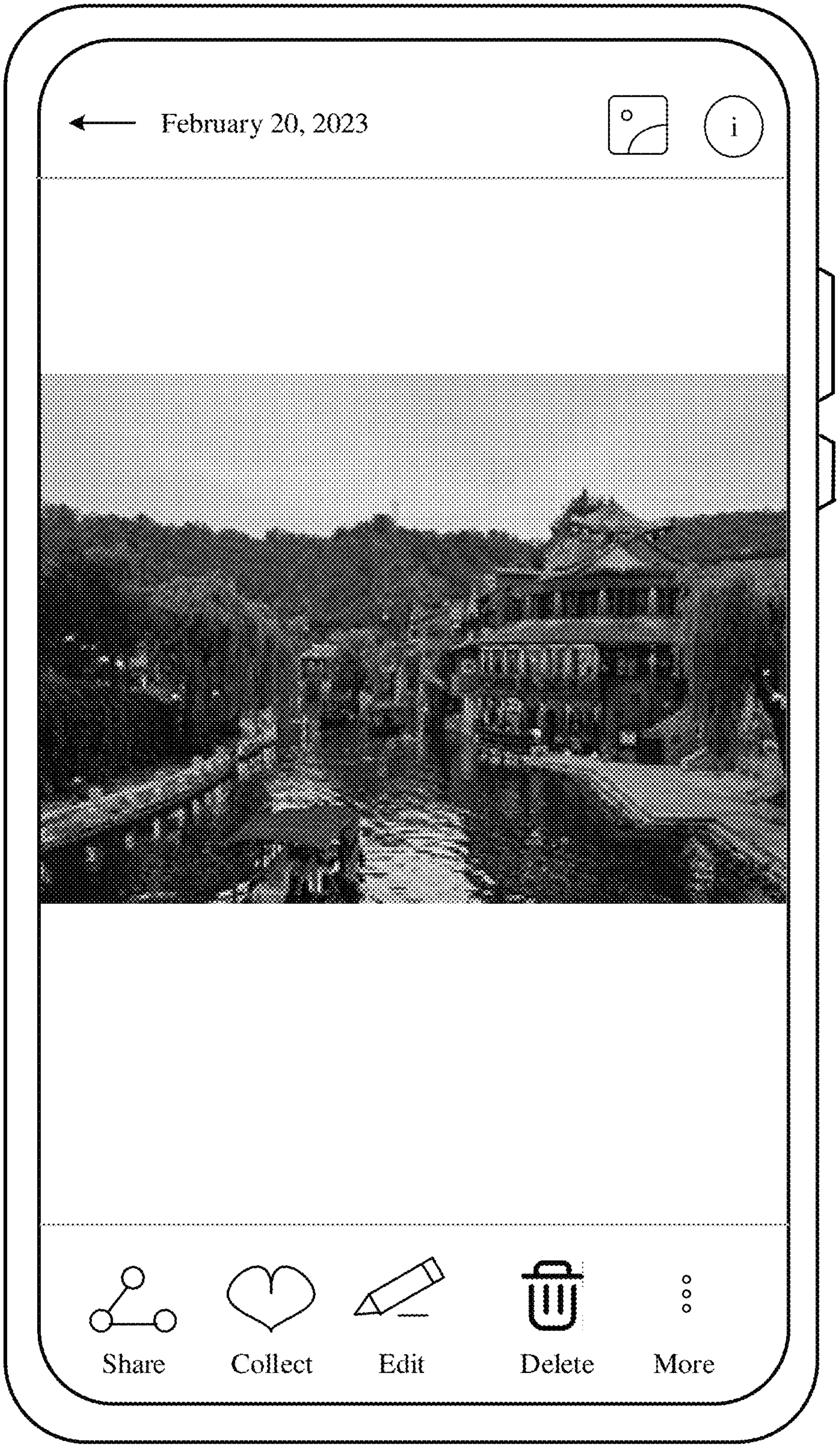

For example, when detecting the tap operation performed on the thumbnail 706, the electronic device may directly adjust the brightness of the display screen to the target brightness value, and display the image as shown in FIG. 15B.

Example 2: The image on which tone mapping processing is performed is displayed in a jump display manner.

It should be understood that in the jump display manner, the electronic device does not present a change process of display from an image 1 to an image 2. It may be understood that the jump display manner is a process in which the electronic device displays the image 1 at a first moment, switches the image 1 to the image 2, and displays the image 2 at a second moment. For example, the jump display manner is similar to a process of playing a slide show.

Figure 16A:
FIG. 16A to FIG. 16C are a schematic diagram of another graphical user interface according to an embodiment of this application.
Figure 16B:
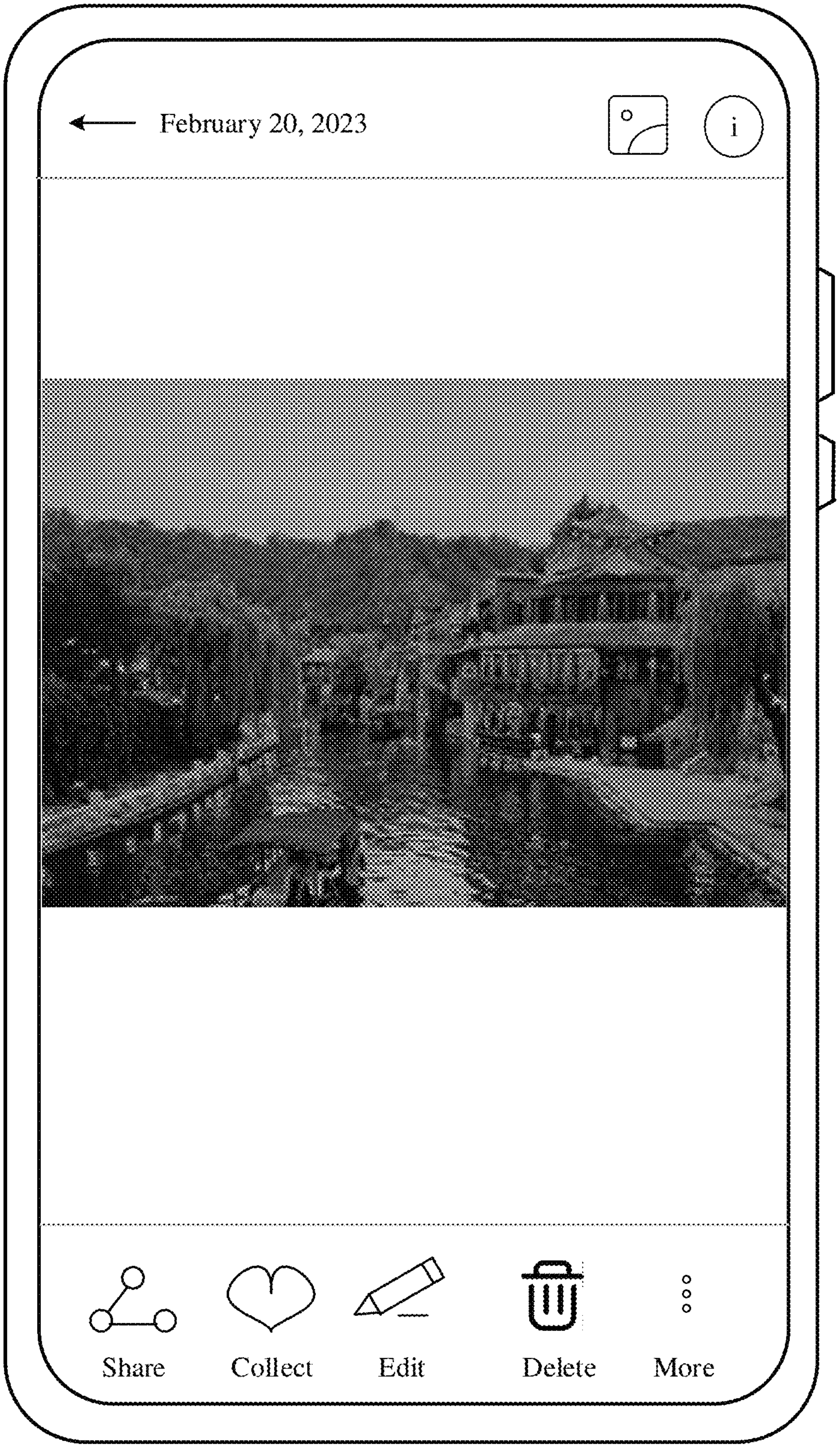
Figure 16C:
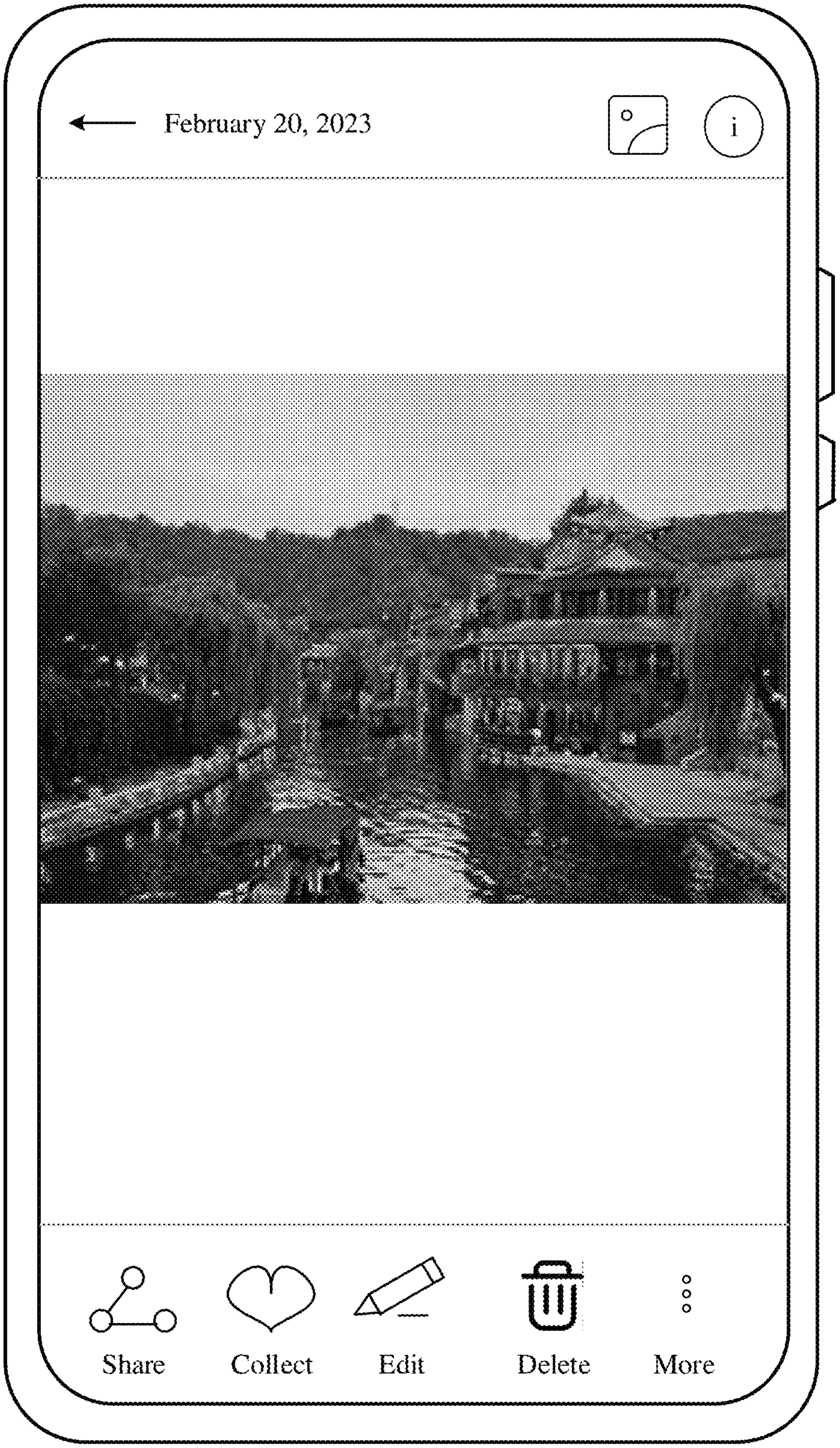

For example, the electronic device detects the tap operation performed on the thumbnail 706, as shown in FIG. 16A. After detecting the tap operation performed on the thumbnail 706, the electronic device first displays an image on which tone mapping processing is not performed. As shown in FIG. 16B, after a few milliseconds, the electronic device may display the image on which tone mapping processing is performed, as shown in FIG. 16C.

Optionally, when the electronic device displays the image as shown in FIG. 16B, the brightness of the display screen may be a current brightness value. Alternatively, the brightness of the display screen may be the target brightness value.

Example 3: The image on which tone mapping processing is performed is displayed in the slow variation display manner.

Figure 17A:
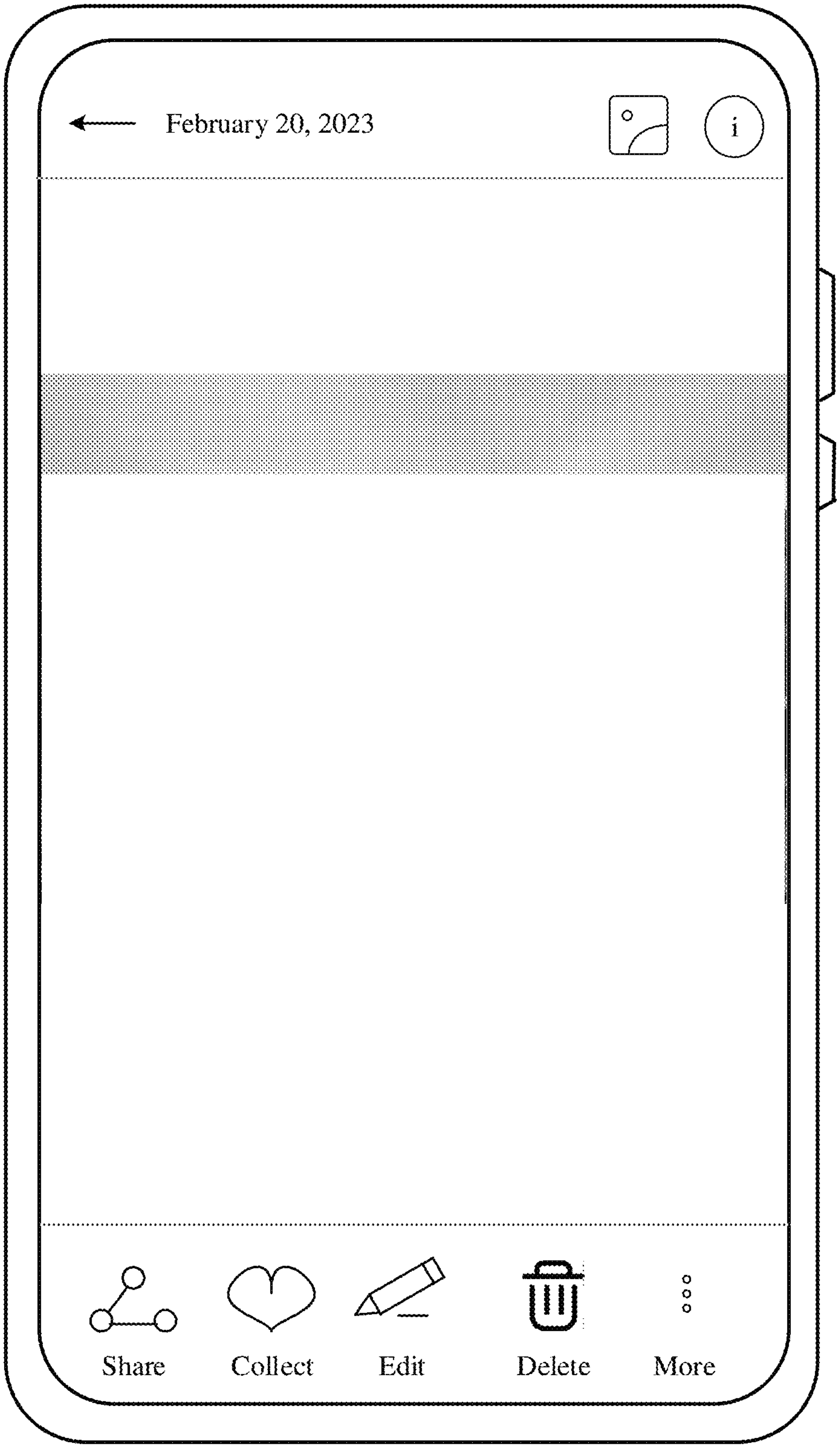
FIG. 17A to FIG. 17E are a schematic diagram of another graphical user interface according to an embodiment of this application.
Figure 17B:
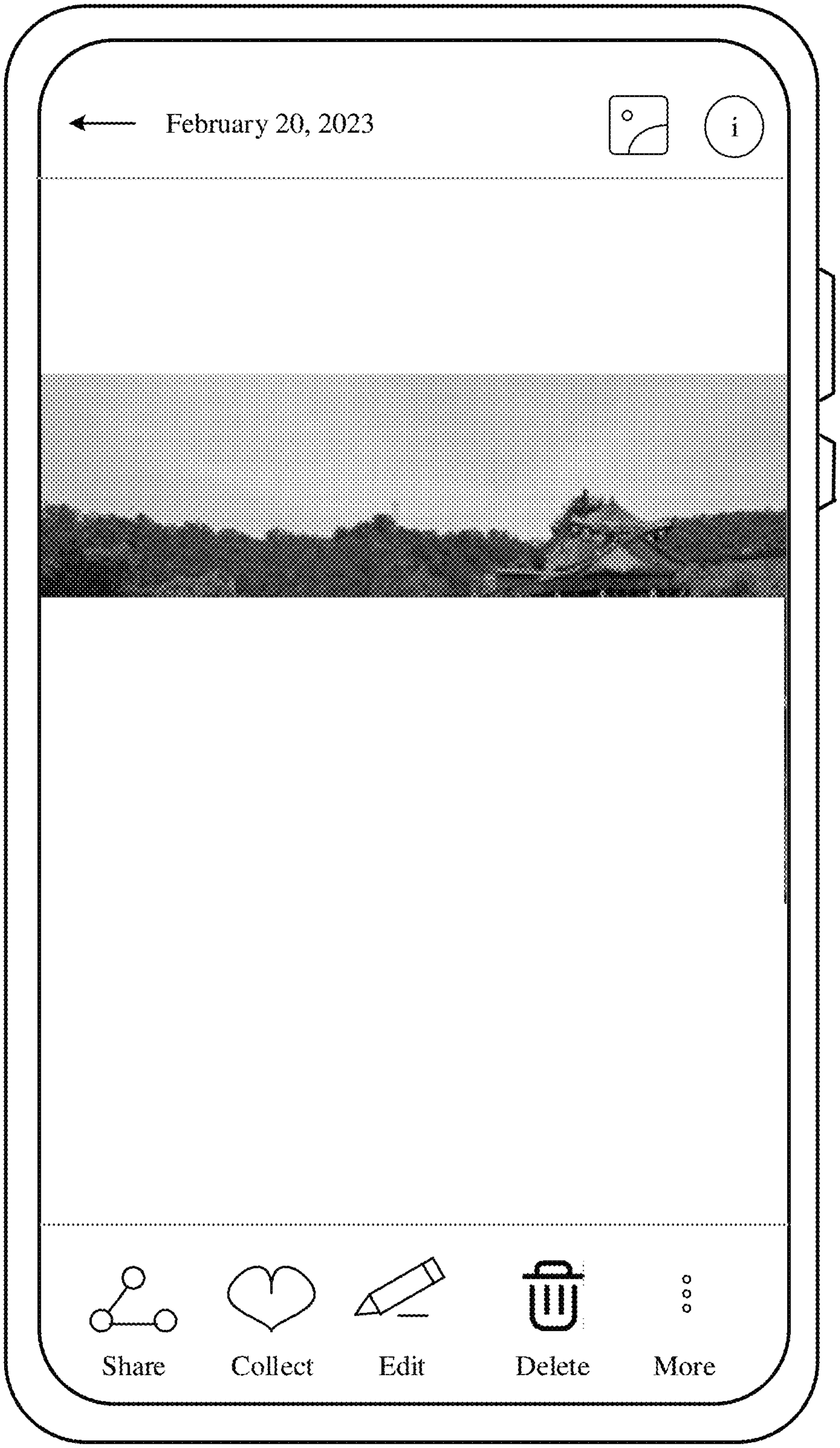
Figure 17C:
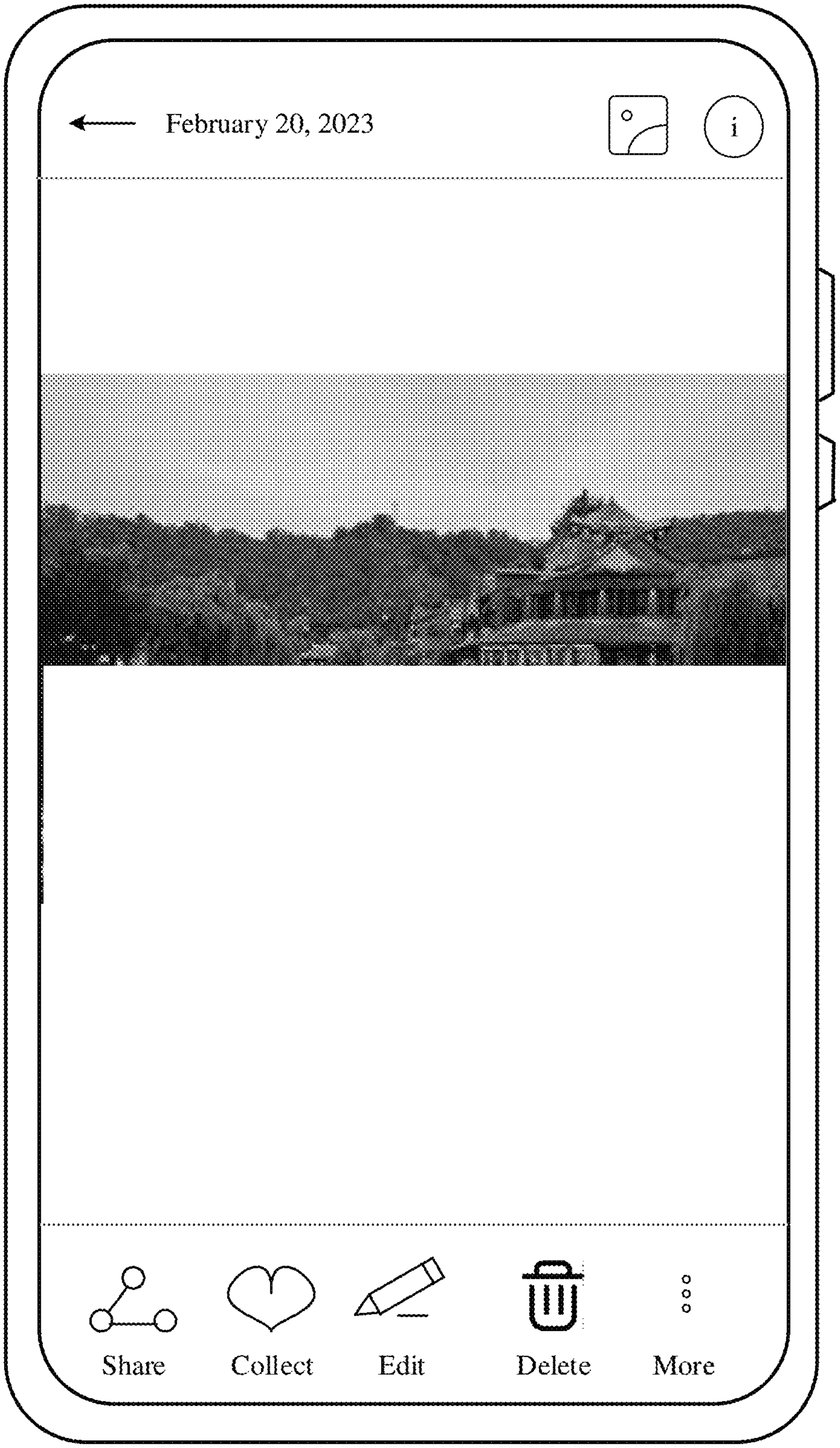
Figure 17D:
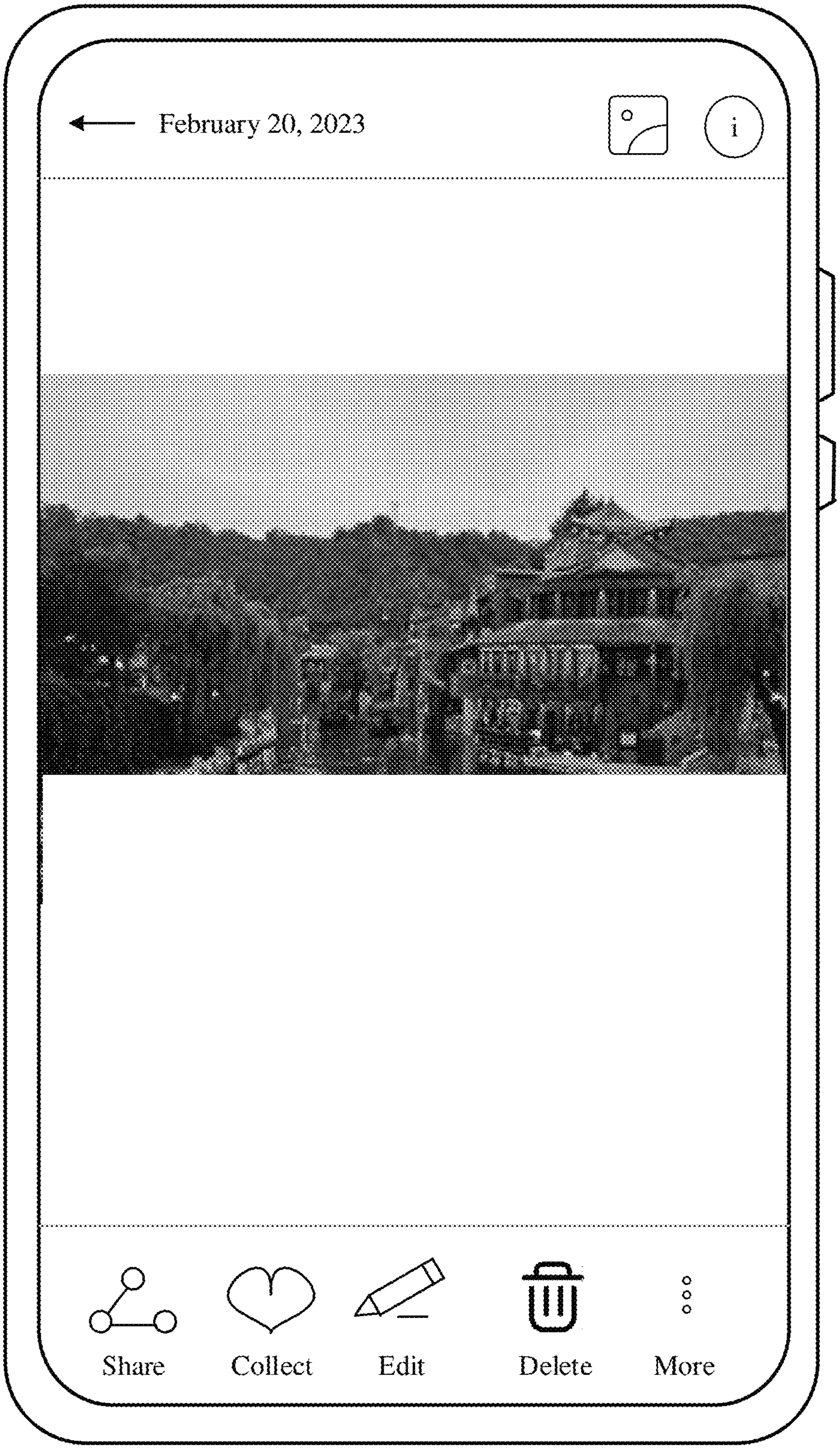
Figure 17E:
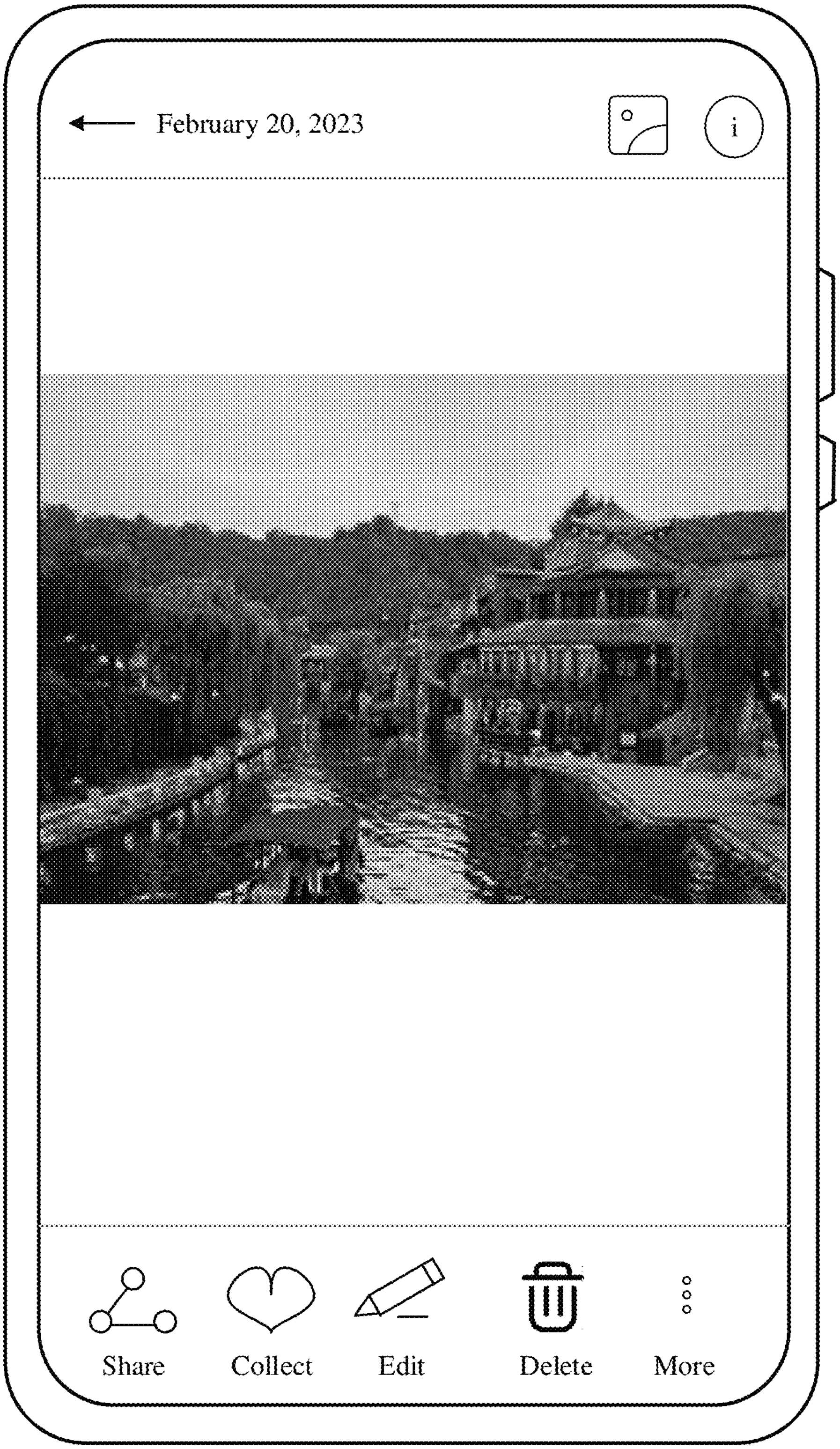

Optionally, the electronic device may adjust the display screen to the target brightness value, and display line by line the image on which tone mapping processing is performed. For example, the electronic device may first display content of a first line of the image on which tone mapping processing is performed, as shown in FIG. 17A. The electronic device may first display content of a second line of the image on which tone mapping processing is performed, as shown in FIG. 17B. The electronic device may first display content of a third line of the image on which tone mapping processing is performed, as shown in FIG. 17C. The electronic device may first display content of a fourth duration line of the image on which tone mapping processing is performed, as shown in FIG. 17D. Finally, the electronic device displays, as a whole, the image on which tone mapping processing is performed, as shown in FIG. 17E.

Optionally, the electronic device may display, in a single layer by rendering, the image on which tone mapping processing is performed.

Figure 18A:
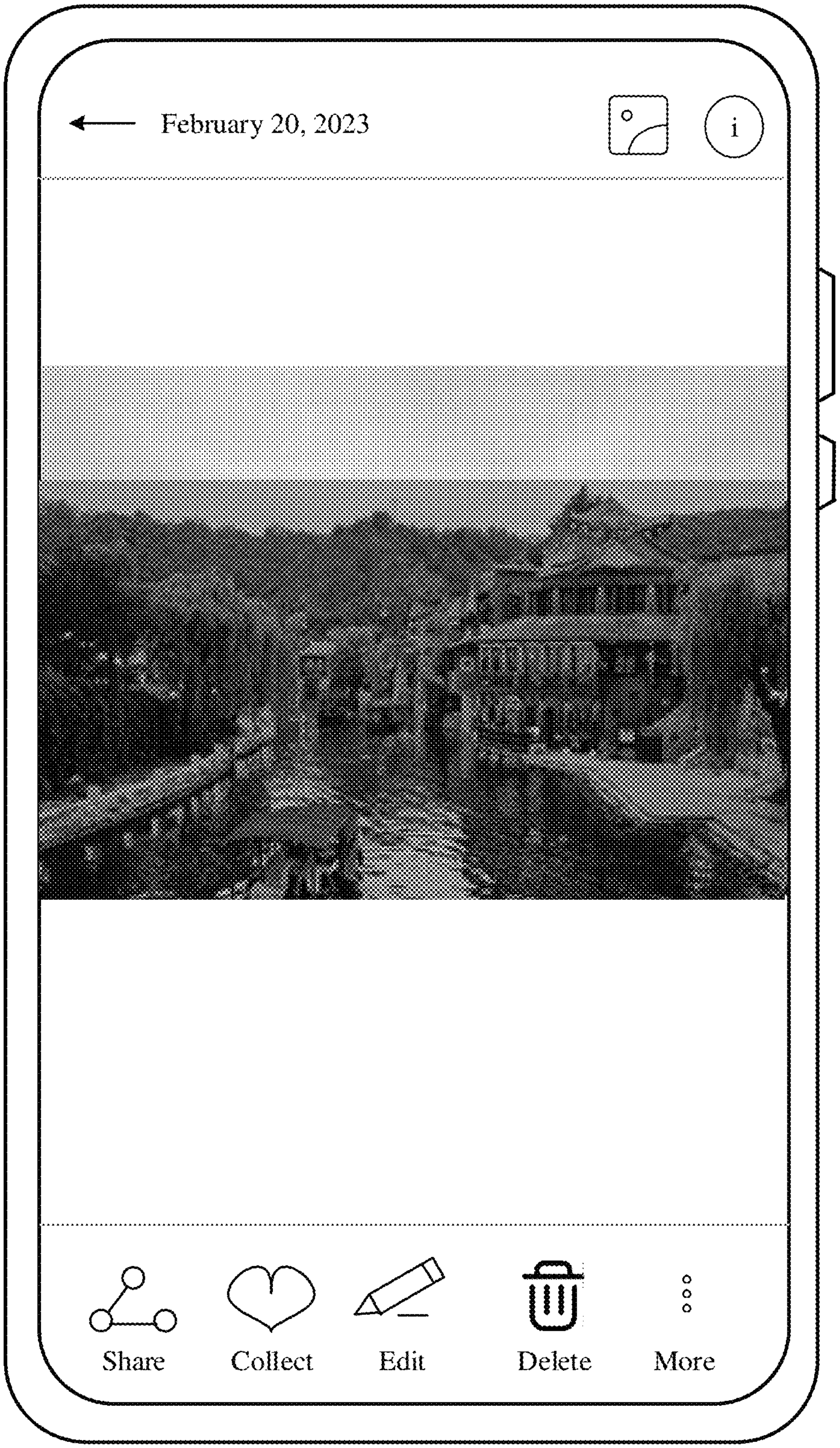
FIG. 18A to FIG. 18E are a schematic diagram of another graphical user interface according to an embodiment of this application.
Figure 18B:
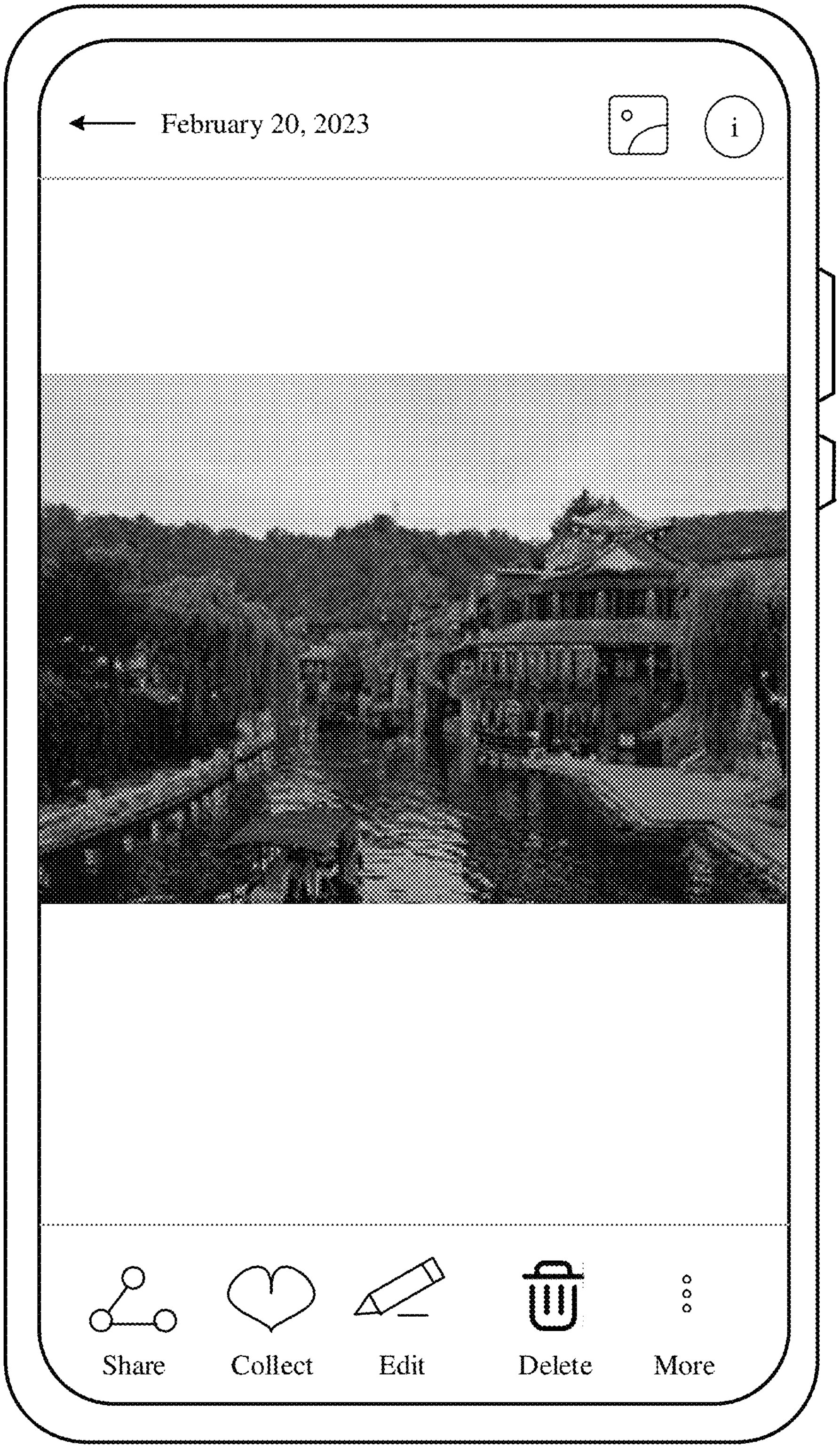
Figure 18C:
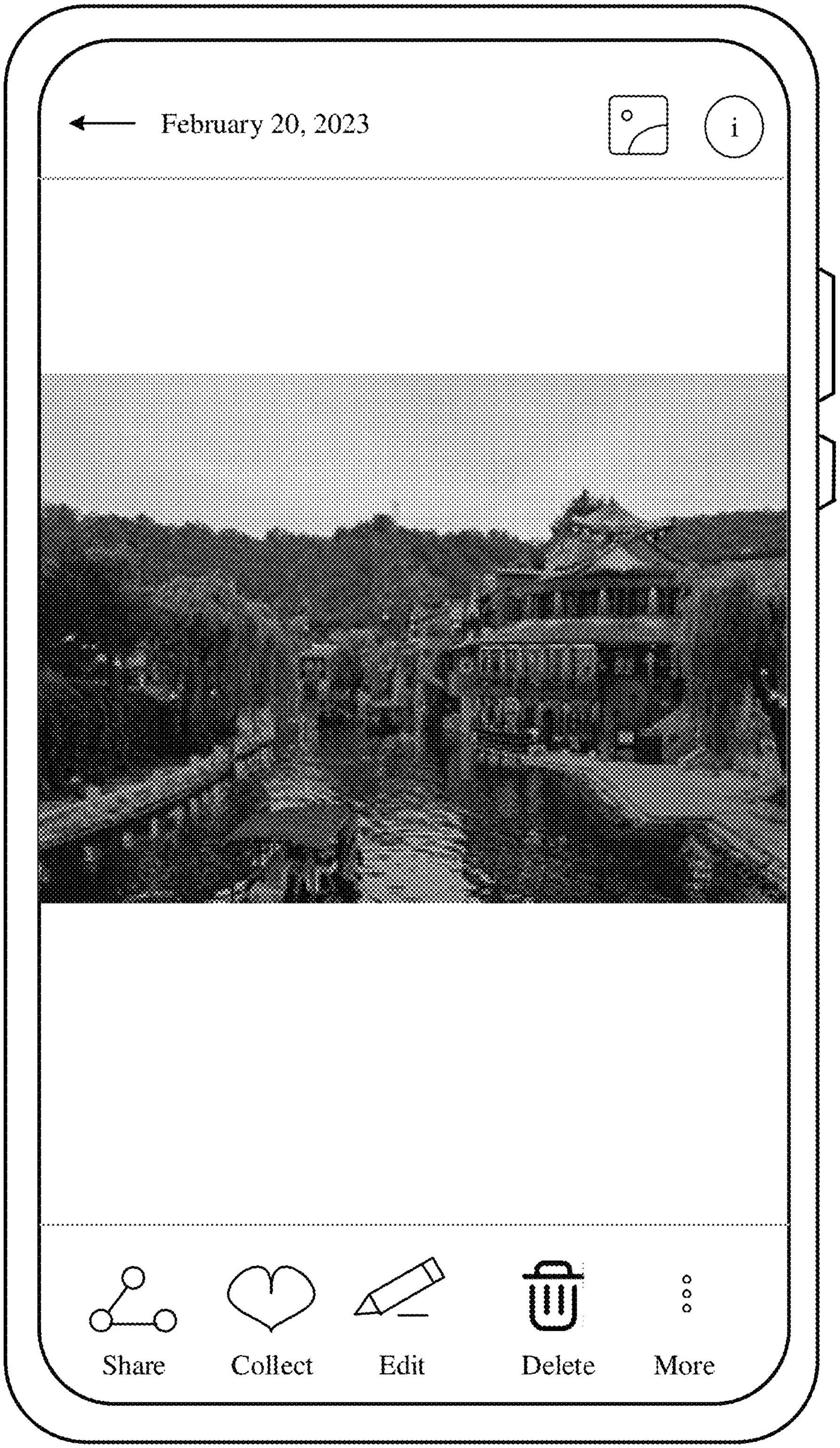
Figure 18D:
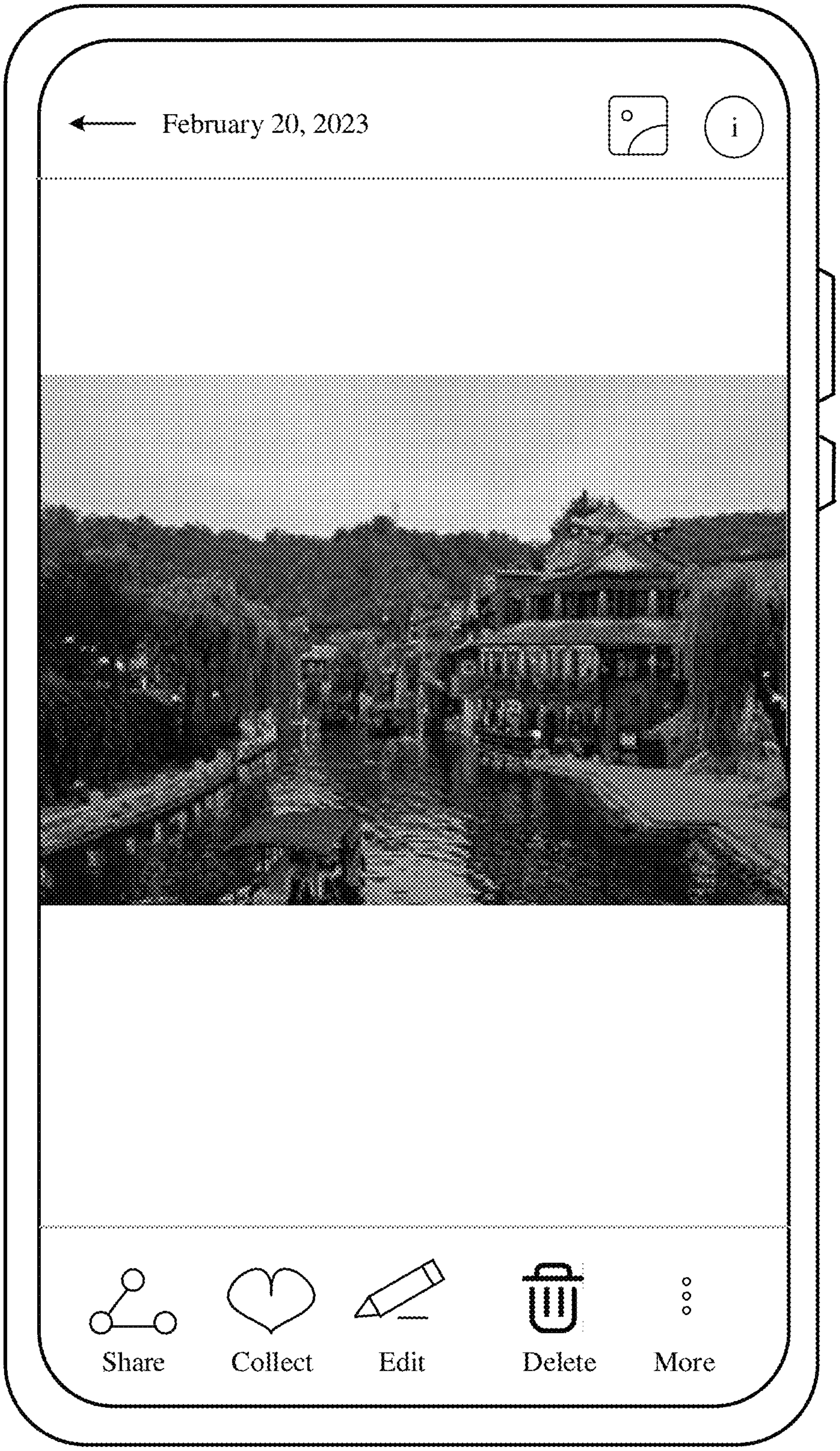
Figure 18E:
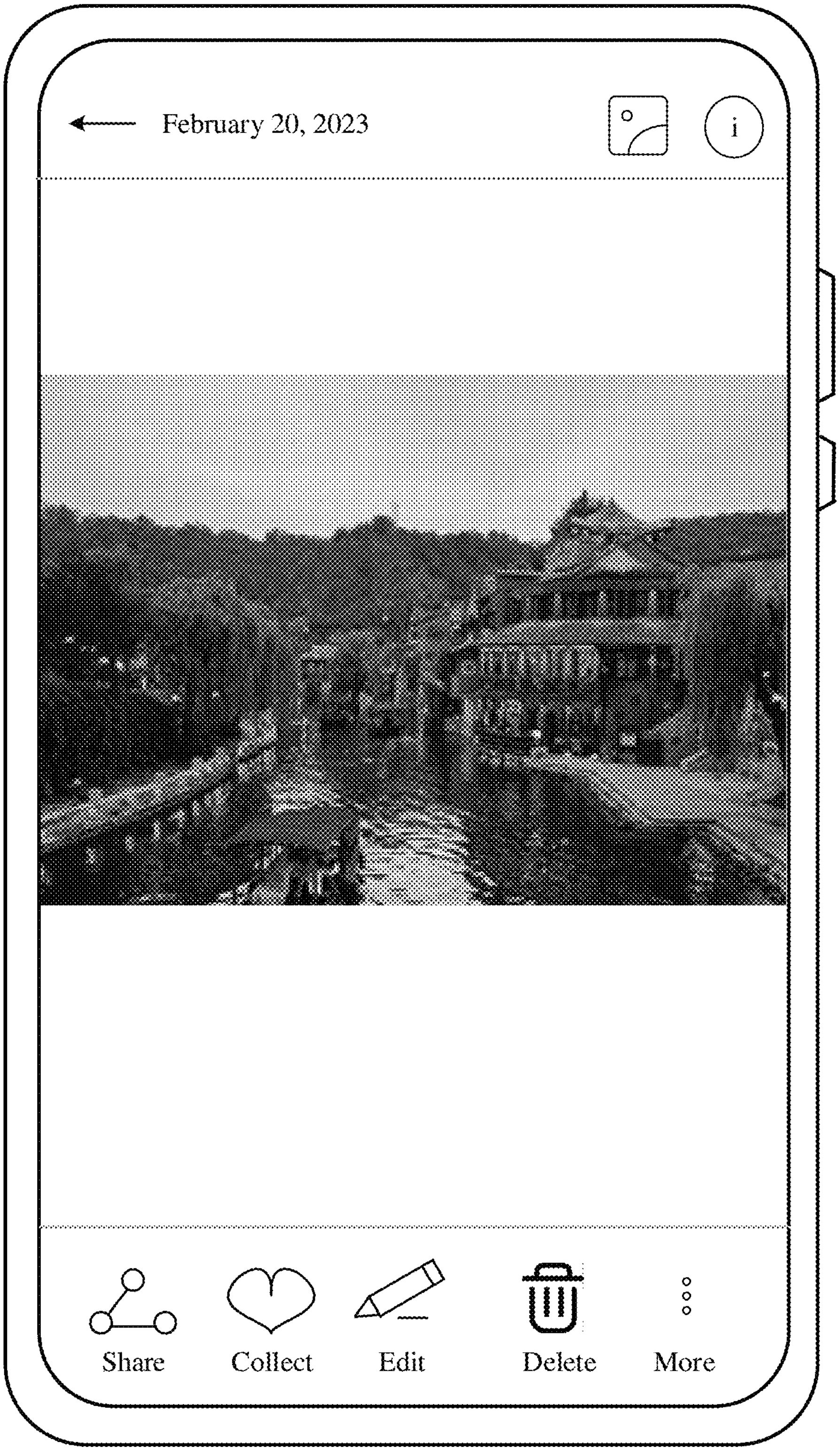

For example, the display interface of the electronic device may include complete image content information, and the electronic device processes line by line from top to bottom, detail information in the image on which tone mapping processing is not performed. The image displayed by the electronic device includes an image zone in a first line of the image on which tone mapping processing is performed, and another zone in the image on which tone mapping processing is not performed, as shown in FIG. 18A. The image displayed by the electronic device includes an image zone in first two lines of the image on which tone mapping processing is performed, and another zone in the image on which tone mapping processing is not performed, as shown in FIG. 18B. The image displayed by the electronic device includes an image zone in first three lines of the image on which tone mapping processing is performed, and another zone in the image on which tone mapping processing is not performed, as shown in FIG. 18C. The image displayed by the electronic device includes an image zone in first four lines of the image on which tone mapping processing is performed, and another zone in the image on which tone mapping processing is not performed, as shown in FIG. 18D. Finally, the electronic device displays, as a whole, the image on which tone mapping processing is performed, as shown in FIG. 18E.

Optionally, the electronic device may display, in two layers, the image on which tone mapping processing is performed.

For example, the display interface of the electronic device may include two layers. An upper layer of the two layers may display the image on which tone mapping processing is performed, and a lower layer of the two layers may display the image on which tone mapping processing is not performed. First, transparency of the image on which tone mapping processing is performed and that is in the upper layer may be 100%, and transparency of the image on which tone mapping processing is not performed and that is in the lower layer may be 0%, that is, the electronic device displays the image on which tone mapping processing is not performed. In a process of displaying the image, after adjusting the brightness of the display screen to the target brightness value, the electronic device gradually adjusts, from 100% to 0, the transparency of the image on which tone mapping processing is performed and that is in the upper layer, adjust, from 0 to 100%, the transparency of the image on which tone mapping processing is not performed and that is in the lower layer, and finally display, in the display interface, the image on which tone mapping processing is performed.

Figure 19A:
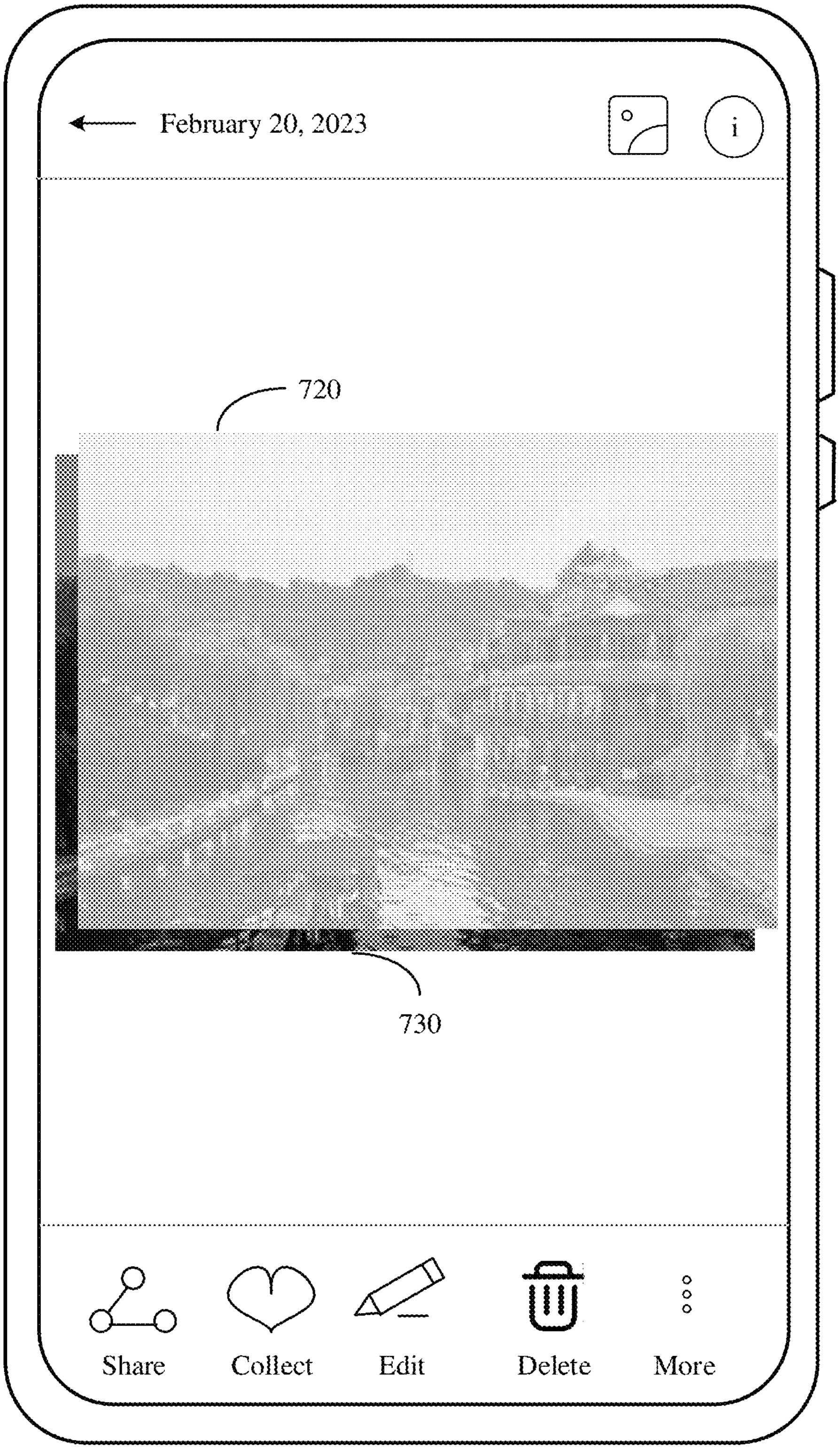
FIG. 19A and FIG. 19B are a schematic diagram of another graphical user interface according to an embodiment of this application.
Figure 19B:
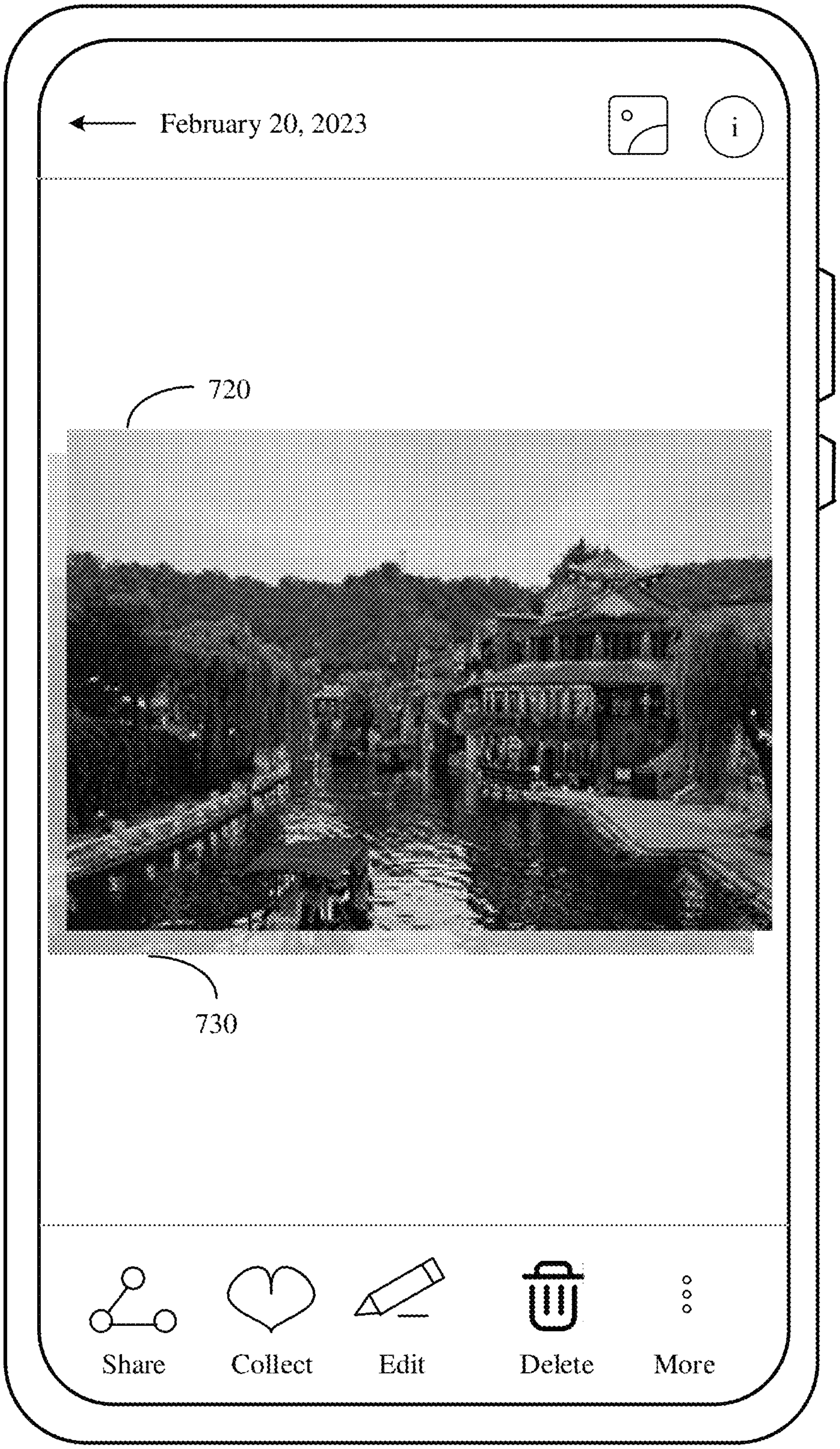

For example, as shown in FIG. 19A, first, the transparency of the image 720 on which tone mapping processing is performed and that is in the upper layer may be 100%, and the transparency of the image 730 on which tone mapping processing is not performed and that is in the lower layer may be 0%. During display, the transparency of the upper layer and the lower layer is adjusted, to enable the transparency of the image 720 on which tone mapping processing is performed and that is in the upper layer to be 0; and the transparency of the image 730 on which tone mapping processing is not performed and that is in the lower layer is 100%, as shown in FIG. 19B. Optionally, the display interface may include two layers. The upper layer of the two layers may display the image on which tone mapping processing is performed, and a lower layer 14 of the two layers may display the image on which tone mapping processing is not performed. During displaying, after adjusting the brightness of the display screen to the target brightness value, the electronic device gradually adjusts, from 100% to 0, the transparency of the image on which tone mapping processing is performed and that is in the upper layer. In addition, the transparency of the image on which tone mapping processing is not performed is not adjusted, finally, the image on which tone mapping processing is performed is displayed in the display interface.

Optionally, the display interface may include two layers. The upper layer of the two layers may display the image on which tone mapping processing is not performed, and the lower layer of the two layers may display the image on which tone mapping processing is performed. First, the transparency of the image on which tone mapping processing is not performed and that is in the upper layer may be 0, and the transparency of the image on which tone mapping processing is performed and that is in the lower layer may be 100%, that is, the electronic device displays the image on which tone mapping processing is not performed. During displaying, after adjusting the brightness of the display screen to the target brightness value, the electronic device gradually adjusts, from 0 to 100%, the transparency of the image on which tone mapping processing is not performed and that is in the upper layer, adjust, from 100% to 0, the transparency of the image on which tone mapping processing is performed and that is in the lower layer, and finally display, in the display interface, the image on which tone mapping processing is performed.

Optionally, the foregoing describes the two layers by using examples. The two layers may be multiple layers, and this is not limited in this application.

Optionally, in the process of triggering, in other means, the electronic device to perform the image processing method provided in embodiments of this application, the image on which tone mapping processing is performed may be displayed in the manners shown in FIG. 15A to FIG. 20E.

In another possible implementation, when the electronic device detects the tap operation performed on the control in an image display interface, the electronic device is triggered to perform the image processing method provided in embodiments of this application.

Figure 20A:
FIG. 20A to FIG. 20E are a schematic diagram of another graphical user interface according to an embodiment of this application.
Figure 20B:
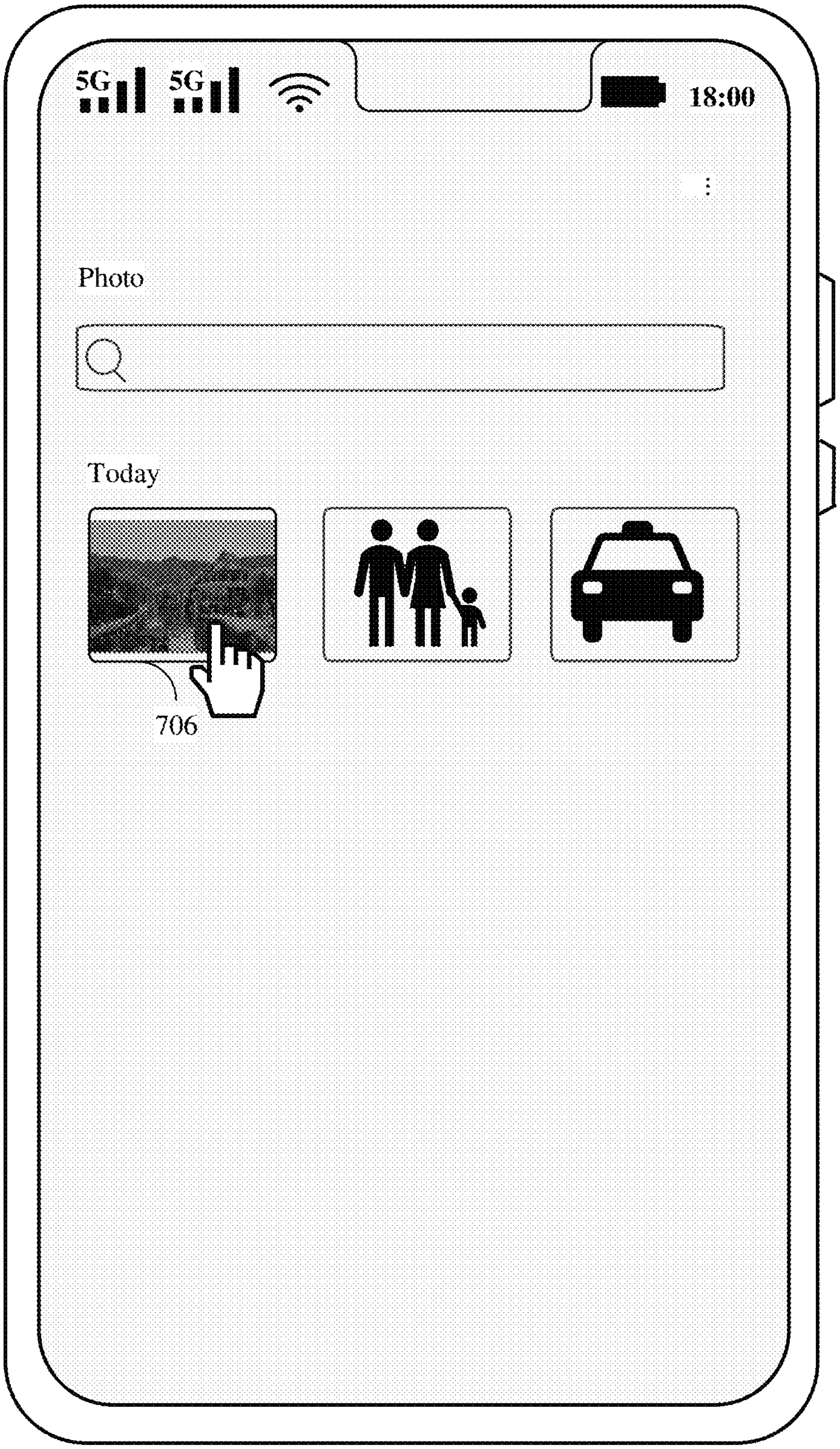
Figure 20C:
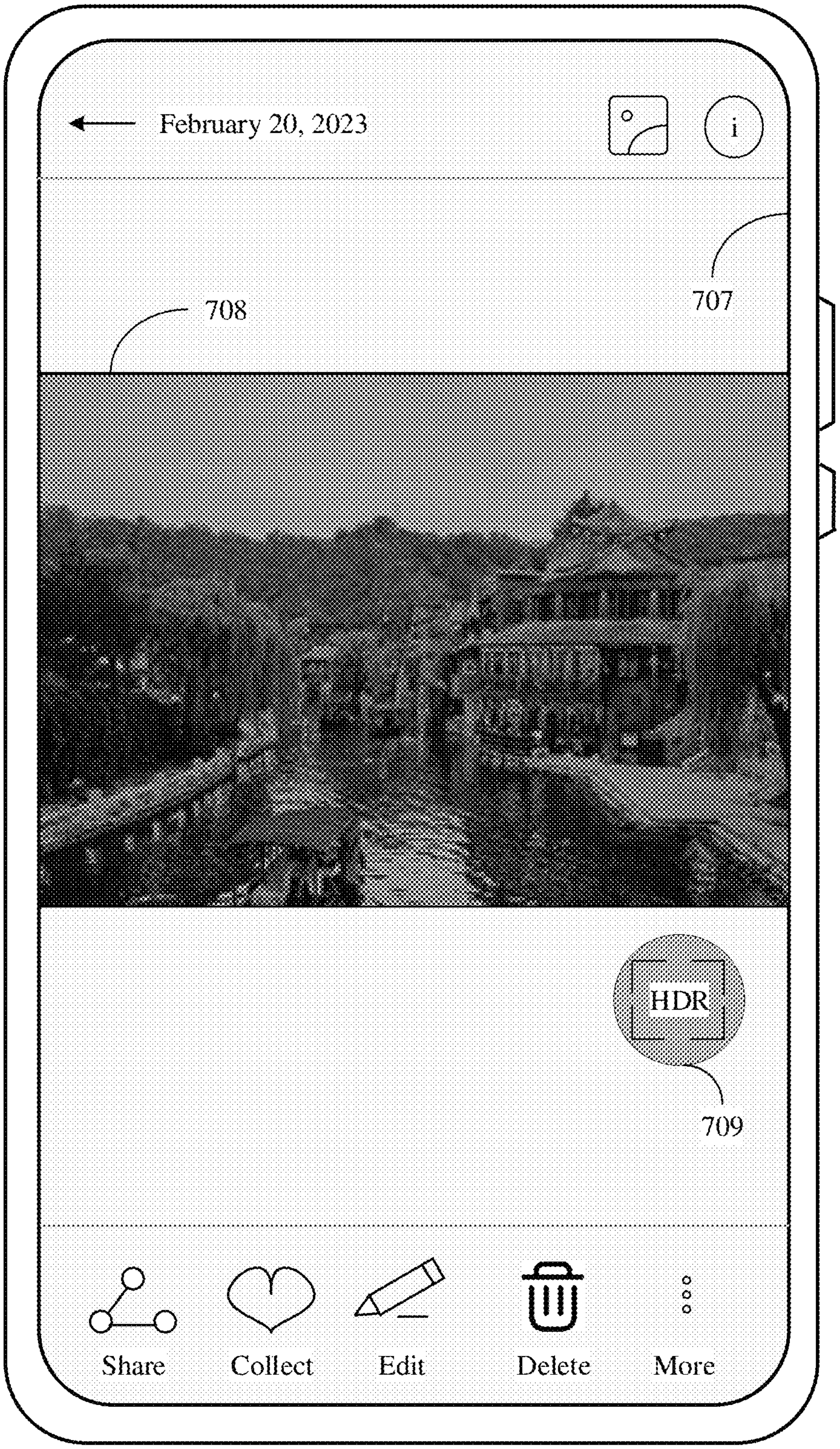
Figure 20D:
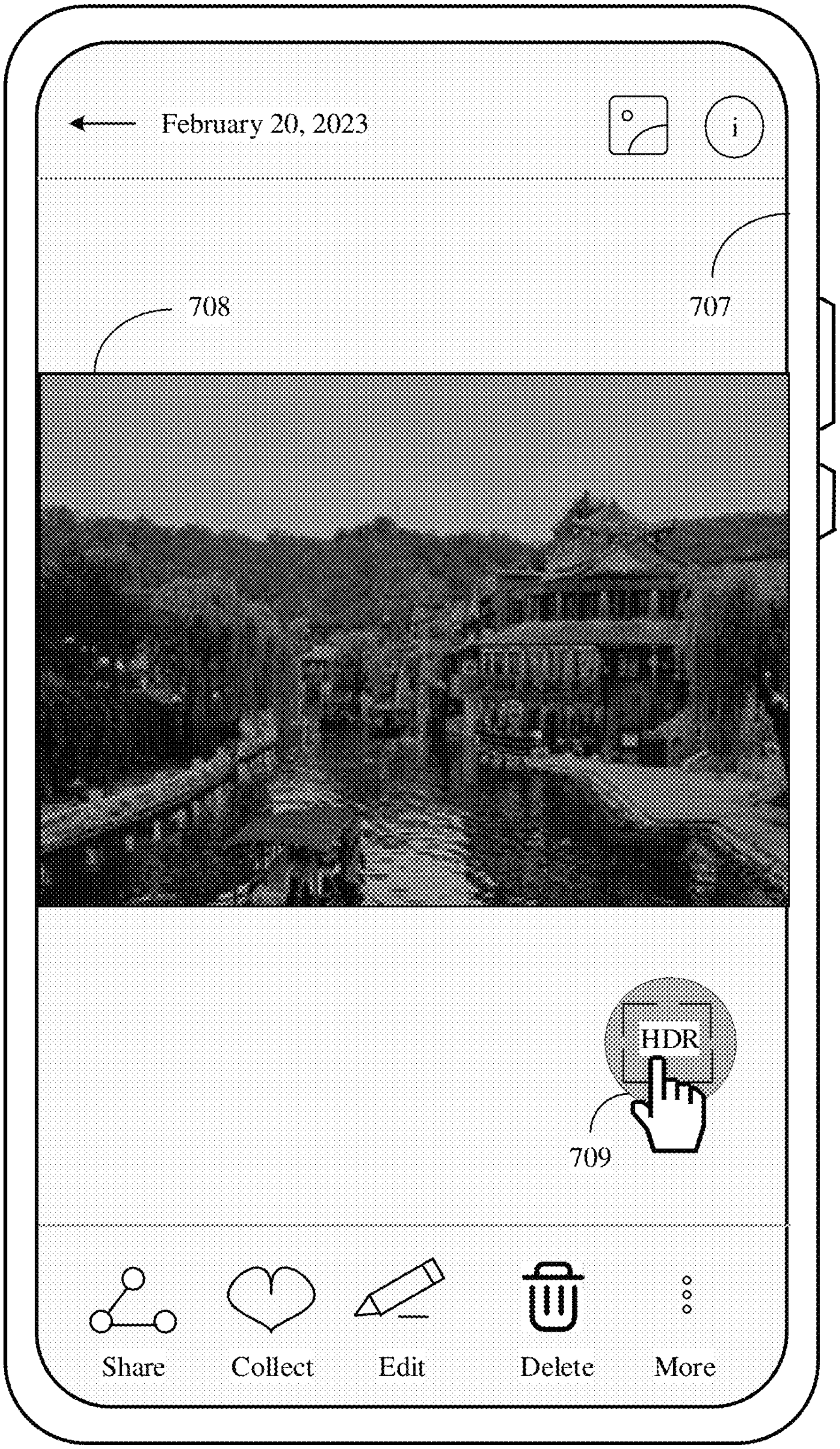
Figure 20E:
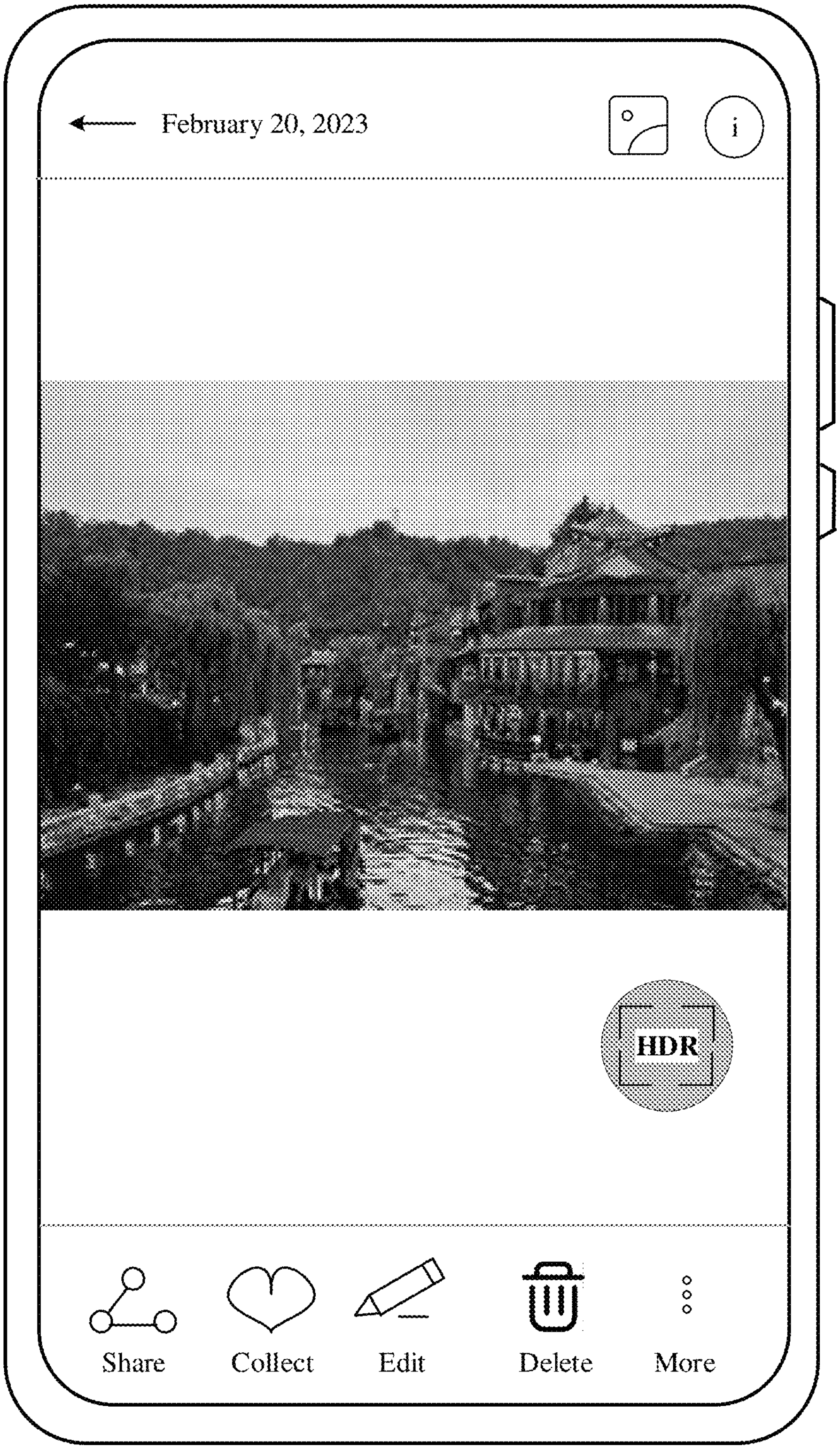

For example, the display screen of the electronic device is the current brightness value. When detecting the tap operation performed on the control of the gallery application, the electronic device displays the gallery display interface. The gallery display interface includes the thumbnail 706, as shown in FIG. 20A. The electronic device detects a tap operation performed on the thumbnail 706, as shown in FIG. 20B. In response to the tap operation, the electronic device displays an image display interface 707 corresponding to the thumbnail 706. The image display interface 707 includes a captured image 708 and a control 709, as shown in FIG. 20C. The electronic device detects a tap operation performed on the control 709, as shown in FIG. 20D. In response to the tap operation, the electronic device adjusts the brightness of the display screen to the target brightness value, and displays the captured image 708 on which tone mapping processing is performed, as shown in FIG. 20E.

In another possible implementation, the electronic device may perform the image processing method provided in embodiments of this application by default when displaying the image.

Optionally, after the electronic device detects the tap operation performed on the thumbnail in the gallery application, the electronic device obtains brightness information of a captured image corresponding to the thumbnail, obtains the current brightness value and the maximum brightness value of the display screen of the electronic device, determines the target brightness value, performs tone mapping processing on the captured image based on a brightness gain, to obtain the image on which tone mapping processing is performed, and adjusts the display screen of the electronic device to the target brightness, and displays the image on which tone mapping processing is performed. When the electronic device detects an exit operation performed on the display interface of the captured image, the electronic device releases the image on which tone mapping processing is performed. If detecting the tap operation performed on the thumbnail again, the electronic device re-performs the foregoing operations.

Figure 21A:
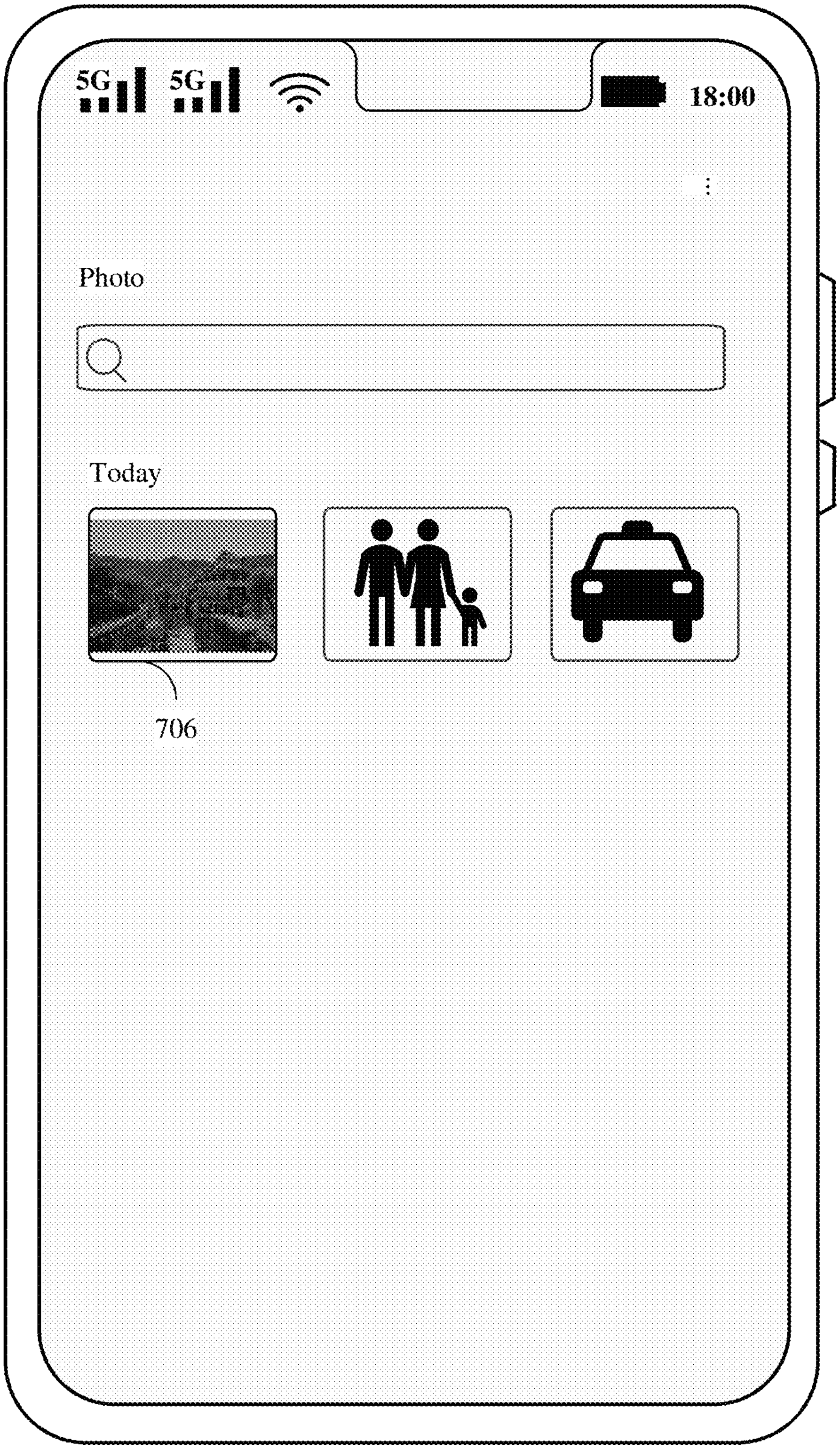
FIG. 21A to FIG. 21D are a schematic diagram of another graphical user interface according to an embodiment of this application.
Figure 21B:
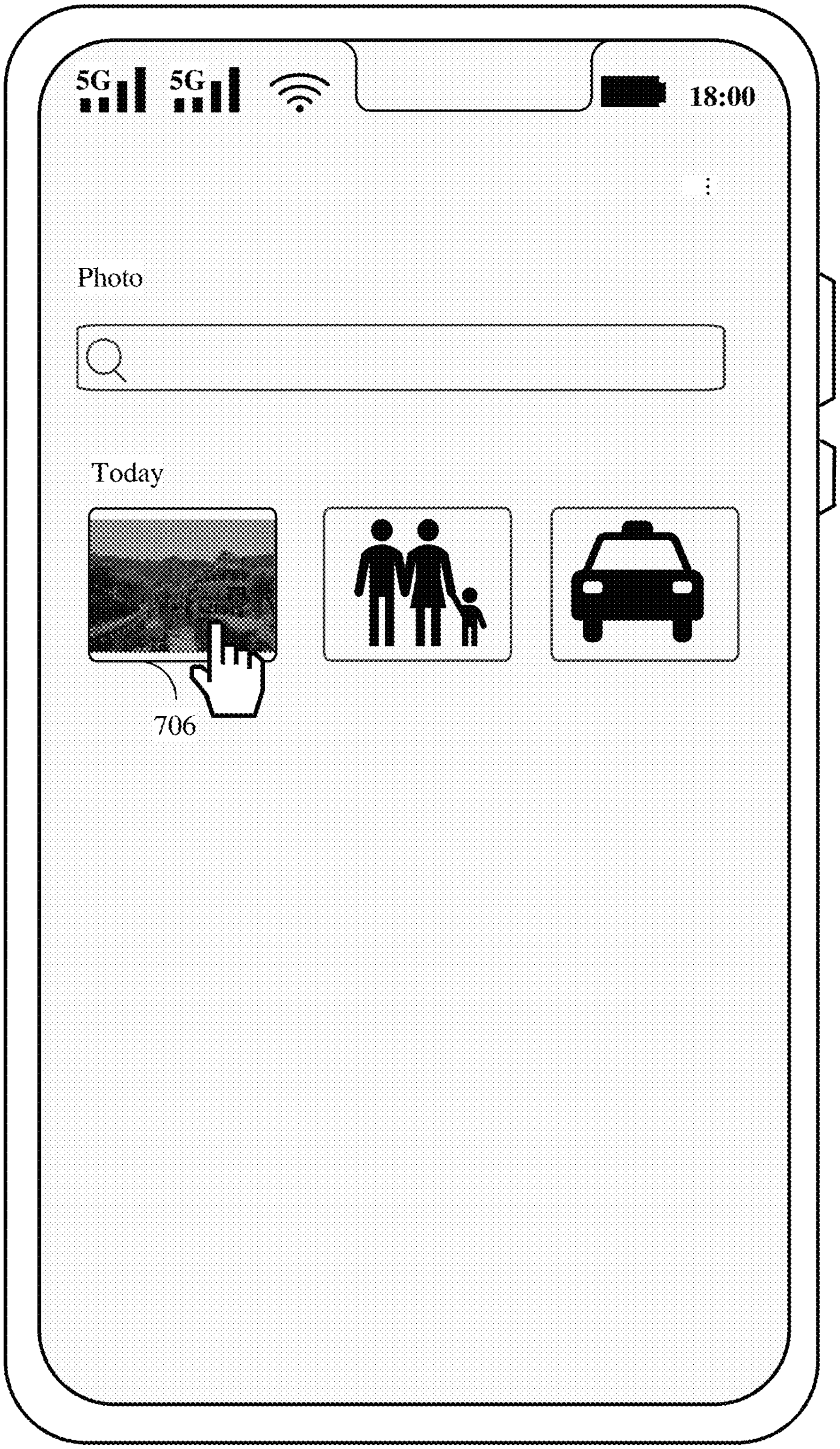
Figure 21C:
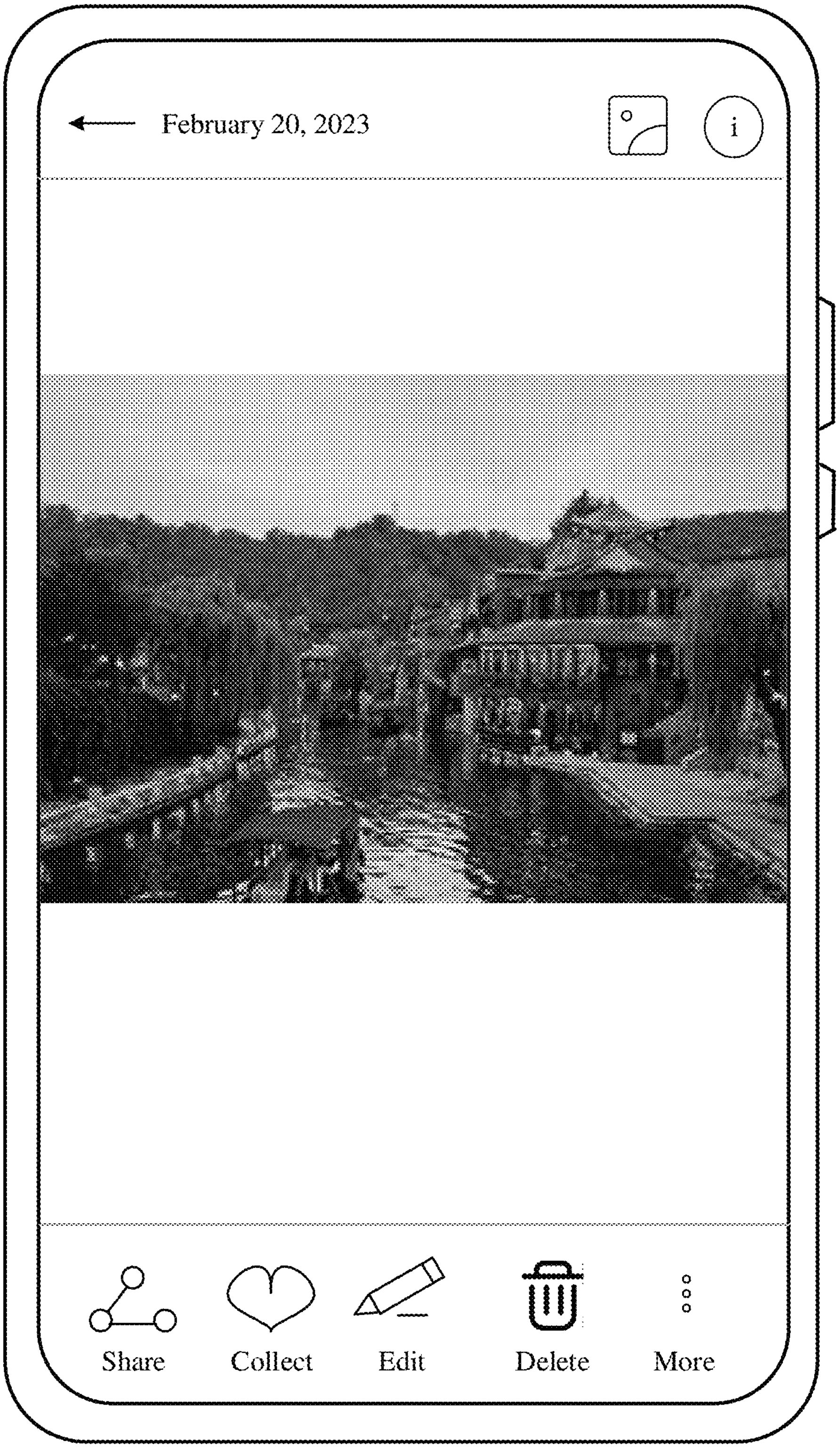
Figure 21D:
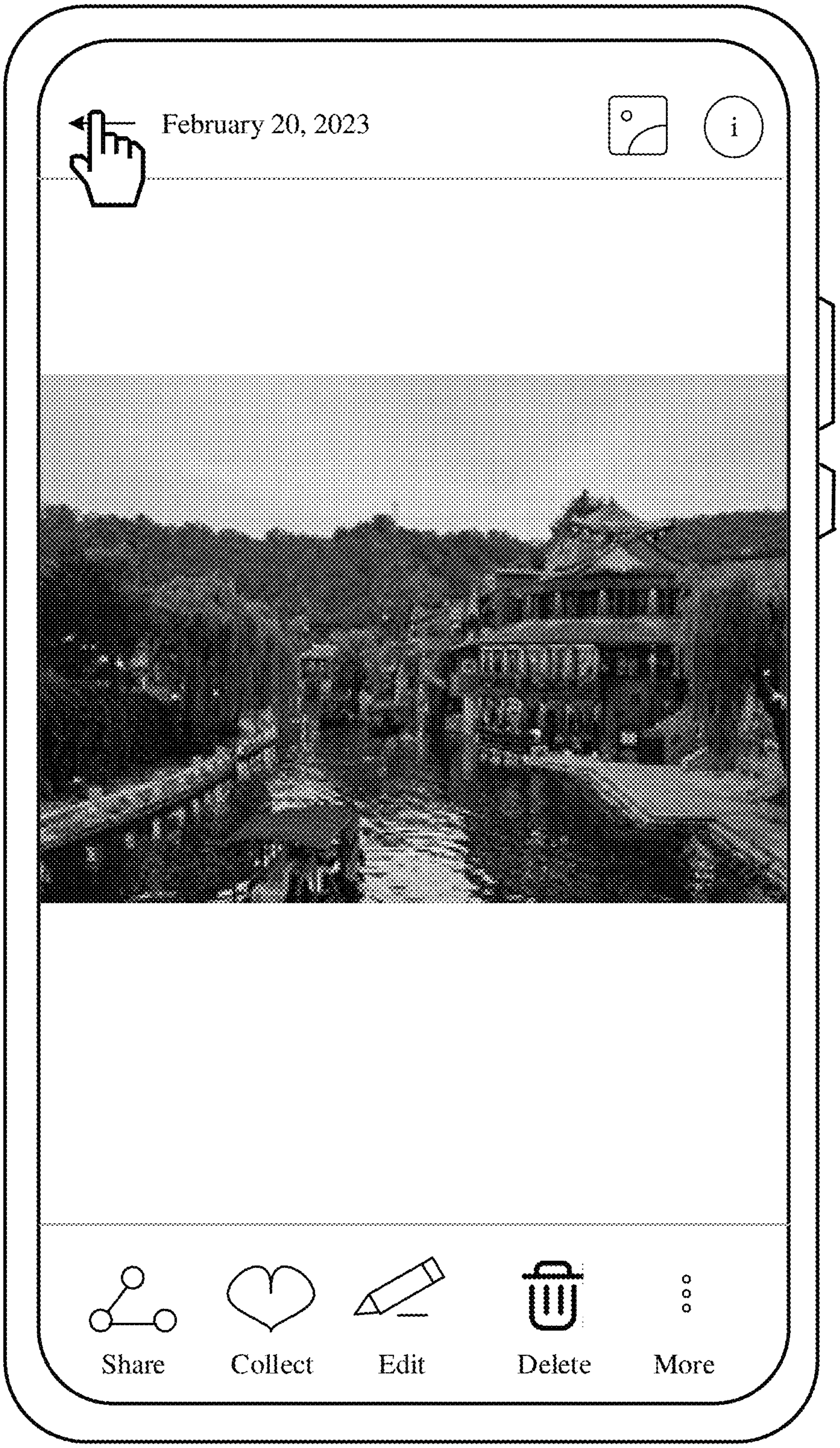

For example, the display screen of the electronic device is the current brightness value. When detecting the tap operation performed on the control of the gallery application, the electronic device displays the gallery display interface. The gallery display interface includes the thumbnail 706, as shown in FIG. 21A. The electronic device detects a tap operation performed on the thumbnail 706, as shown in FIG. 21B. In response to the tap operation, the electronic device adjusts the brightness of the display screen from the current brightness value to the target brightness value (for example, the brightness value of the display screen is adjusted from 200 nit to 1000 nit), and displays the captured image that corresponds to the thumbnail 706 and on which tone mapping processing is performed, as shown in FIG. 21C. The electronic device detects the exit operation performed on the image display interface, as shown in FIG. 21D. After the electronic device detects the exit operation performed on the image display interface, the electronic device adjusts the brightness of the display screen to a brightness value before the image display interface is displayed (for example, the brightness value of the display screen is adjusted from 1000 nit to 200 nit), and displays the gallery display interface, as shown in FIG. 21A.

Optionally, after the electronic device detects the tap operation performed on a thumbnail 1 in the gallery application, the electronic device obtains brightness information of a captured image 1 corresponding to the thumbnail 1, obtains the current brightness value and the maximum brightness value of the display screen of the electronic device, to determine a target brightness value 1, performs tone mapping processing on the captured image 1 based on a brightness gain, to obtain the image 1 on which tone mapping processing is performed, and adjusts the display screen of the electronic device to the target brightness 1, and displays the image 1 on which tone mapping processing is performed. After the electronic device detects the sliding operation in the image display interface 1, the electronic device obtains brightness information of a captured image 2, obtains a brightness value and a maximum brightness value of the gallery display interface, to determine a target brightness value 2, performs tone mapping processing on the captured image 2 based on a brightness gain, to obtain the image 2 on which tone mapping processing is performed, and adjusts the display screen of the electronic device to the target brightness 2, and displays the image 2 on which tone mapping processing is performed. Similarly, after the electronic device detects the sliding operation in the image display interface 2, the electronic device adjusts the display screen to target brightness 3, and displays an image 3 on which tone mapping processing is performed.

Optionally, target brightness 1, target brightness 2, and target brightness 3 may be the same or not the same. For example, if the target brightness 1, the target brightness 2, and the target brightness 3 are all maximum brightness values of the display screen, the target brightness 1, the target brightness 2, and the target brightness 3 are the same.

Figure 22A:
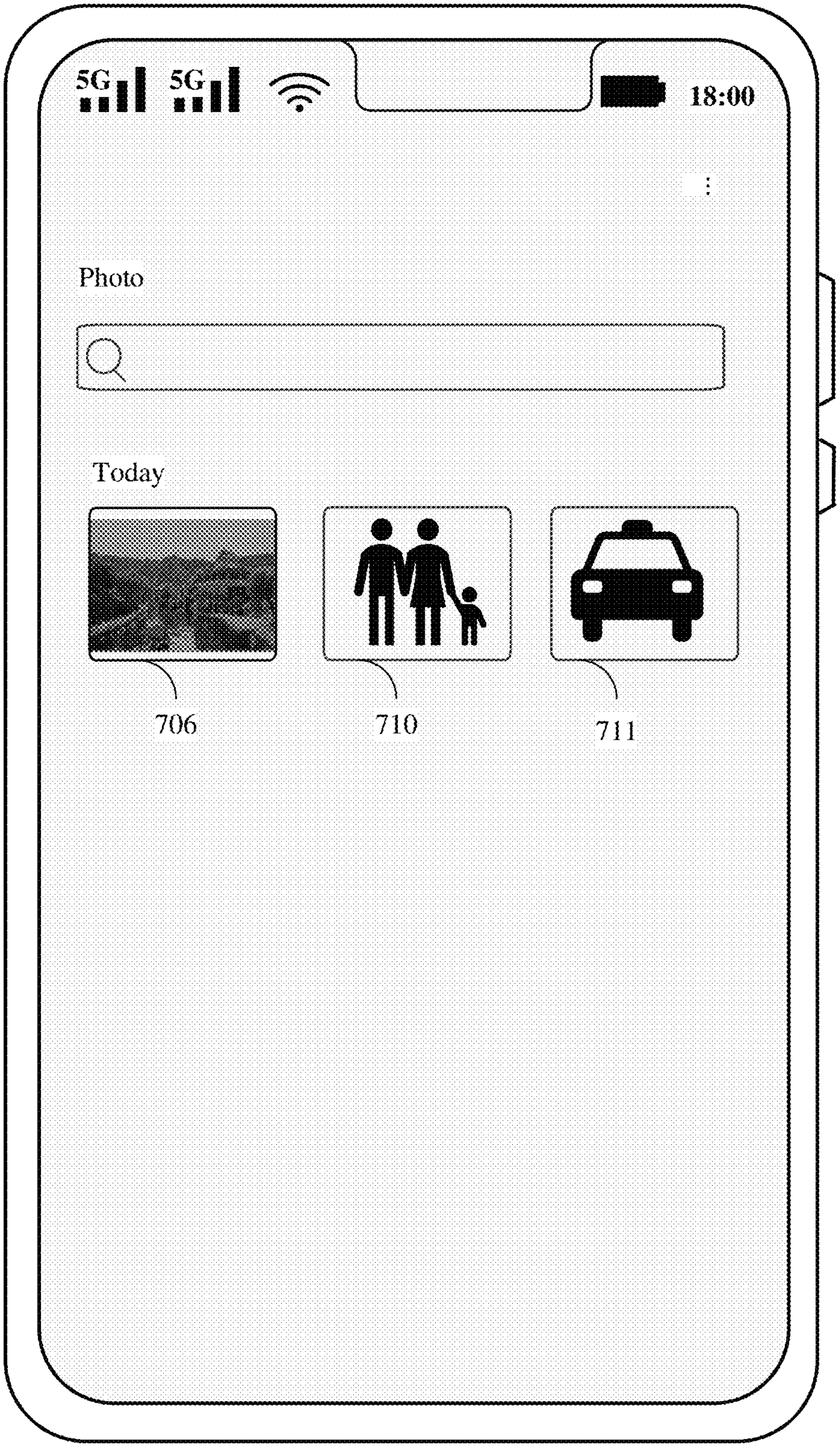
FIG. 22A to FIG. 22D are a schematic diagram of another graphical user interface according to an embodiment of this application.
Figure 22B:
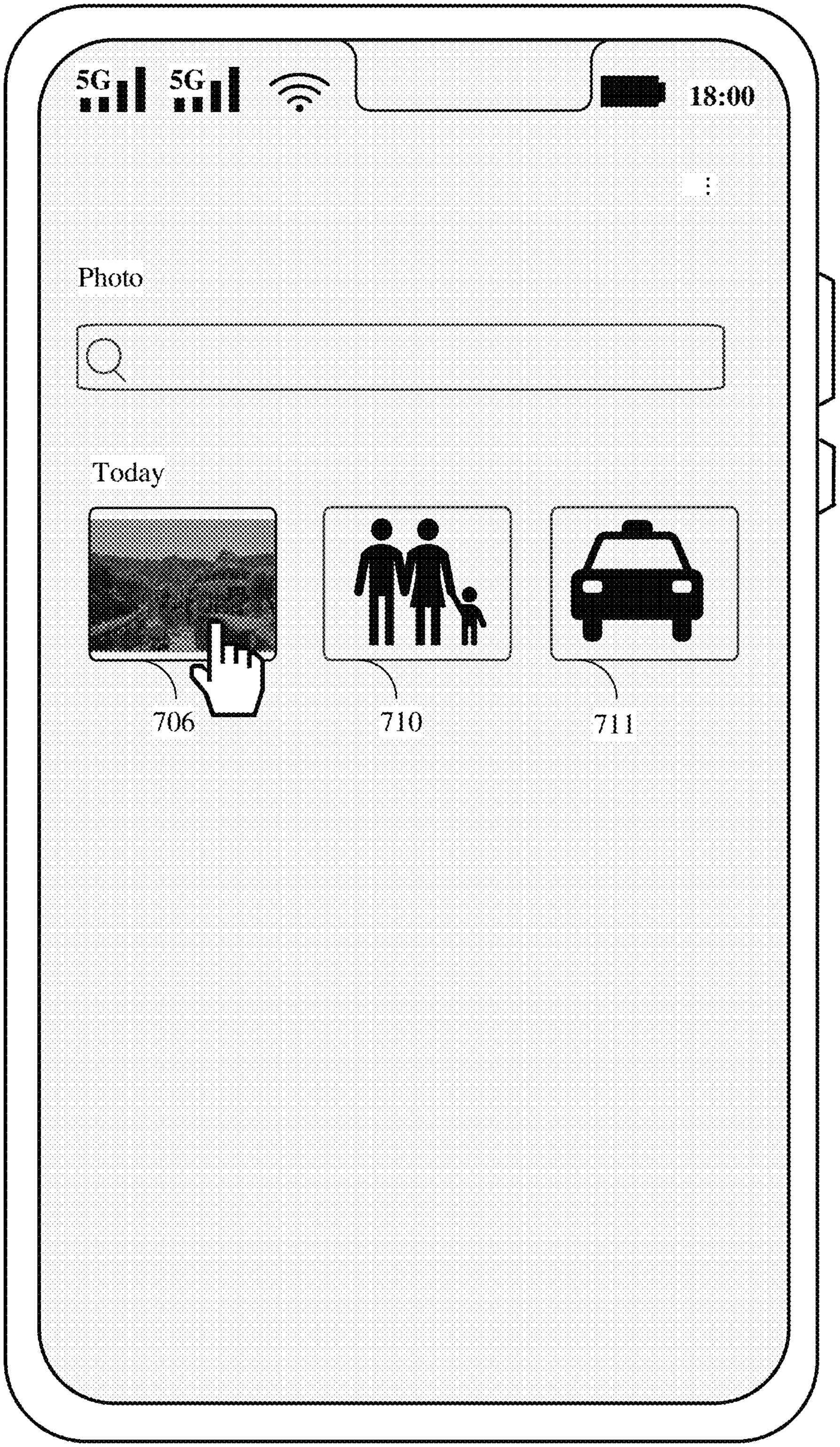
Figure 22C:
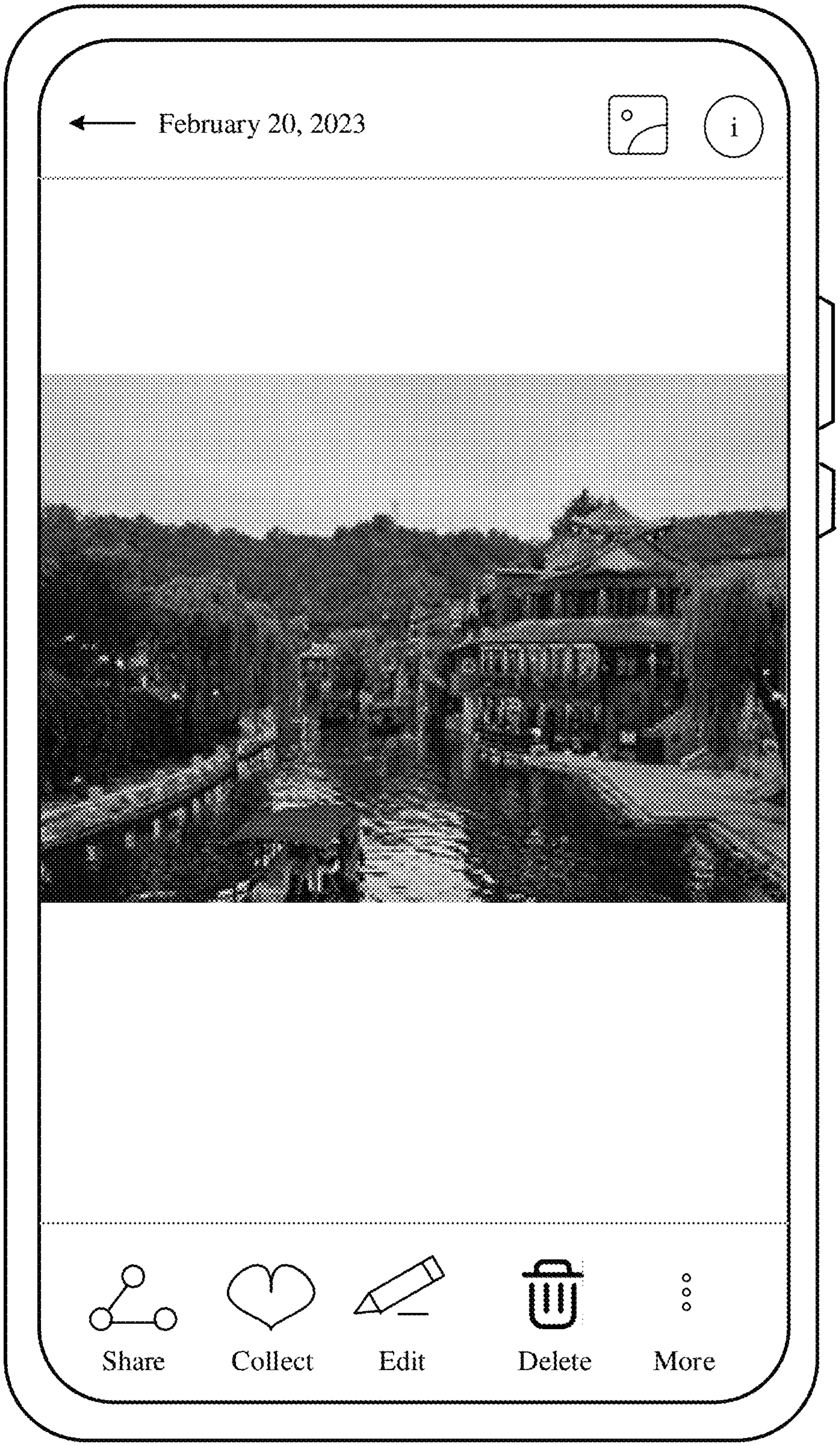
Figure 22D:
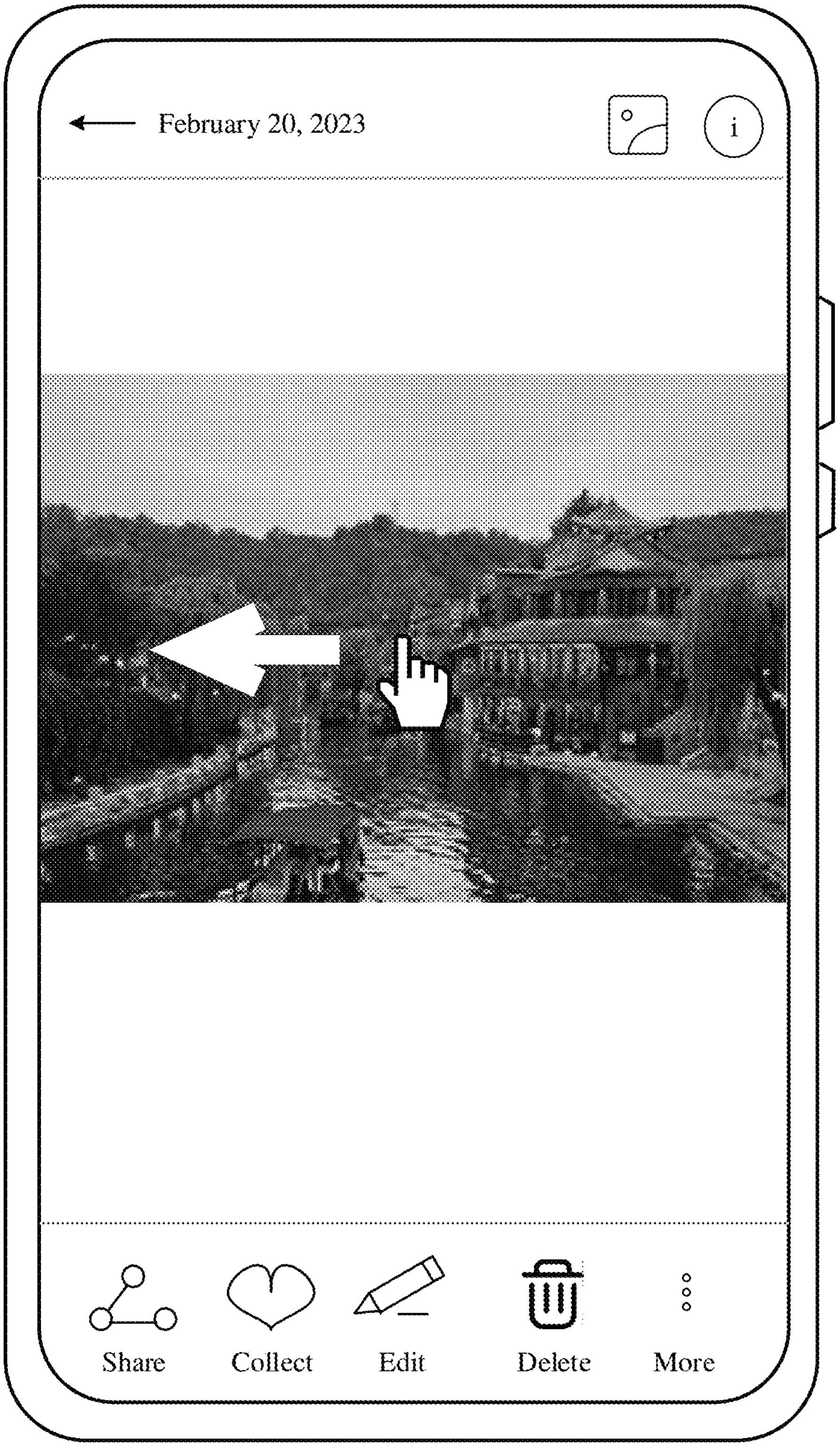
Figure 23A:
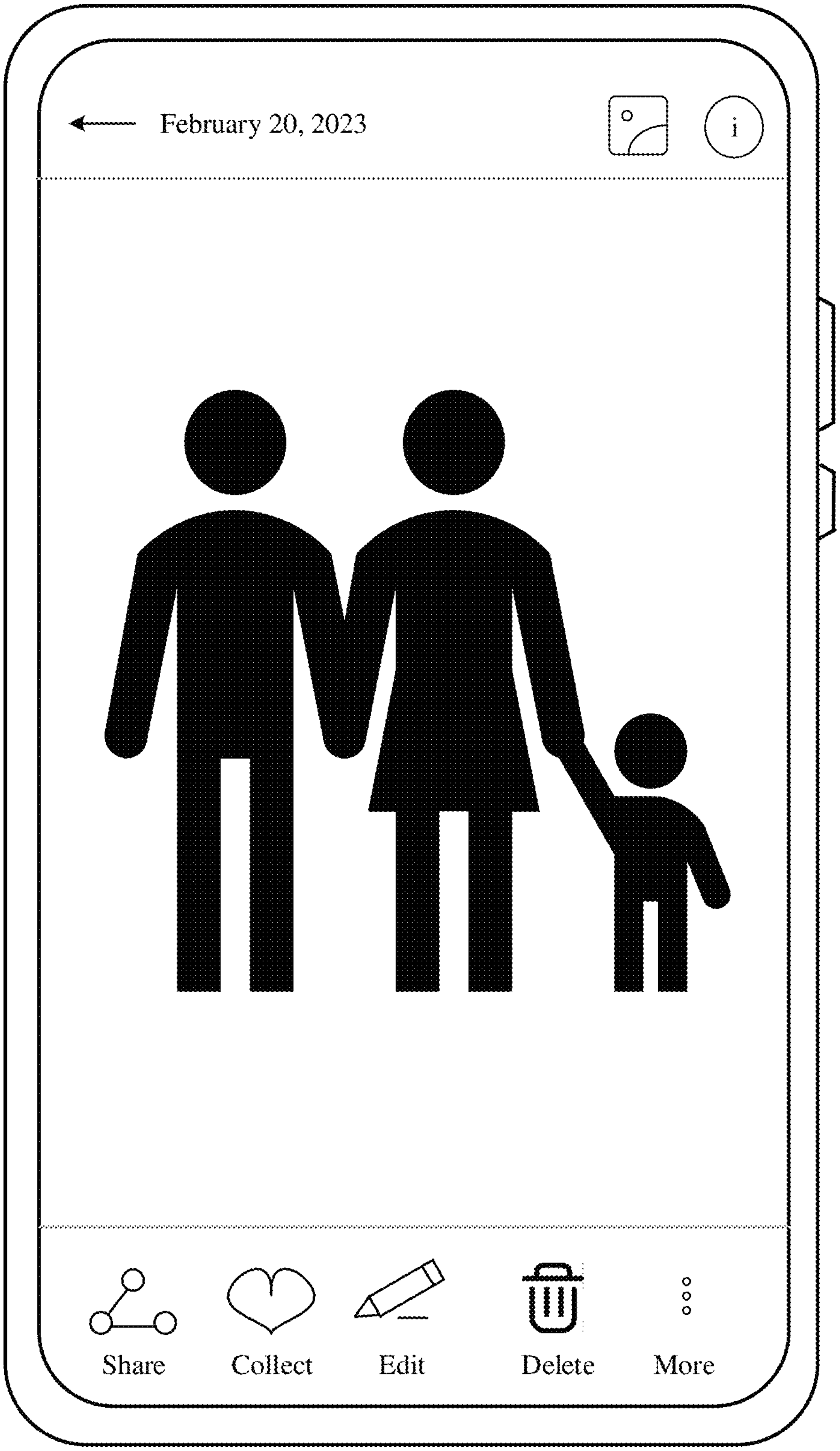
FIG. 23A to FIG. 23D are a schematic diagram of another graphical user interface according to an embodiment of this application.
Figure 23B:
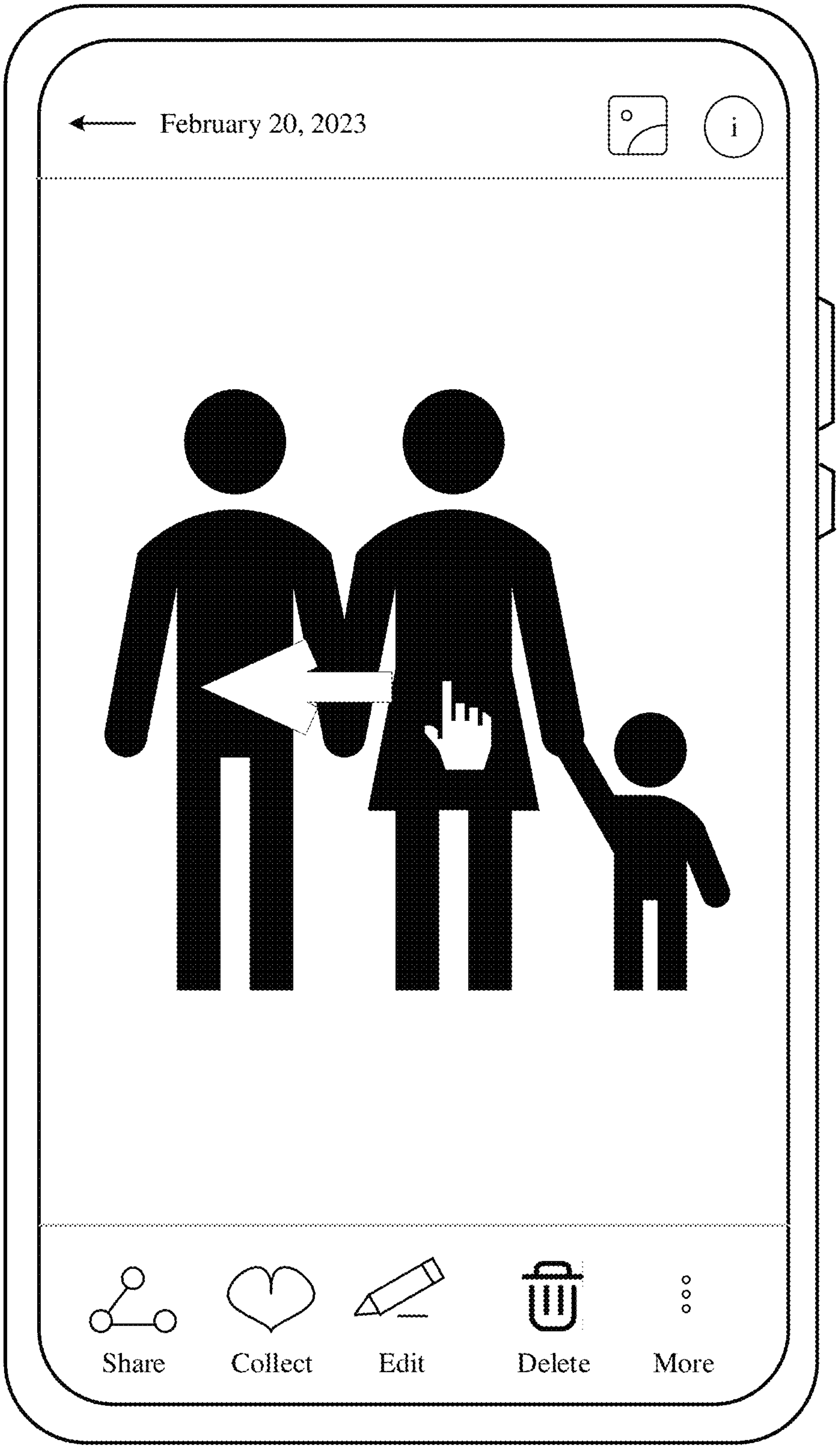
Figure 23C:
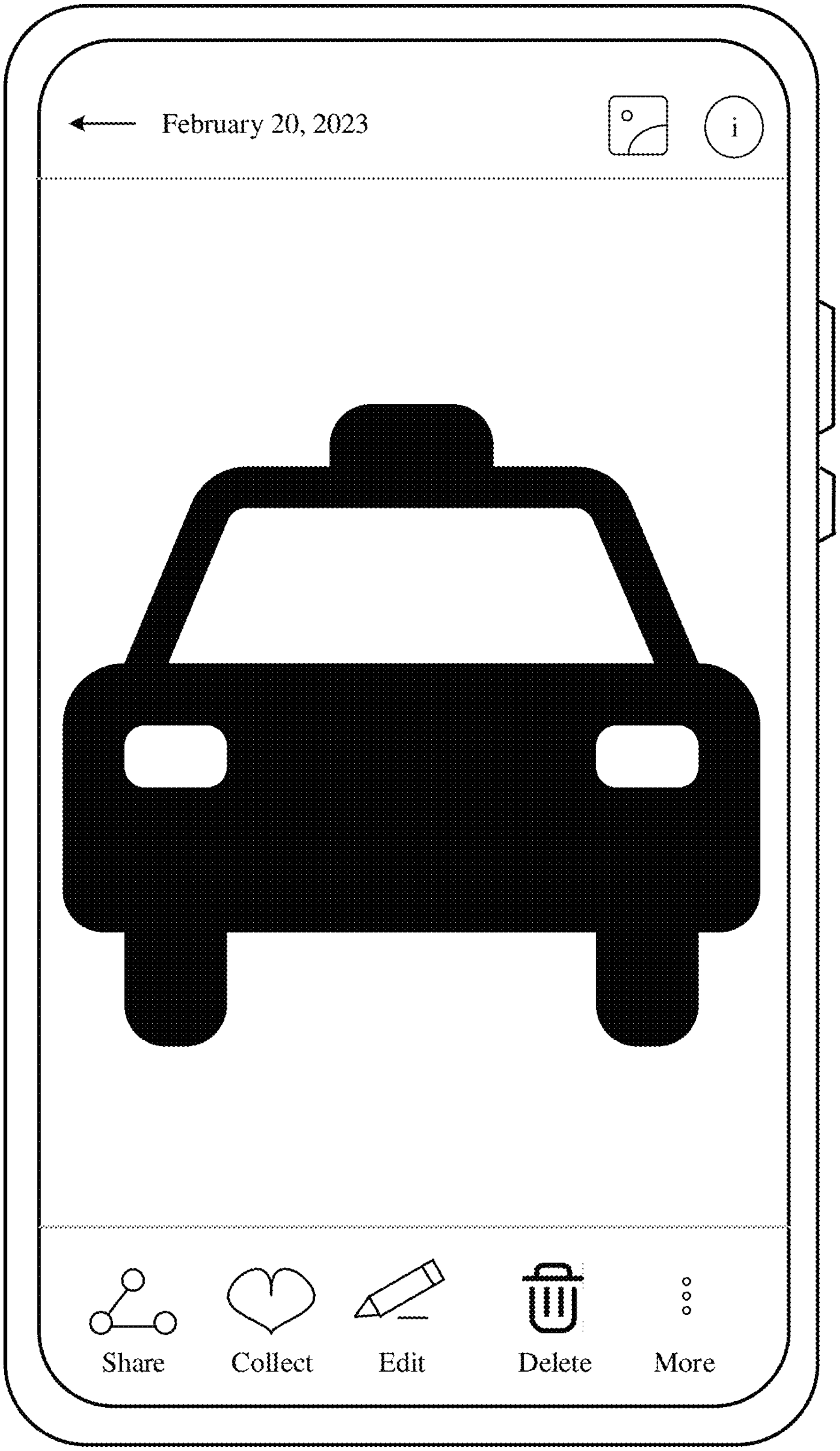
Figure 23D:
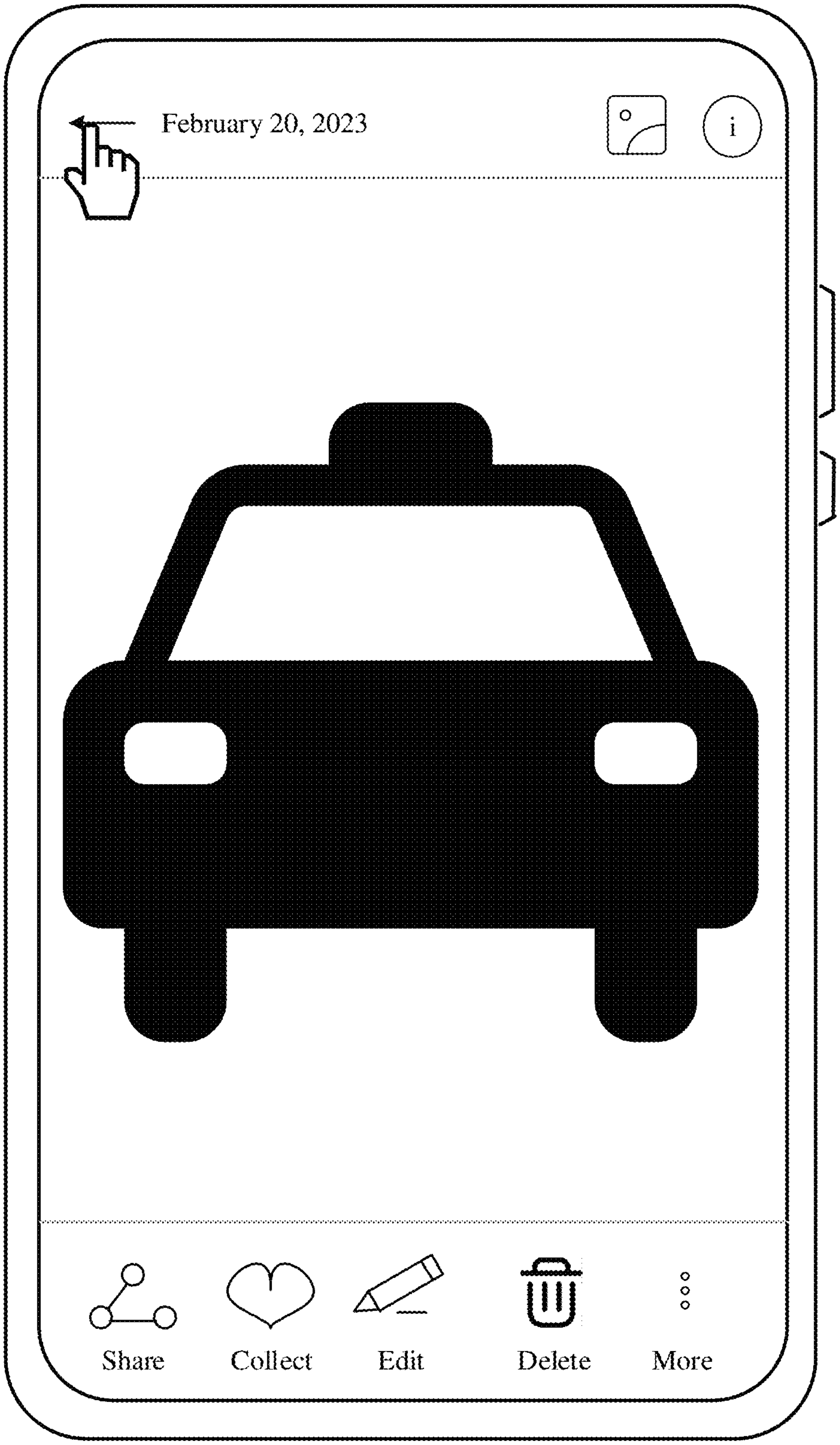

For example, the display screen of the electronic device is the current brightness value. When detecting the tap operation performed on the control of the gallery application, the electronic device displays the gallery display interface. The gallery display interface includes a thumbnail 706, a thumbnail 710, and a thumbnail 711, as shown in FIG. 22A. The electronic device detects a tap operation performed on the thumbnail 706, as shown in FIG. 22B. In response to the tap operation, the electronic device adjusts the brightness of the display screen from the current brightness value to the target brightness value (for example, the brightness value of the display screen is adjusted from 200 nit to 800 nit), and displays the captured image that corresponds to the thumbnail 706 and on which tone mapping processing is performed, as shown in FIG. 22C. The electronic device detects a leftward sliding operation performed on the image display interface, as shown in FIG. 22D. In response to the sliding operation, the electronic device adjusts the brightness value of the display screen to the target brightness value 2, and displays the captured image that corresponds to the thumbnail 710 and on which tone mapping processing is performed, as shown in FIG. 23A. The electronic device detects the leftward sliding operation performed on the image display interface, as shown in FIG. 23B. In response to the sliding operation, the electronic device adjusts the brightness value of the display screen to the target brightness value 3, and displays the captured image that corresponds to the thumbnail 710 and on which tone mapping processing is performed, as shown in FIG. 23C. The electronic device detects the exit operation performed on the image display interface, as shown in FIG. 23D. After the electronic device detects the exit operation performed on the image display interface, the electronic device adjusts the brightness of the display screen from the target brightness 3 to a brightness value before the image display interface is displayed, and displays the gallery display interface, as shown in FIG. 22A.

It should be noted that in FIG. 17A to FIG. 18E, an example in which the target brightness 1, the target brightness 2, and the target brightness 3 are the same is used for descriptions. The target brightness 1, the target brightness 2, and the target brightness 3 may not be the same, and this is not limited in this application.

Optionally, in an implementation, a user A holds an electronic device 800, and a user B holds an electronic device 100. An image displayed by the electronic device 100 of the user B is an image displayed using the image processing method provided in embodiments of this application. The image is closer to an actual photographing scenario, and the image is more vivid. The user B sends the image to the electronic device 800 via the electronic device 100. Because the electronic device 100 performs the image processing method provided in embodiments of this application, and the electronic device 800 does not perform the image processing method provided in embodiments of this application. Therefore, the user B views the image via the electronic device 800, and finds that the image displayed by the electronic device 800 is not the same as the image displayed by the electronic device 100.

Figure 24A:
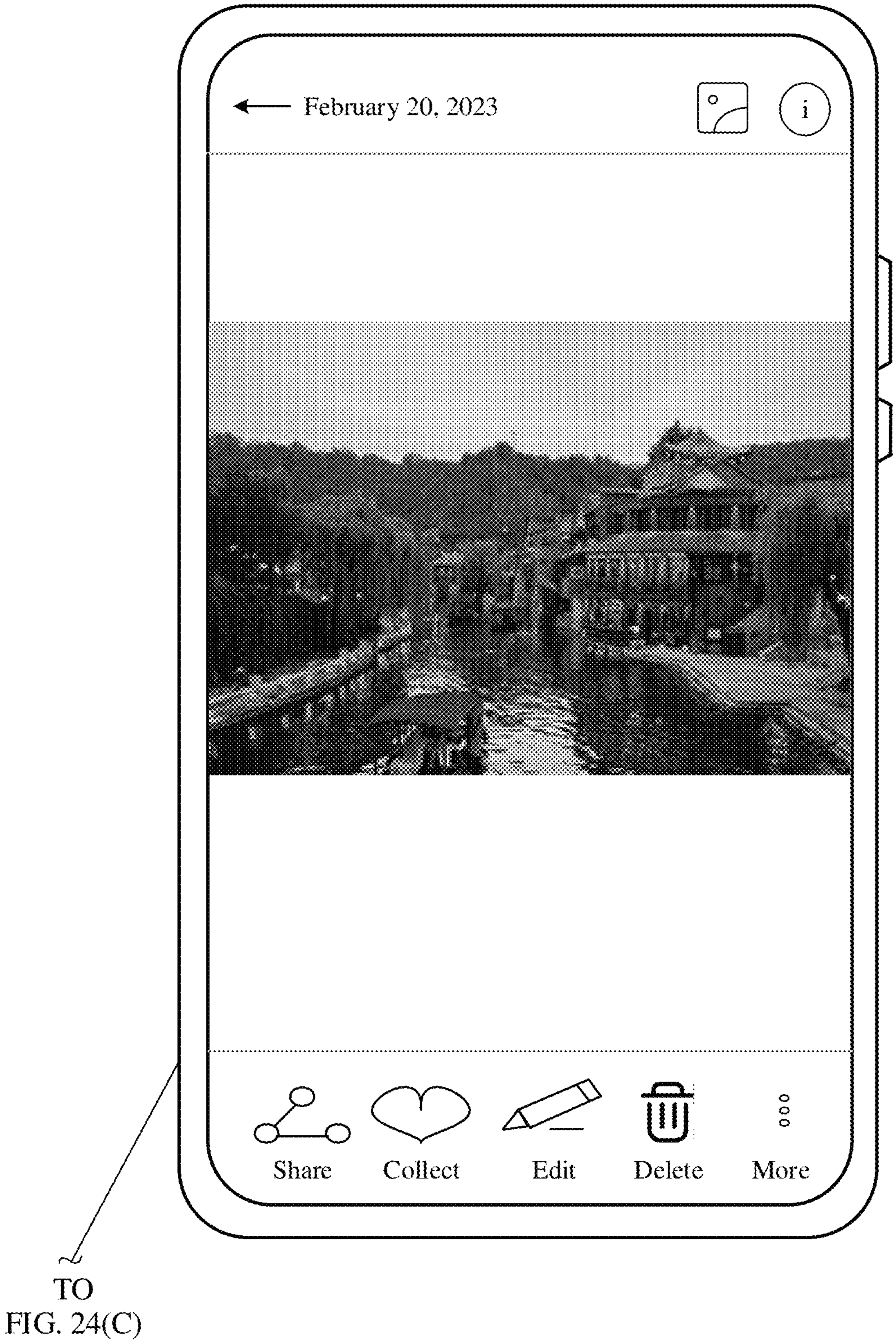
FIG. 24A to FIG. 24D are a schematic diagram of another graphical user interface according to an embodiment of this application.
Figure 24B:
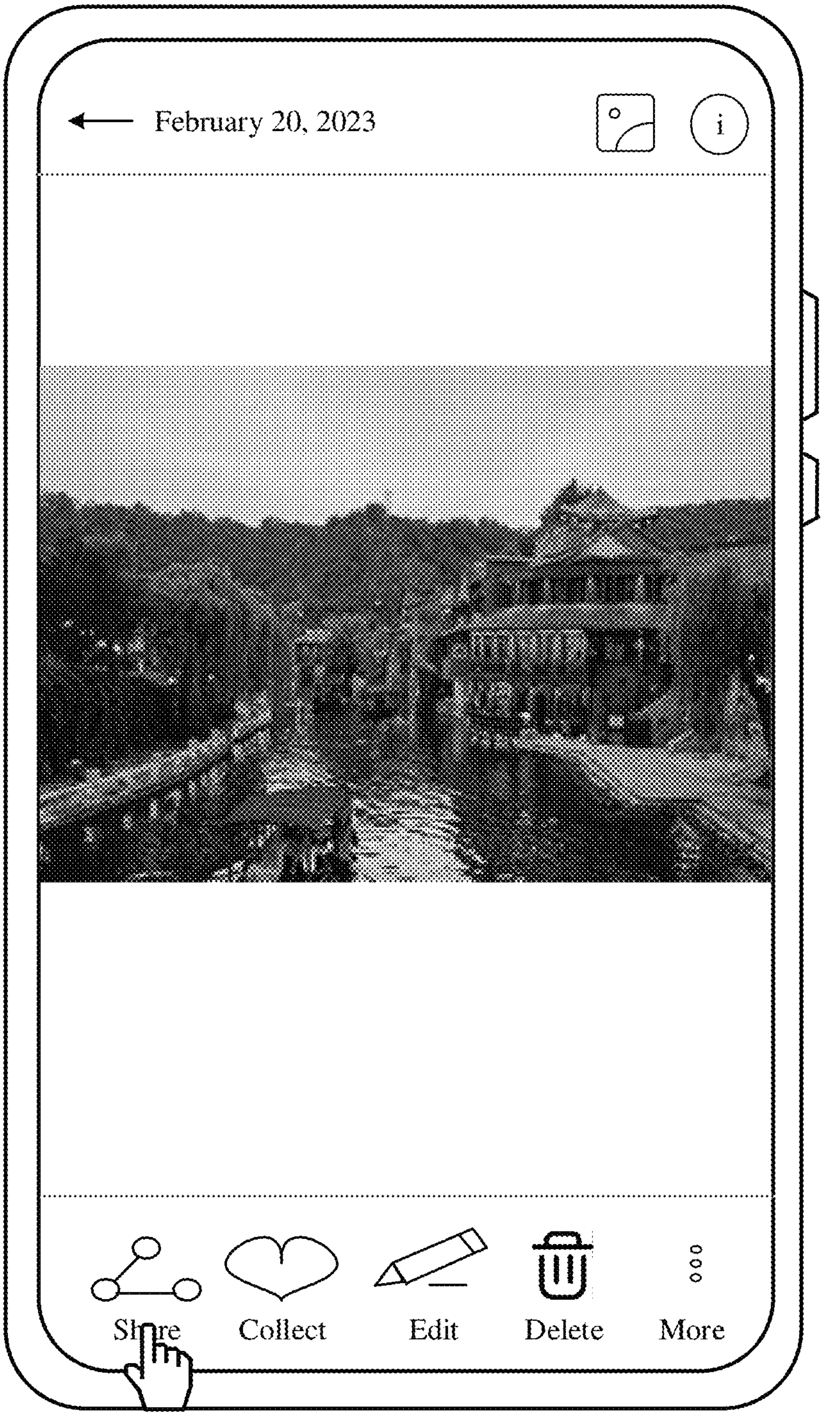
Figure 24C:
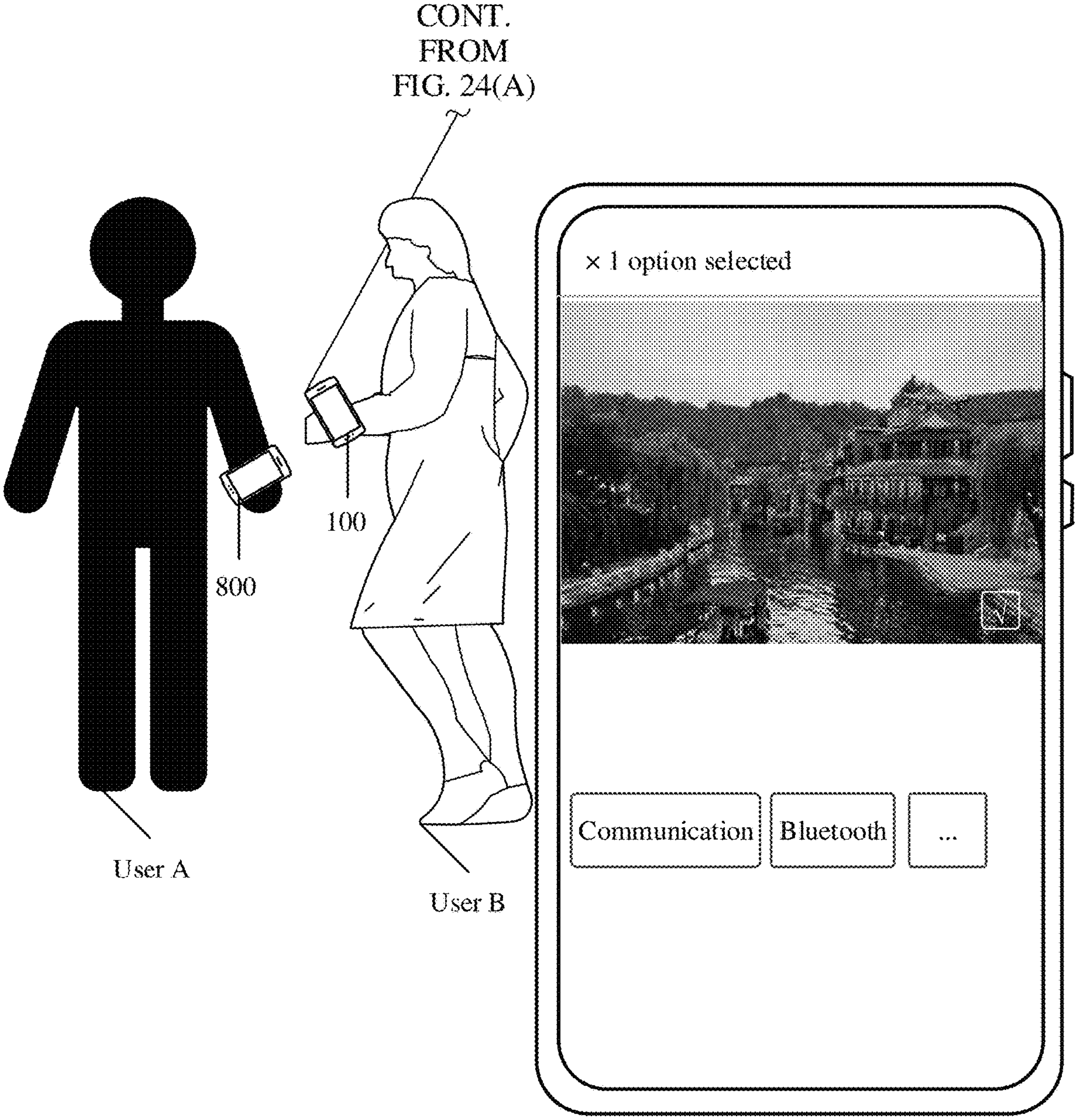
Figure 24D:
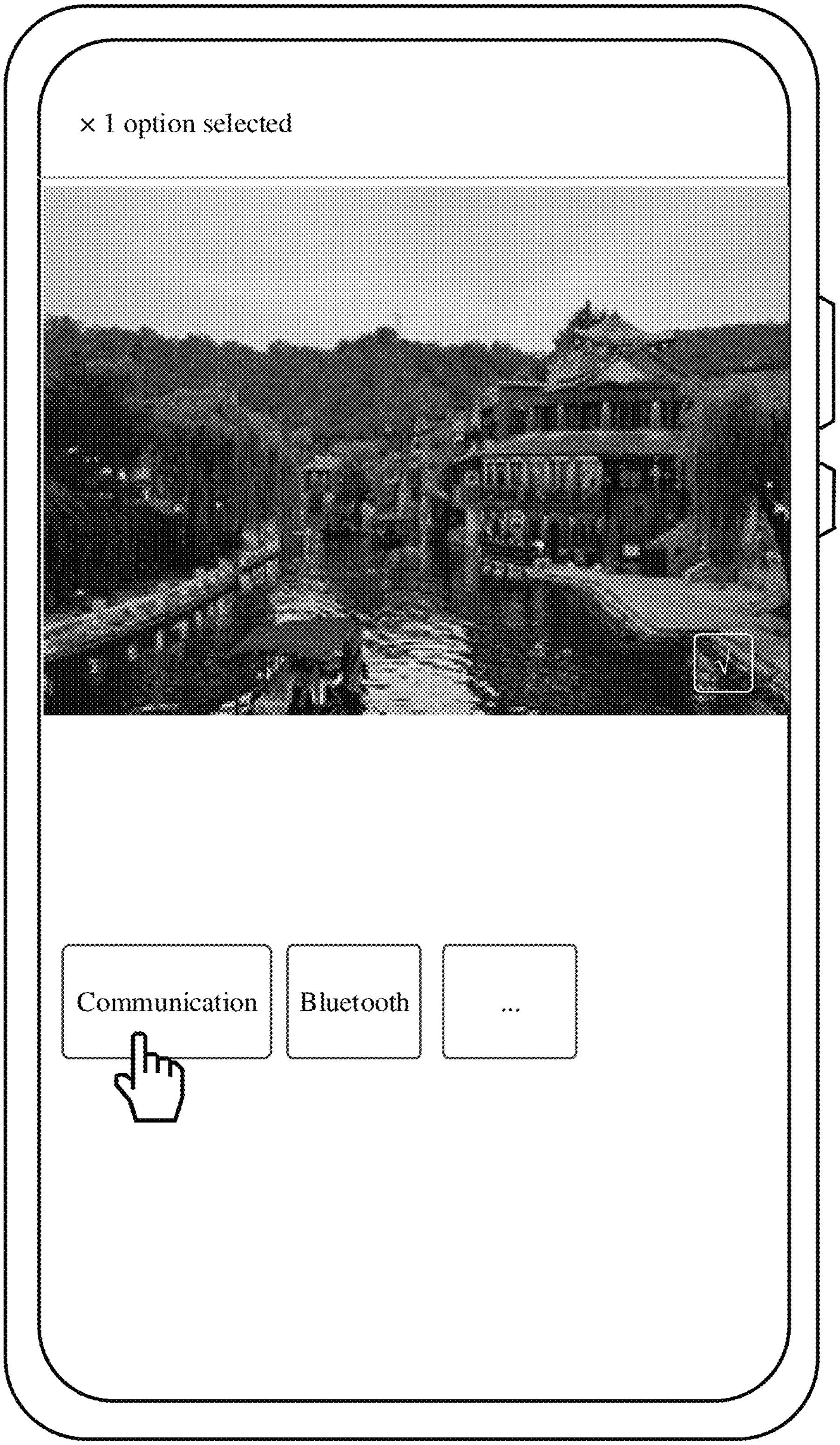
Figure 25A:
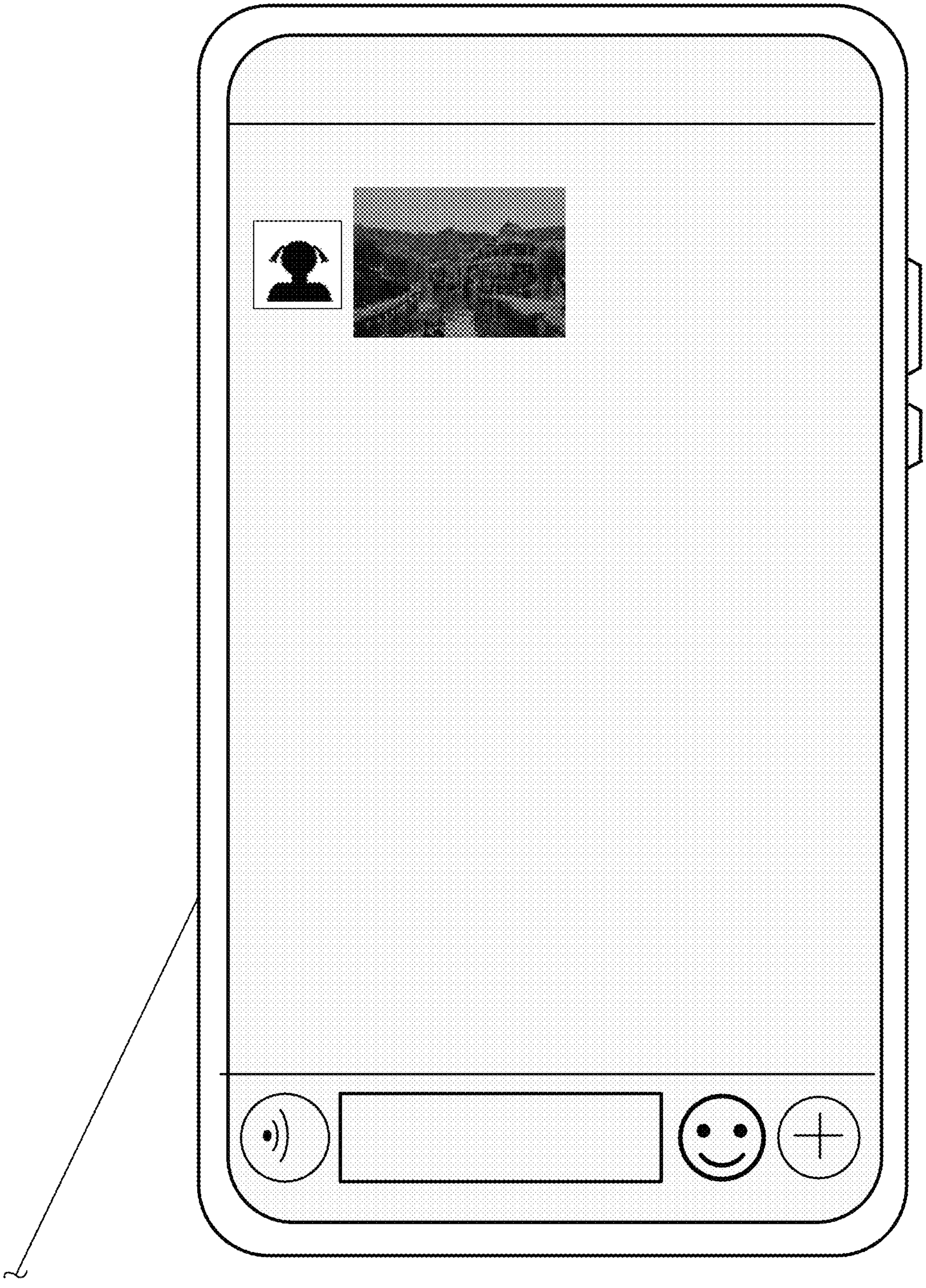
FIG. 25A to FIG. 25C are a schematic diagram of another graphical user interface according to an embodiment of this application.
Figure 25B:
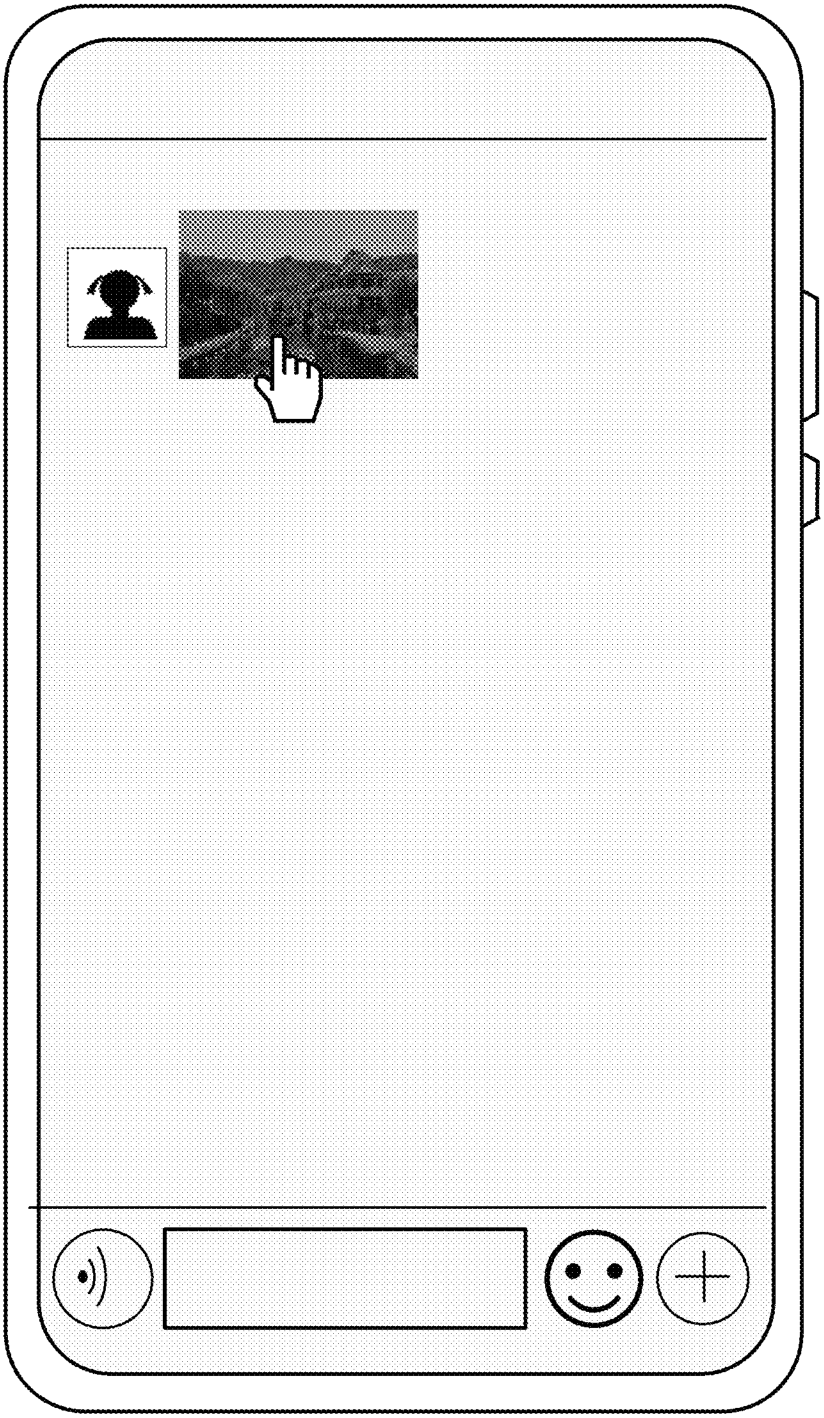
Figure 25C:
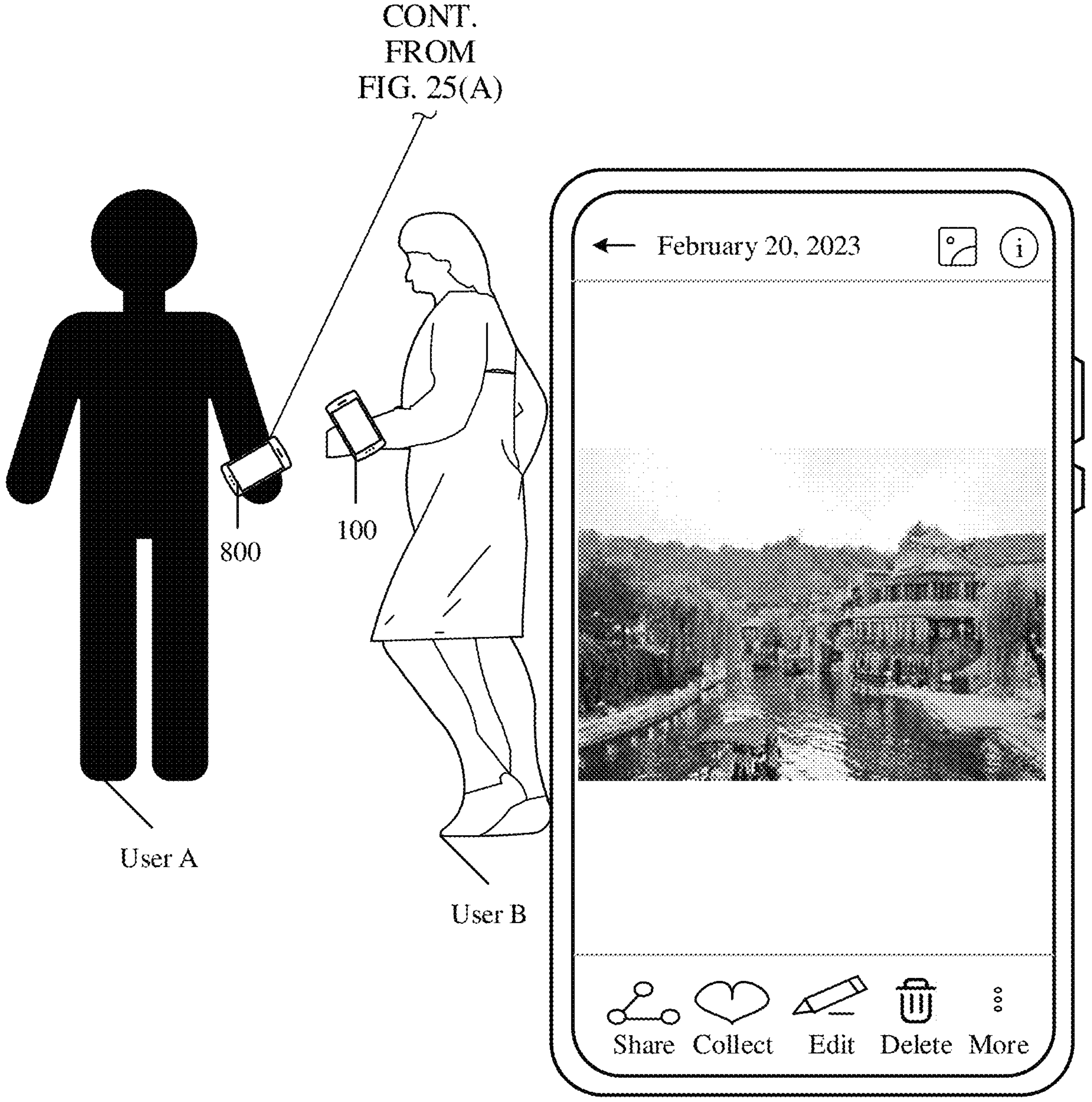

For example, a scenario, as shown in FIG. 24A to FIG. 24D, includes the user A and the user B. The user A holds the electronic device 800 and the user B holds the electronic device 100. The electronic device 100 may be shown in FIG. 3. The electronic device 100 performs the image processing method provided in embodiments of this application. The electronic device 100 adjusts brightness of a display screen to the target brightness value, and displays the image on which tone mapping processing is performed, as shown in FIG. 24A. The user A and the user A view the image as shown in FIG. 24B together. The user B hopes the user A to send the image to the user B; and the electronic device 100 detects a tap operation performed on a sharing control, as shown in FIG. 24B. After the electronic device 100 detects the tap operation performed on the sharing control, the electronic device 100 displays a sharing display interface. The sharing display interface includes a control of a sharing method, for example, a control of a communication application, or a control of Bluetooth, and the like, as shown in FIG. 24C. The electronic device 100 detects a tap operation performed on the control of the communication application, as shown in FIG. 24D. After the electronic device 100 detects the tap operation performed on the control of the communication application, the electronic device 100 may display a display interface of the communication application. The communication application in the electronic device 800 receives a message sent by the electronic device 100, and the electronic device 800 may display a communication display interface. The communication display interface includes an icon for the image, as shown in FIG. 25A. The electronic device 800 detects a tap operation performed on the icon of the image, as shown in FIG. 25B. After the electronic device 800 detects the tap operation performed on the icon of the image, the electronic device 800 displays the image, as shown in FIG. 25C. It may be learned from the image as shown in FIG. 25C and the image as shown in FIG. 24A that although the images are the same image, the images displayed by the electronic device 100 and the electronic device 800 are not the same. The image displayed by the electronic device 800 is inconsistent with the brightness of the actual photographing scenario.

Optionally, in this embodiment of this application, the image on which tone mapping processing is performed is displayed by adjusting the brightness of the display screen to the target brightness. Content of the image observed by the user is content of the image on which tone mapping processing is performed, and the brightness of the image is combined effect of the brightness of the pixel in the image on which tone mapping processing is performed and the brightness of the display screen. If the display screen of the electronic device is in a screen-off state, or the display screen of the electronic device is in a dark screen state, the electronic device may release the image on which tone mapping processing is performed. After detecting an operation of waking up the display screen or tapping on the display screen again, the electronic device may obtain the brightness information of the image again, obtain the target brightness value based on a current brightness value and a maximum brightness value of the display screen, perform tone mapping processing on the image based on a brightness gain value, to obtain the image on which tone mapping processing is performed, and adjust the display screen to the target brightness value, and display the image on which tone mapping processing is performed.

Figure 26A:
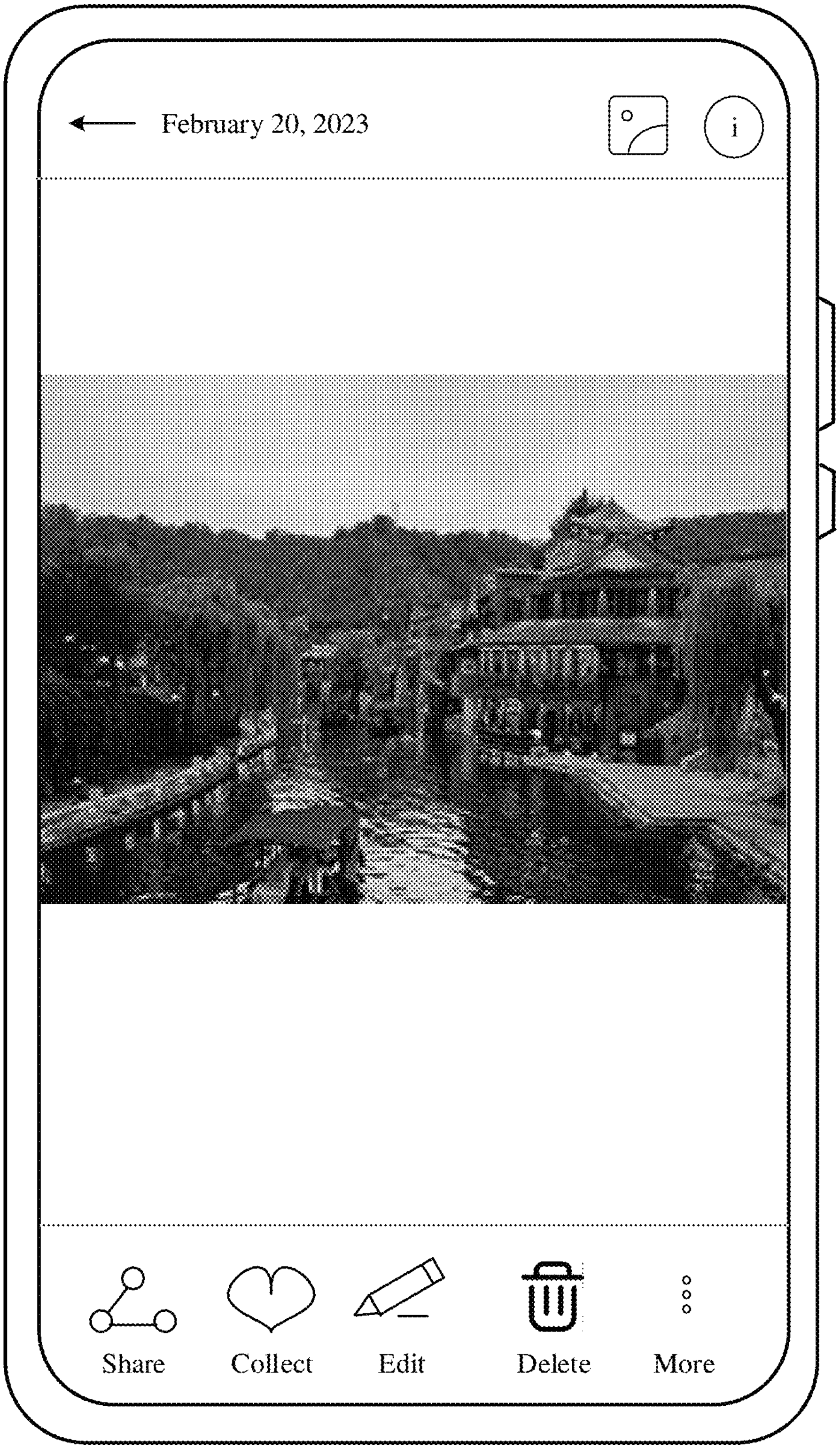
FIG. 26A to FIG. 26D are a schematic diagram of another graphical user interface according to an embodiment of this application.
Figure 26B:
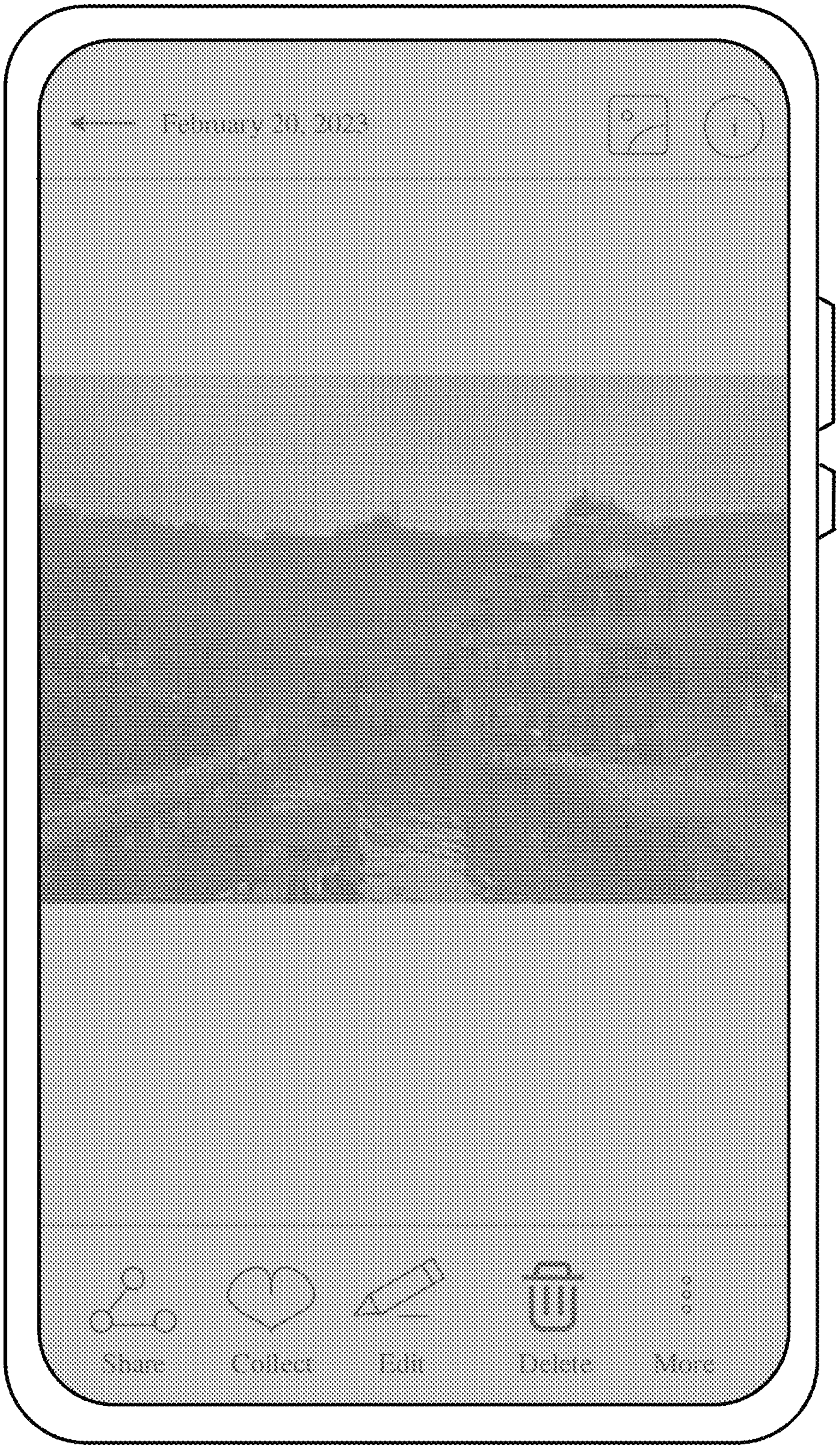
Figure 26C:
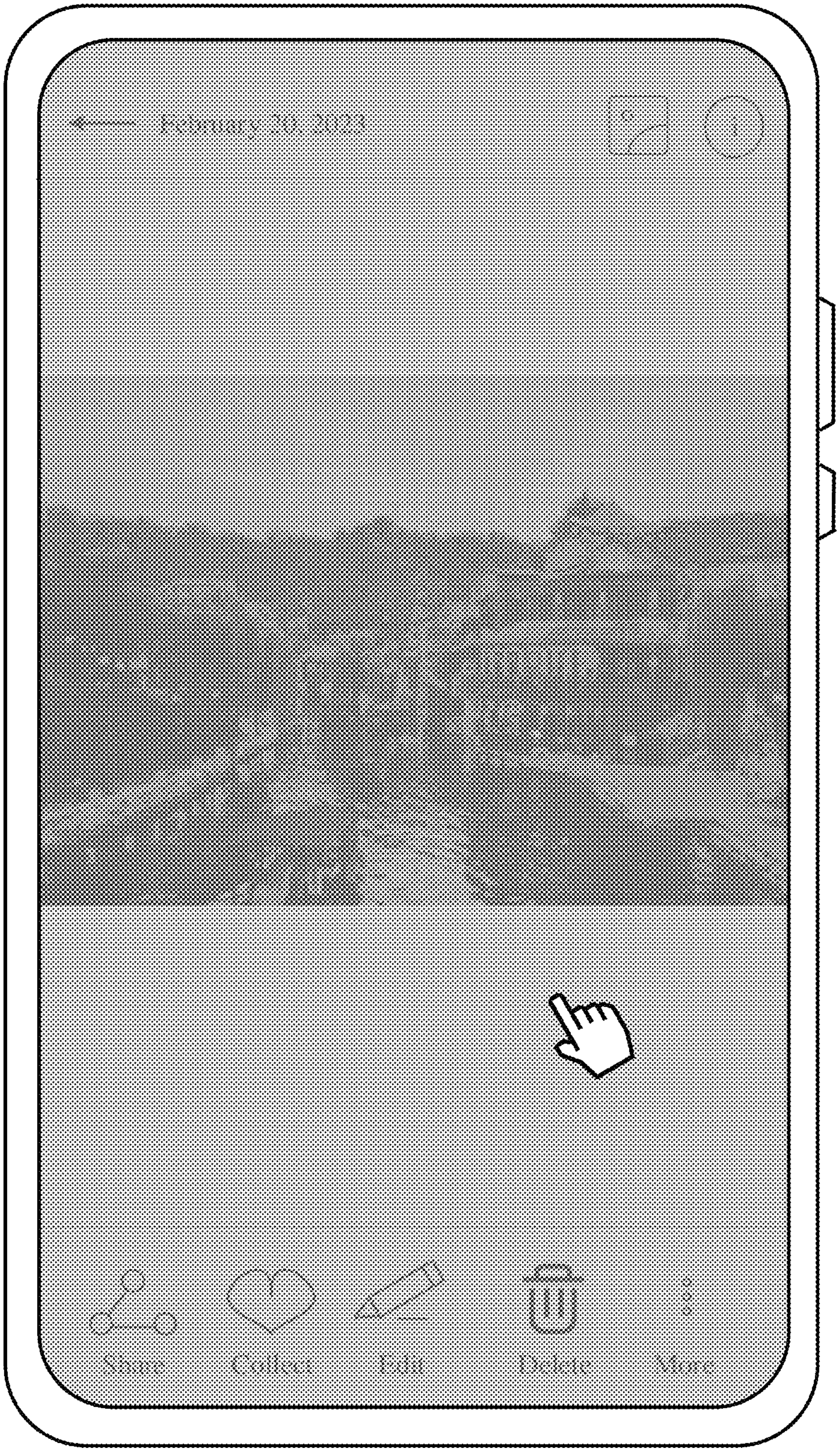
Figure 26D:
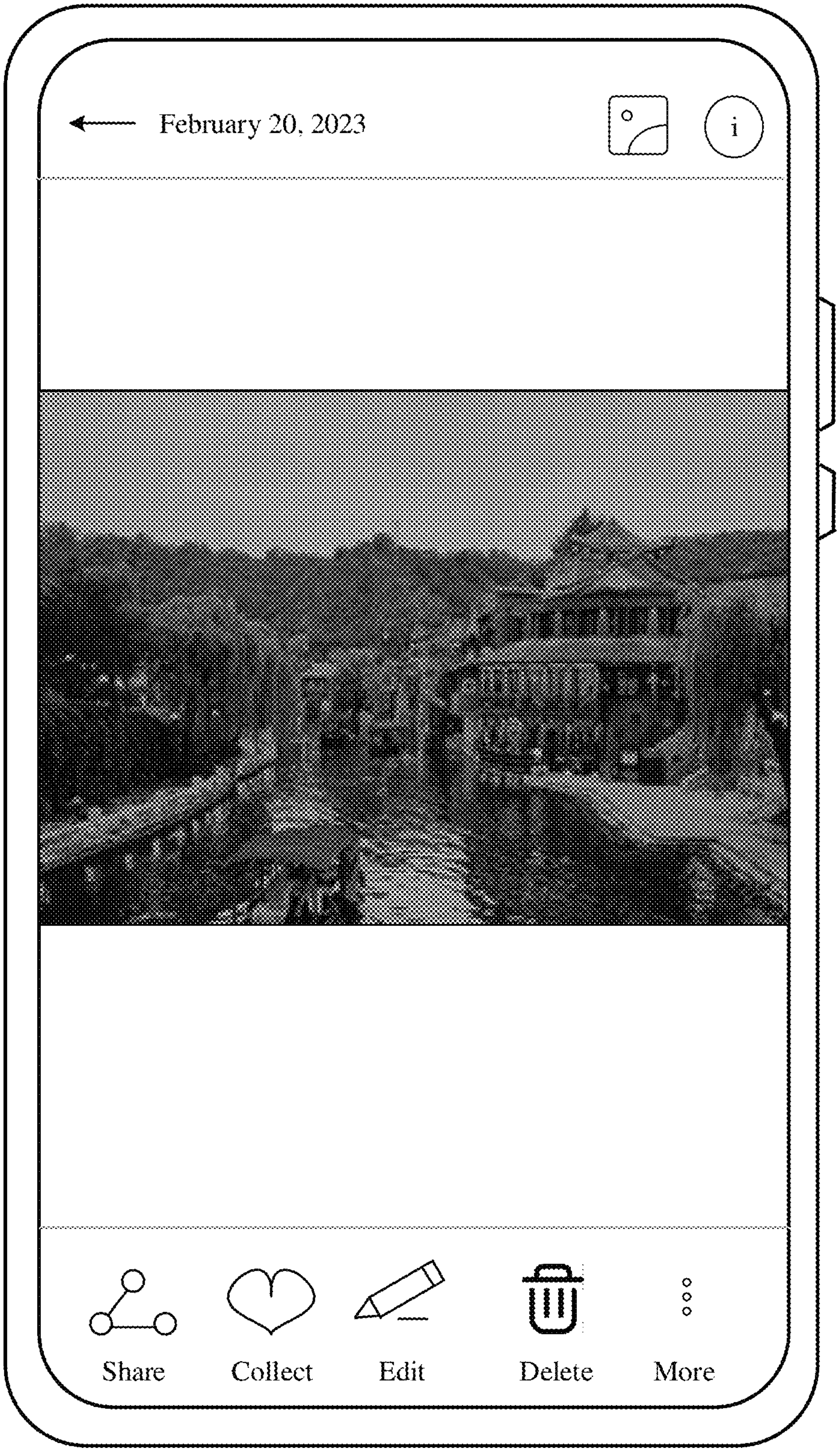

For example, the electronic device adjusts brightness of the display screen to the target brightness, and displays the image on which tone mapping processing is performed, as shown in FIG. 26A. During a preset time period, if the electronic device does not detect an operation, the electronic device dims the display screen, as shown in FIG. 26B. In this case, the electronic device releases the image on which tone mapping processing is performed. The electronic device detects the tap operation performed on the display screen, as shown in FIG. 26C. After the electronic device detects the tap operation performed on the display screen, the electronic device regenerates the image on which tone mapping processing is performed, adjusts the brightness of the display screen to the target brightness value, and displays the image on which tone mapping processing is performed. In the process of displaying the image on which tone mapping processing is performed, the electronic device may first display an image on which tone mapping processing is not performed, as shown in FIG. 26D. After a few milliseconds, the electronic device displays the image on which tone mapping processing is performed, as shown in FIG. 26A.

Optionally, in an implementation, after the electronic device detects the tap operation performed on the display screen, the electronic device may further directly display the display interface, as shown in FIG. 26A.

Figure 27A:
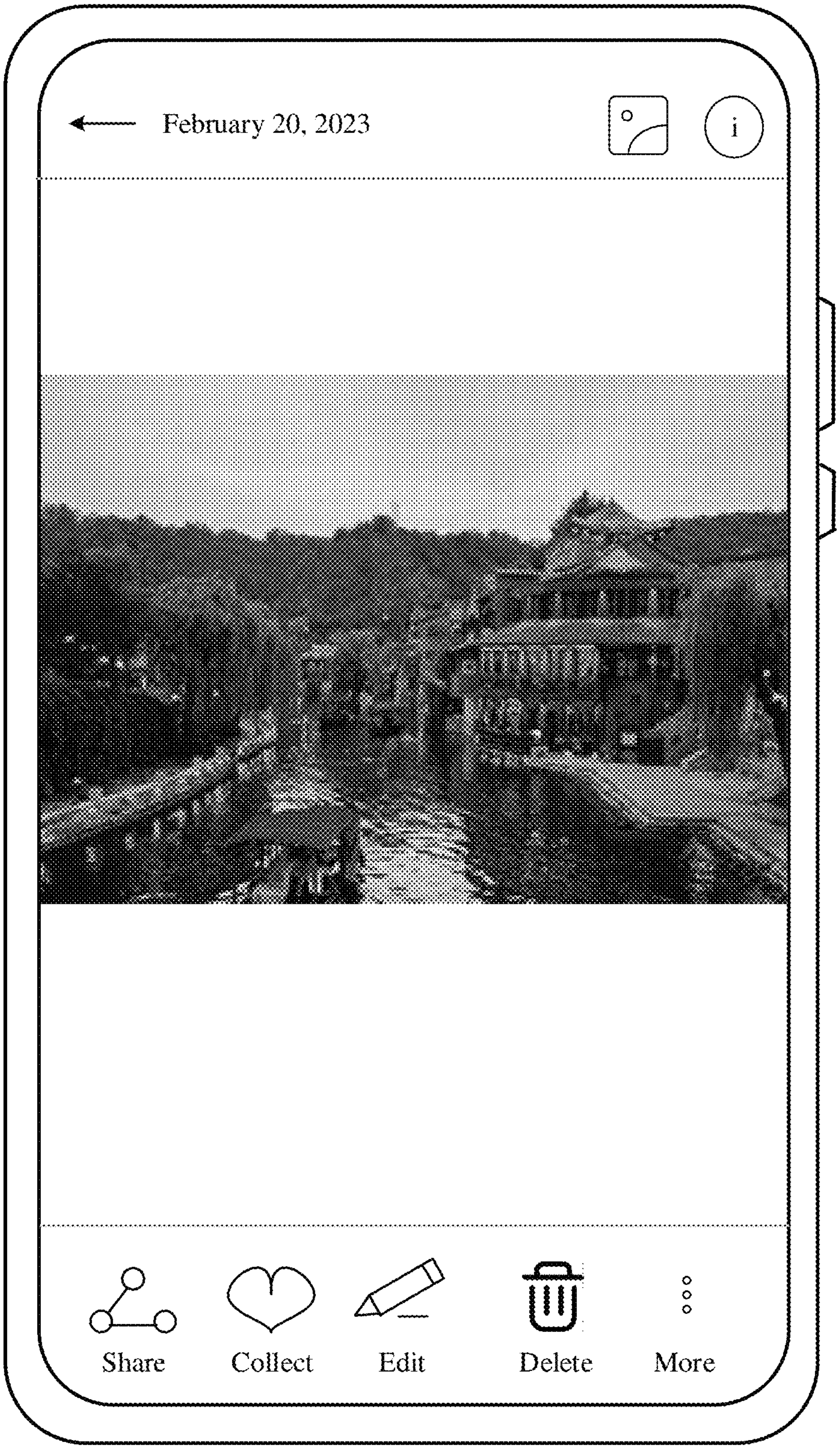
FIG. 27A to FIG. 27D are a schematic diagram of another graphical user interface according to an embodiment of this application.
Figure 27B:
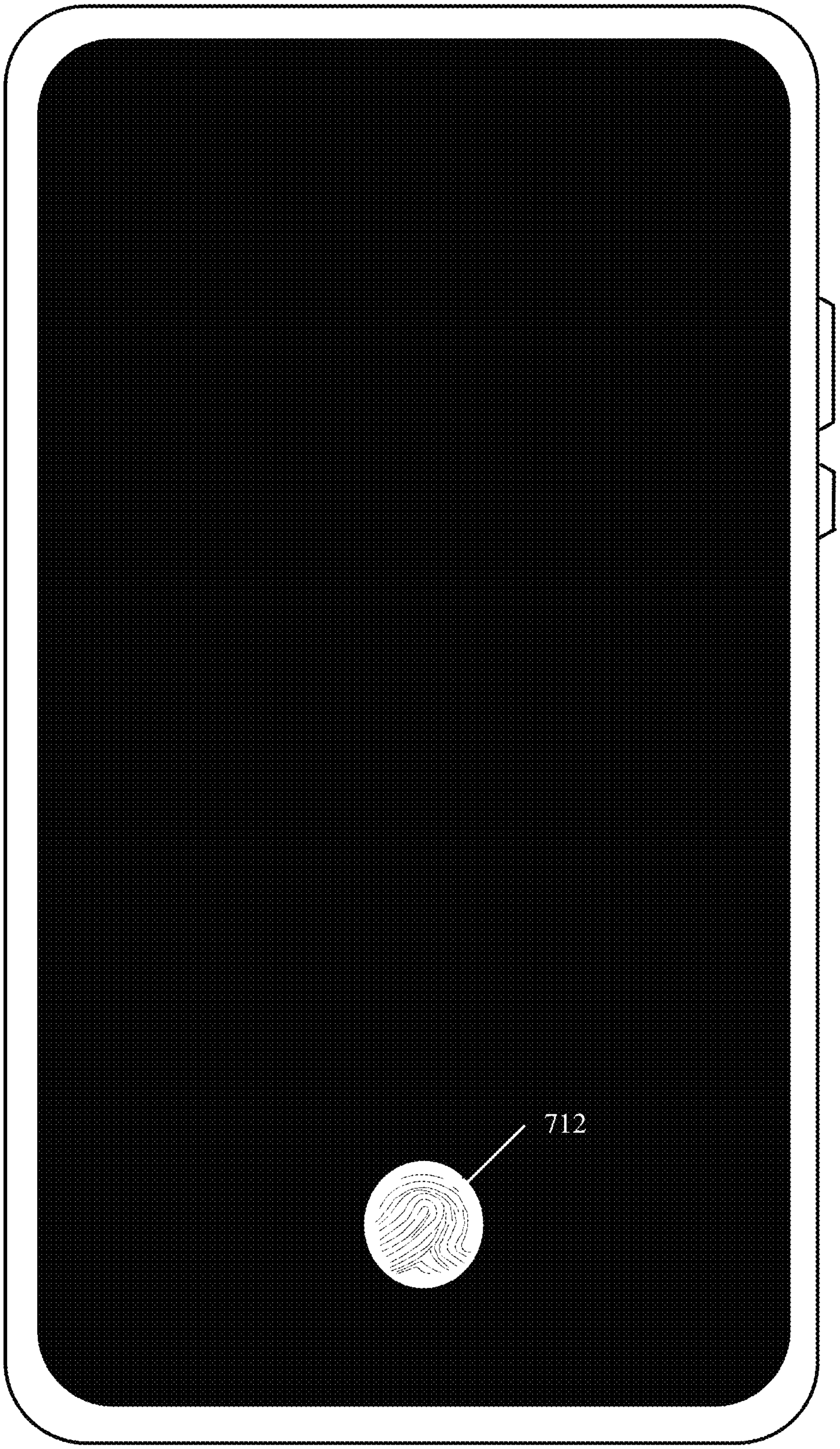
Figure 27C:
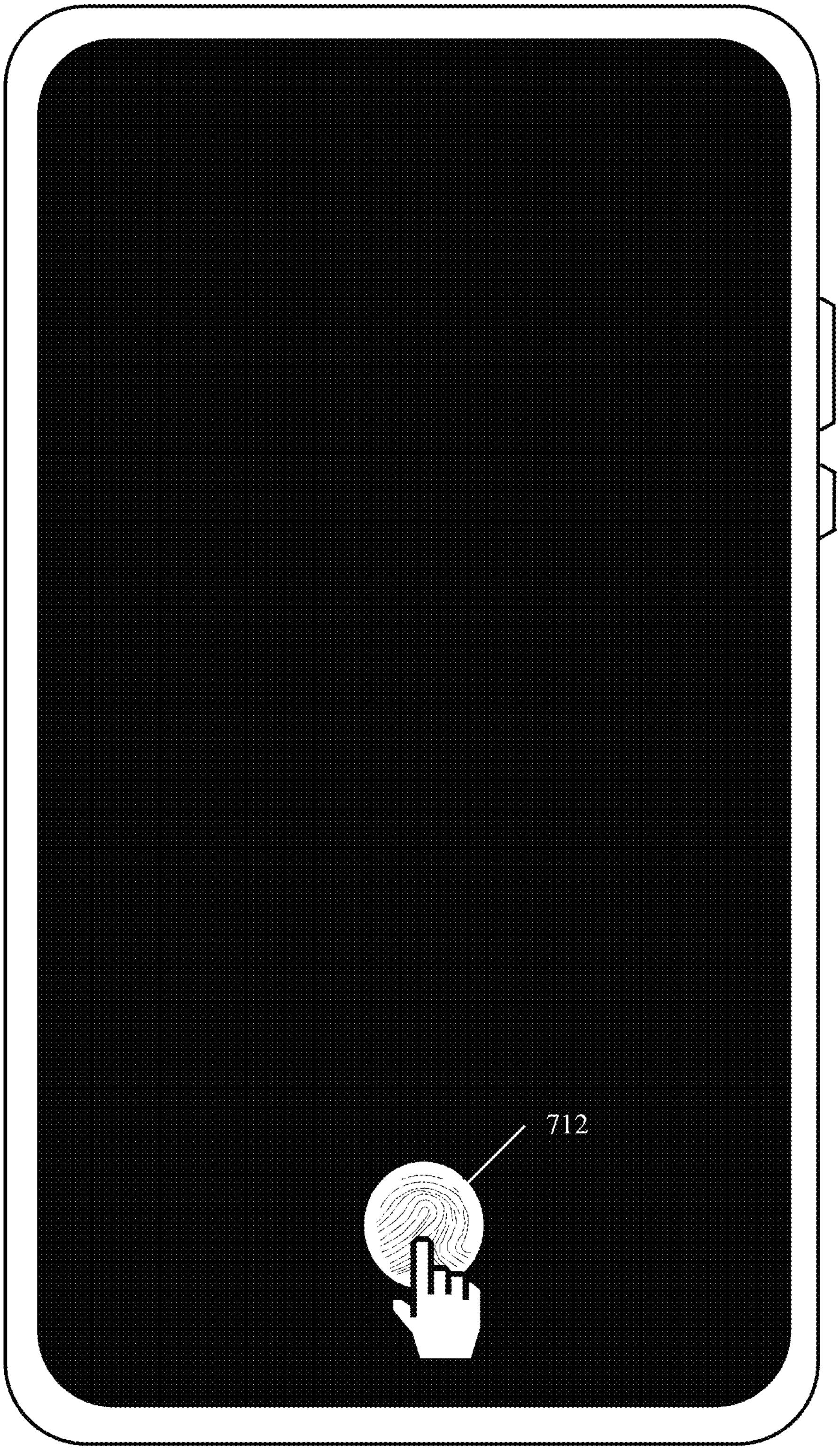
Figure 27D:
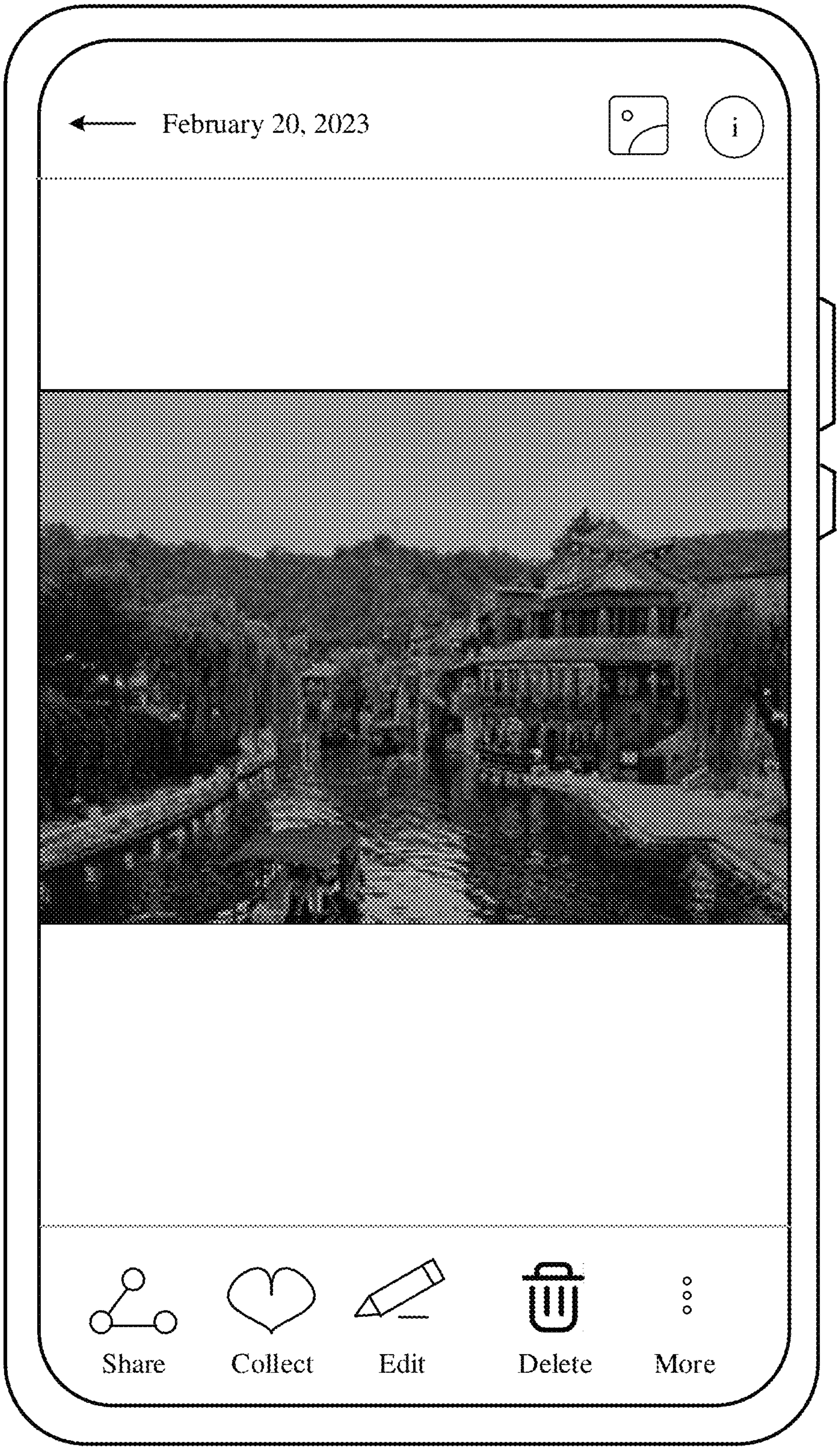

For example, the electronic device adjusts brightness of the display screen to the target brightness, and displays the image on which tone mapping processing is performed, as shown in FIG. 27A. During the preset time period, if the electronic device does not detect an operation, the electronic device is in a screen-off display interface. The screen-off display interface includes a fingerprint unlocking control 712, as shown in FIG. 27B. In this case, the electronic device releases the image on which tone mapping processing is performed. The electronic device detects a tap operation performed on the fingerprint unlocking control 712, as shown in FIG. 27C. After the electronic device detects the tap operation performed on the fingerprint unlocking control 712, the electronic device regenerates the image on which tone mapping processing is performed, adjusts the brightness of the display screen to the target brightness value, and displays the image on which tone mapping processing is performed. In the process of displaying the image on which tone mapping processing is performed, the electronic device may first display an image on which tone mapping processing is not performed, as shown in FIG. 27D. After a few milliseconds, the electronic device displays the image on which tone mapping processing is performed, as shown in FIG. 27A.

Optionally, the electronic device may display, in a jump display manner, the image on which tone mapping processing is not performed and the image on which the tone mapping processing is performed. That is, the electronic device displays, at the first millisecond, the image on which tone mapping processing is not performed. The electronic device directly displays, at the second millisecond in a jump display manner, the image on which tone mapping processing is performed. The user may not perceive the display change process from the image on which tone mapping processing is not performed and the image on which tone mapping processing is performed.

Optionally, the electronic device displays, in a slow variation display manner, the image on which tone mapping processing is not performed and the image on which the tone mapping processing is performed. That is, the electronic device may display, at the first millisecond, the image on which tone mapping processing is not performed. The electronic device directly displays, at the second millisecond in a slow variation display manner, the image on which tone mapping processing is performed. The user may perceive the display change process from the image on which tone mapping processing is not performed and the image on which tone mapping processing is performed.

Optionally, in an implementation, after the electronic device detects the tap operation performed on the fingerprint unlocking control 712, the electronic device may further directly display the display interface as shown in FIG. 27A.

It should be noted that the foregoing describes the display interface in an electronic device by using examples. This is not limited in this application.

It should be understood that the foregoing example is merely intended to help a person skilled in the art to understand embodiments of this application, and is not intended to limit embodiments of this application to specific values or specific scenarios in the example. Obviously, a person skilled in the art may make various equivalent modifications or variations according to the given example. The modifications or variations also fall within the scope of embodiments of this application.

Figure 28:
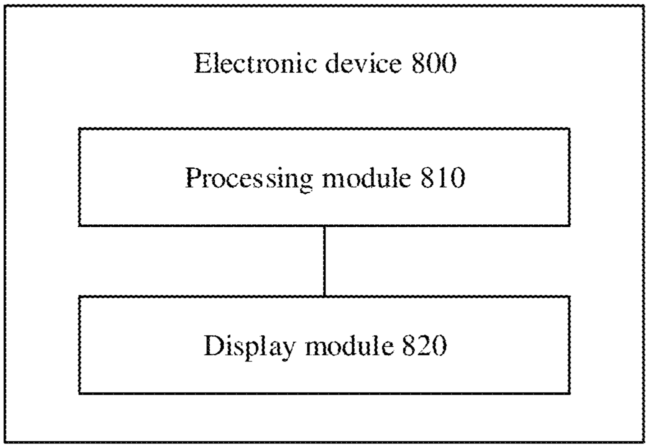
FIG. 28 is a schematic diagram of a structure of an electronic device according to an embodiment of this application.
Figure 29:
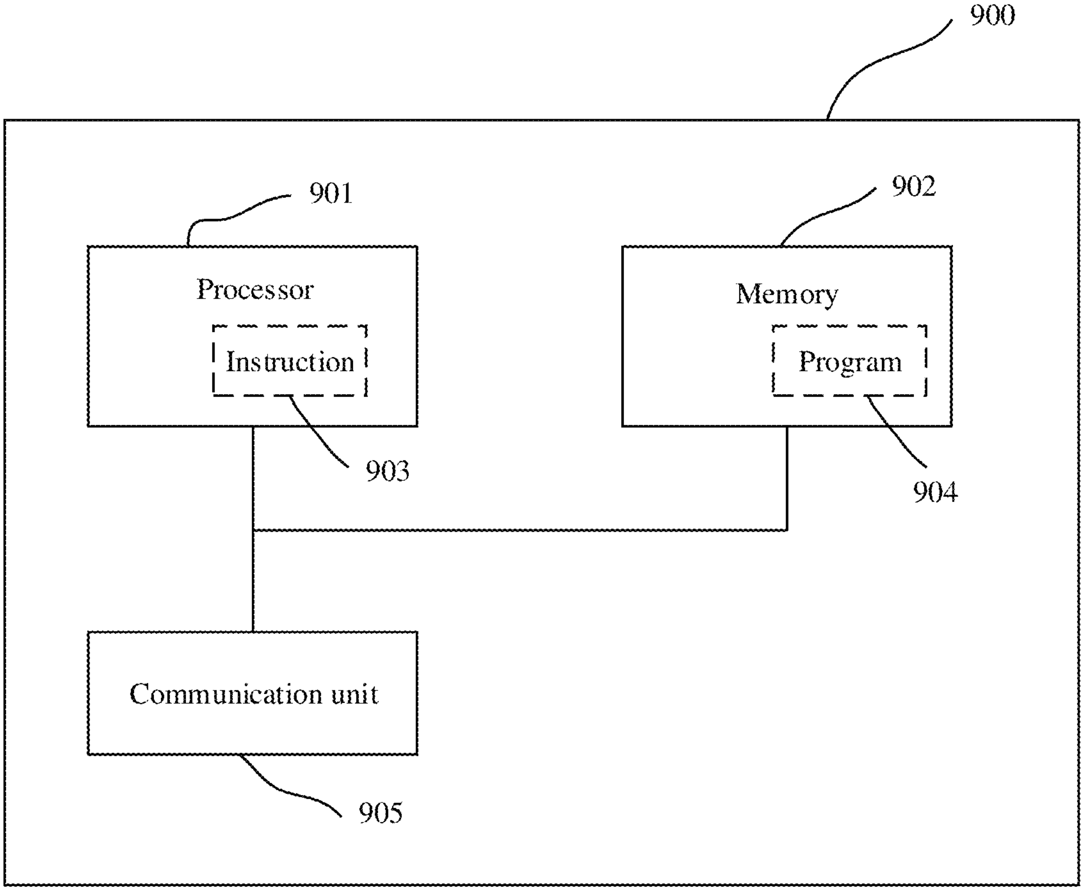
FIG. 29 is a schematic diagram of a structure of an electronic device according to an embodiment of this application.

The foregoing describes the image processing method in embodiments of this application in detail with reference to FIG. 1 to FIG. 27A to FIG. 27D, and the following describes an apparatus embodiment of this application in detail with reference to FIG. 28 to FIG. 29. It should be understood that an apparatus in this embodiment of this application may perform various methods in the foregoing embodiments of this application. That is, for specific work processes of the following various products, refer to corresponding processes in the foregoing method embodiments.

FIG. 28 is a schematic structural diagram of an electronic device according to an embodiment of this application. The electronic device 800 includes a processing module 810 and a display module 820.

The processing module 810 is configured to capture a to-be-displayed image; detect a display operation performed on the to-be-displayed image; obtain brightness channel data of the to-be-displayed image in response to the display operation; obtain a brightness value of a pixel in the to-be-displayed image based on the brightness channel data of the to-be-displayed image; determine a target brightness value based on a current brightness value of the display screen and a first brightness value, where the first brightness value indicates brightness that is supported by the display screen;

select a first gain coefficient or a second gain coefficient based on the brightness value of the pixel in the to-be-displayed image to process the pixel in the to-be-displayed image, and generate a processed image, where the first gain coefficient is configured to adjust a pixel that is in the to-be-displayed image and whose brightness value is less than a pixel of a first threshold, the second gain coefficient is configured to adjust a pixel that is in the to-be-displayed image and whose brightness value is greater than or equal to the pixel of the first threshold, the first threshold is related to brightness of a photographing scenario in which the electronic device is located, the first gain coefficient is 1, the second gain coefficient is linearly directly proportional to the brightness value of the pixel in the to-be-displayed image, and the second gain coefficient is greater than 1. The display module 820 is configured to: adjust the display screen to the target brightness value, and display the processed image.

Optionally, in an embodiment, if the to-be-displayed image is an image captured by the electronic device, the processing module 810 is specifically configured to:

obtain an inverse gamma curve of the to-be-displayed image;

process the brightness channel data of the to-be-displayed image based on the inverse gamma curve, to obtain processed brightness data; and process the processed brightness data based on a second coefficient, to obtain the brightness value of the pixel in the to-be-displayed image, where the second coefficient is directly proportional to a dynamic range value of the to-be-displayed image.

Optionally, in an embodiment, if the to-be-displayed image is an image downloaded or received by the electronic device, the processing module 810 is specifically configured to:

obtain a first parameter based on color space in which the to-be-displayed image is located, where the first parameter is an index of a gamma curve;

obtain an inverse gamma curve of the to-be-displayed image based on the first parameter;

process the brightness channel data of the to-be-displayed image based on the inverse gamma curve, to obtain processed brightness data; and process the processed brightness data based on a second coefficient, to obtain the brightness value of the pixel in the to-be-displayed image, where the second coefficient is directly proportional to a dynamic range value of the to-be-displayed image.

Optionally, in an embodiment, the processing module 810 is specifically configured to:

perform compression processing on a pixel value of the pixel in the to-be-displayed image based on a first coefficient, to obtain a second image, where the first coefficient is a ratio of the current brightness value to the target brightness value;

if the brightness value of the pixel in the to-be-displayed image is less than the first threshold, adjust a pixel value of a pixel in the second image based on the first gain coefficient; or if the brightness value of the pixel in the to-be-displayed image is greater than or equal to the first threshold, adjust a pixel value of a pixel in the second image based on the second gain coefficient; and generate the processed image.

Optionally, in an embodiment, the processing module 810 is further configured to:

determine a gain function based on the first threshold and the first brightness value, where the gain function is a directly proportional function; and determine the second gain coefficient based on the brightness value of the pixel in the to-be-displayed image and the gain function.

Optionally, in an embodiment, the gain function is $G(x)=(K1-1)/(K2-V1)*(V-V1)+1$, where K1 represents a third gain value, and the third gain value is directly proportional to the dynamic range value of the to-be-displayed image; K2 represents a maximum value of a pixel value corresponding to a number of bits of the to-be-displayed image; V represents the brightness value of the pixel in the to-be-displayed image; and V1 represents the first threshold.

Optionally, in an embodiment, the processing module 810 is specifically configured to:

if the brightness value of the pixel in the to-be-displayed image is less than the first threshold, adjust the pixel value of the pixel in the to-be-displayed image based on the first gain coefficient; or if the brightness value of the pixel in the to-be-displayed image is greater than or equal to the first threshold, adjust the pixel value of the pixel in the to-be-displayed image based on the second gain coefficient; and generate the processed image.

Optionally, in an embodiment, after the displaying the processed image, the processing module 810 is further configured to:

if a first operation performed on the electronic device is detected, adjust brightness of the display screen to the current brightness value, where the first operation is an operation to exit displaying of the to-be-displayed image.

Optionally, in an embodiment, after the displaying the processed image, the processing module 810 is further configured to:

if detecting that the electronic device is in a screen-off state, or if detecting that the current brightness value is less than a second threshold, delete the processed image.

Optionally, in an embodiment, the processing module 810 is further configured to:

if detecting a second operation or a third operation performed on the display screen, generate the processed image, where the second operation is an unlocking operation performed on the electronic device, and the third operation is a screen-on operation performed on the display screen; and adjust the display screen to the target brightness value, and display the processed image.

It should be noted that the electronic device 800 is embodied in a form of a functional module. The term "module" may be implemented through the form of software and/or hardware, which is not specifically limited.

For example, the "module" may be a software program, a hardware circuit, or a combination thereof that implements the foregoing functions. The hardware circuit may include an application specific integrated circuit (application specific integrated circuit, ASIC), an electronic circuit, a processor (for example, a shared processor, a dedicated processor, or a packet processor) configured to execute one or more software or firmware programs and a memory, a combined logic circuit, and/or another appropriate component that supports the described functions.

Therefore, the units in the examples described in embodiments of this application can be implemented by using electronic hardware, or a combination of computer software and electronic hardware. Whether a function is performed by hardware or by software depends on particular applications and design constraints of the technical solutions. A skilled person may use different methods for particular applications to implement the described functions, but this implementation should not be considered as beyond the scope of this application.

FIG. 29 is a schematic diagram of a structure of an electronic device according to this application. A dashed line in FIG. 29 indicates that the unit or the module is optional. An electronic device 900 may be configured to implement the image processing method described in the foregoing method embodiments.

For example, the electronic device 900 includes one or more processors 901, and the one or more processors 901 support the electronic device 900 to implement the image processing method in the method embodiments. The processor 901 may be a general-purpose processor or a dedicated purpose processor. For example, the processor 901 may be a central processing unit (central processing unit, CPU), a digital signal processor (digital signal processor, DSP), an application specific integrated circuit (application specific integrated circuit, ASIC), a field programmable gate array (field programmable gate array, FPGA), or another programmable logic device, such as a discrete gate, a transistor logic device, or a discrete hardware component.

Optionally, the processor 901 may be configured to: control the electronic device 900, execute a software program, and process data of the software program. The electronic device 900 may further include a communication unit 905 configured to implement input (receiving) and output (transmitting) of a signal.

For example, the electronic device 900 may be a chip, and the communication unit 905 may be an input and/or output circuit of the chip, or the communication unit 905 may be a communication interface of the chip, and the chip may be used as a component of a terminal device or another electronic device.

For another example, the electronic device 900 may be a terminal device, and the communication unit 905 may be a transceiver of the terminal device, or the communication unit 905 may in the 900 may include one or more memories 902 that store a program 904. The program 904 may be run by the processor 901 to generate an instruction 903, so that the processor 901 performs, based on the instruction 903, the image processing method described in the foregoing method embodiments.

Optionally, the memory 902 may further store data.

Optionally, the processor 901 may further read the data stored in the memory 902. The data and the program 904 may be stored at a same storage address, or the data and the program 904 may be stored at different storage addresses.

Optionally, the processor 901 and the memory 902 may be disposed separately or integrated together, for example, integrated on a system on chip (system on chip, SOC) of the terminal device.

For example, the memory 902 may be configured to store a program 904 related to the image processing method provided in embodiments of this application. The processor 901 may be configured to: when the image processing method is performed, invoke the program 904 related to the image processing method stored in the memory 902 to perform the image processing method provided in embodiments of this application, for example, capture a to-be-displayed image; detect a display operation performed on the to-be-displayed image; obtain brightness channel data of the to-be-displayed image in response to the display operation; obtain a brightness value of a pixel in the to-be-displayed image based on the brightness channel data of the to-be-displayed image; determine a target brightness value based on a current brightness value of the display screen and a first brightness value, where the first brightness value indicates brightness that is supported by the display screen; select a first gain coefficient or a second gain coefficient based on the brightness value of the pixel in the to-be-displayed image to process the pixel in the to-be-displayed image, and generate a processed image, where the first gain coefficient is configured to adjust a pixel that is in the to-be-displayed image and whose brightness value is less than a pixel of a first threshold, the second gain coefficient is configured to adjust a pixel that is in the to-be-displayed image and whose brightness value is greater than or equal to the pixel of the first threshold, the first threshold is related to brightness of a photographing scenario in which the electronic device is located, the first gain coefficient is 1, the second gain coefficient is linearly directly proportional to the brightness value of the pixel in the to-be-displayed image, and the second gain coefficient is greater than 1; and adjust the display screen to the target brightness value, and display the processed image.

Optionally, this application further provides a computer program product. When the computer program product is executed by the processor 901, the image processing method according to any method embodiment of this application is implemented.

For example, the computer program product may be stored in the memory 902, and may be, for example, the program 904. The program 904 undergoes processing processes such as preprocessing, compiling, assembling, and linking, to be finally converted into an executable target file that may be executed by the processor 901.

Optionally, this application further provides a computer-readable storage medium, having a computer program stored thereon. When the computer program is executed by a computer, the image processing method according to any method embodiment of this application is implemented. The computer program may be an advanced language program, or may be an executable target program.

For example, the computer-readable storage medium is, for example, the memory 902. The memory 902 may be a volatile memory or a non-volatile memory, or, the memory 902 may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Based on description used as an example instead of a limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A person of ordinary skill in the art may notice that the exemplary units and algorithm steps described with reference to embodiments disclosed in this specification can be implemented in electronic hardware, or a combination of computer software and electronic hardware. Whether a function is performed by hardware or by software depends on particular applications and design constraints of the technical solutions. A skilled person may use different methods for particular applications to implement the described functions, but this implementation should not be considered as beyond the scope of this application.

A person skilled in the art can clearly understand that for convenience and conciseness of description, the specific working processes of the above-described systems, apparatuses, and units can be understood with reference to the corresponding processes in the above-described method embodiments and will not be repeated here.

In the several embodiments provided in this application, it should be understood that the disclosed system, apparatus, and method may be implemented in other manners. For example, the described embodiment of the electronic device is merely an example. For example, the module division is merely logical function division and may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

It should be understood that sequence numbers of the processes in embodiments of this application do not mean execution sequences. The execution sequences of the processes should be determined based on functions and internal logic of the processes, and should not be construed as any limitation on the implementation processes of embodiments of this application.

In addition, the term "and/or" in this specification is merely an association relationship for describing associated objects, and indicates that three relationships may exist. For example, "A and/or B" may indicate the following three cases: Only A exists, both A and B exist, and only B exists. In addition, the character "/" in this specification usually indicates an "or" relationship between the associated objects.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes various media that may store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in and familiar with the technical field within the technical scope disclosed in this application shall fall within the protection scope of this application. Therefore, the protection scope of this application is subject to the protection scope of the claims. To sum up, the above descriptions are merely embodiments of the technical solutions of this application, and are not intended to limit the protection scope of this application. Any modification, equivalent replacement, or improvement made without departing from the spirit and principle of this application shall fall within the protection scope of this application.

What is claimed is:

1. An image processing method, applied to an electronic device, wherein the electronic device comprises a display screen, and the image processing method comprises:

capturing a to-be-displayed image;

detecting a display operation performed on the to-be-displayed image; obtaining brightness channel data of the to-be-displayed image in response to the display operation;

obtaining a brightness value of a pixel in the to-be-displayed image based on the brightness channel data of the to-be-displayed image;

determining a target brightness value based on a current brightness value of the display screen and a first brightness value, wherein the first brightness value indicates brightness that is supported by the display screen;

selecting a first gain coefficient or a second gain coefficient based on the brightness value of the pixel in the to-be-displayed image to process the pixel in the to-be-displayed image, and generating a processed image, wherein the first gain coefficient is configured to adjust a pixel that is in the to-be-displayed image and whose brightness value is less than a first threshold, the second gain coefficient is configured to adjust a pixel that is in the to-be-displayed image and whose brightness value is greater than or equal to the first threshold, the first threshold is related to brightness of a photographing scenario in which the electronic device is located, the first gain coefficient is 1, the second gain coefficient is linearly directly proportional to the brightness value of the pixel in the to-be-displayed image, and the second gain coefficient is greater than 1; and adjusting brightness of the display screen to the target brightness value, and displaying the processed image.

2. The image processing method according to claim 1, wherein when the to-be-displayed image is an image captured by the electronic device, the obtaining the brightness value of the pixel in the to-be-displayed image based on the brightness channel data of the to-be-displayed image comprises:

obtaining an inverse gamma curve of the to-be-displayed image;

processing the brightness channel data of the to-be-displayed image based on the inverse gamma curve, to obtain processed brightness data; and processing the processed brightness data based on a second coefficient, to obtain the brightness value of the pixel in the to-be-displayed image, wherein the second coefficient is directly proportional to a dynamic range value of the to-be-displayed image.

3. The image processing method according to claim 1, wherein when the to-be-displayed image is an image downloaded or received by the electronic device, the obtaining the brightness value of the pixel in the to-be-displayed image based on the brightness channel data of the to-be-displayed image comprises:

obtaining a first parameter based on color space in which the to-be-displayed image is located, wherein the first parameter is an index of a gamma curve;

obtaining an inverse gamma curve of the to-be-displayed image based on the first parameter;

processing the brightness channel data of the to-be-displayed image based on the inverse gamma curve, to obtain processed brightness data; and processing the processed brightness data based on a second coefficient, to obtain the brightness value of the pixel in the to-be-displayed image, wherein the second coefficient is directly proportional to a dynamic range value of the to-be-displayed image.

4. The image processing method according to claim 1, wherein the selecting the first gain coefficient or the second gain coefficient based on the brightness value of the pixel in the to-be-displayed image to process the pixel in the to-be-displayed image, and the generating the processed image comprises:

performing compression processing on a pixel value of the pixel in the to-be-displayed image based on a first coefficient, to obtain a second image, wherein the first coefficient is a ratio of the current brightness value to the target brightness value;

when the brightness value of the pixel in the to-be-displayed image is less than the first threshold, adjusting the pixel value of the pixel in the second image based on the first gain coefficient; or when the brightness value of the pixel in the to-be-displayed image is greater than or equal to the first threshold, adjusting the pixel value of the pixel in the second image based on the second gain coefficient; and generating the processed image.

5. The image processing method according to claim 1, further comprising:

determining a gain function based on the first threshold and a dynamic range value of the to-be-displayed image, wherein the gain function is a directly proportional function; and determining the second gain coefficient based on the brightness value of the pixel in the to-be-displayed image and the gain function.

6. The image processing method according to claim 5, wherein the gain function is $G(x)=(K1-1)/(K2-V1)*(V-V1)+1$, wherein K1 represents a third gain value, and the third gain value is directly proportional to the dynamic range of the to-be-displayed image; K2 represents a maximum value of a pixel value corresponding to a number of bits of the to-be-displayed image; V represents the brightness value of the pixel in the to-be-displayed image; and V1 represents the first threshold.

7. The image processing method according to claim 1, wherein the selecting the first gain coefficient or the second gain coefficient based on the brightness value of the pixel in the to-be-displayed image to process the pixel in the to-be-displayed image, and the generating the processed image comprises:

when the brightness value of the pixel in the to-be-displayed image is less than the first threshold, adjusting the pixel value of the pixel in the to-be-displayed image based on the first gain coefficient; or when the brightness value of the pixel in the to-be-displayed image is greater than or equal to the first threshold, adjusting the pixel value of the pixel in the to-be-displayed image based on the second gain coefficient; and generating the processed image.

8. The image processing method according to claim 1, wherein after the displaying the processed image, the method further comprises:

when a first operation performed on the electronic device is detected, adjusting the brightness of the display screen to the current brightness value, wherein the first operation is an operation to exit displaying of the to-be-displayed image.

9. The image processing method according to claim 1, wherein after the displaying the processed image, the method further comprises:

when detecting that the electronic device is in a screen-off state, or when detecting that the current brightness value is less than a second threshold, deleting the processed image.

10. The image processing method according to claim 9, further comprising:

when detecting a second operation or a third operation performed on the display screen, generating the processed image, wherein the second operation is an unlocking operation performed on the electronic device, and the third operation is a screen-on operation performed on the display screen; and adjusting the brightness of the display screen to the target brightness value, and displaying the processed image.

11. An electronic device, comprising:

a display screen, one or more processors and a memory, wherein the memory is coupled to the one or more processors, the memory is configured to store computer program code, the computer program code comprises computer instructions, and the one or more processors invoke the computer instructions, to enable the one or more processors to perform the following operations:

capturing a to-be-displayed image;

detecting a display operation performed on the to-be-displayed image;

obtaining brightness channel data of the to-be-displayed image in response to the display operation;

obtaining a brightness value of a pixel in the to-be-displayed image based on the brightness channel data of the to-be-displayed image;

determining a target brightness value based on a current brightness value of the display screen and a first brightness value, wherein the first brightness value indicates brightness that is supported by the display screen;

selecting a first gain coefficient or a second gain coefficient based on the brightness value of the pixel in the to-be-displayed image to process the pixel in the to-be-displayed image, and generating a processed image, wherein the first gain coefficient is configured to adjust a pixel that is in the to-be-displayed image and whose brightness value is less than a first threshold, the second gain coefficient is configured to adjust a pixel that is in the to-be-displayed image and whose brightness value is greater than or equal to the first threshold, the first threshold is related to brightness of a photographing scenario in which the electronic device is located, the first gain coefficient is 1, the second gain coefficient is linearly directly proportional to the brightness value of the pixel in the to-be-displayed image, and the second gain coefficient is greater than 1; and adjusting brightness of the display screen to the target brightness value, and displaying the processed image.

12. The electronic device according to claim 11, wherein when the to-be-displayed image is an image captured by the electronic device, the obtaining the brightness value of the pixel in the to-be-displayed image based on the brightness channel data of the to-be-displayed image comprises:

obtaining an inverse gamma curve of the to-be-displayed image; processing the brightness channel data of the to-be-displayed image based on the inverse gamma curve, to obtain processed brightness data; and processing the processed brightness data based on a second coefficient, to obtain the brightness value of the pixel in the to-be-displayed image, wherein the second coefficient is directly proportional to a dynamic range value of the to-be-displayed image.

13. The electronic device according to claim 11, wherein when the to-be-displayed image is an image downloaded or received by the electronic device, the obtaining the brightness value of the pixel in the to-be-displayed image based on the brightness channel data of the to-be-displayed image comprises:

obtaining a first parameter based on color space in which the to-be-displayed image is located, wherein the first parameter is an index of a gamma curve;

obtaining an inverse gamma curve of the to-be-displayed image based on the first parameter;

processing the brightness channel data of the to-be-displayed image based on the inverse gamma curve, to obtain processed brightness data; and processing the processed brightness data based on a second coefficient, to obtain the brightness value of the pixel in the to-be-displayed image, wherein the second coefficient is directly proportional to a dynamic range value of the to-be-displayed image.

14. The electronic device according to claim 11, wherein the selecting the first gain coefficient or the second gain coefficient based on the brightness value of the pixel in the to-be-displayed image to process the pixel in the to-be-displayed image, and the generating the processed image comprises:

performing compression processing on a pixel value of the pixel in the to-be-displayed image based on a first coefficient, to obtain a second image, wherein the first coefficient is a ratio of the current brightness value to the target brightness value;

when the brightness value of the pixel in the to-be-displayed image is less than the first threshold, adjusting the pixel value of the pixel in the second image based on the first gain coefficient; or when the brightness value of the pixel in the to-be-displayed image is greater than or equal to the first threshold, adjusting the pixel value of the pixel in the second image based on the second gain coefficient; and generating the processed image.

15. The electronic device according to claim 11, further comprising:

determining a gain function based on the first threshold and a dynamic range value of the to-be-displayed image, wherein the gain function is a directly proportional function; and determining the second gain coefficient based on the brightness value of the pixel in the to-be-displayed image and the gain function.

16. The electronic device according to claim 15, wherein the gain function is $G(x)=(K1-1)/(K2-V1)*(V-V1)+1$, wherein K1 represents a third gain value, and the third gain value is directly proportional to the dynamic range of the to-be-displayed image; K2 represents a maximum value of a pixel value corresponding to a number of bits of the to-be-displayed image; V represents the brightness value of the pixel in the to-be-displayed image; and Vi represents the first threshold.

17. The electronic device according to claim 11, wherein the selecting the first gain coefficient or the second gain coefficient based on the brightness value of the pixel in the to-be-displayed image to process the pixel in the to-be-displayed image, and the generating the processed image comprises:

when the brightness value of the pixel in the to-be-displayed image is less than the first threshold, adjusting the pixel value of the pixel in the to-be-displayed image based on the first gain coefficient; or when the brightness value of the pixel in the to-be-displayed image is greater than or equal to the first threshold, adjusting the pixel value of the pixel in the to-be-displayed image based on the second gain coefficient; and generating the processed image.

18. The electronic device according to claim 11, wherein after the displaying the processed image, the method further comprises:

when a first operation performed on the electronic device is detected, adjusting the brightness of the display screen to the current brightness value, wherein the first operation is an operation to exit displaying of the to-be-displayed image.

19. The electronic device according to claim 11, wherein after the displaying the processed image, the method further comprises:

when detecting that the electronic device is in a screen-off state, or when detecting that the current brightness value is less than a second threshold, deleting the processed image.

20. A non-transitory computer-readable storage medium, wherein the non-transitory computer-readable storage medium stores a computer program; and when the computer program is executed by a processor, the processor is enabled to perform the following operations:

capturing a to-be-displayed image;

detecting a display operation performed on the to-be-displayed image;

obtaining brightness channel data of the to-be-displayed image in response to the display operation; obtaining a brightness value of a pixel in the to-be-displayed image based on the brightness channel data of the to-be-displayed image;

determining a target brightness value based on a current brightness value of a display screen of an electronic device and a first brightness value, wherein the first brightness value indicates brightness that is supported by the display screen;

selecting a first gain coefficient or a second gain coefficient based on the brightness value of the pixel in the to-be-displayed image to process the pixel in the to-be-displayed image, and generating a processed image, wherein the first gain coefficient is configured to adjust a pixel that is in the to-be-displayed image and whose brightness value is less than a first threshold, the second gain coefficient is configured to adjust a pixel that is in the to-be-displayed image and whose brightness value is greater than or equal to the first threshold, the first threshold is related to brightness of a photographing scenario in which the electronic device is located, the first gain coefficient is 1, the second gain coefficient is linearly directly proportional to the brightness value of the pixel in the to-be-displayed image, and the second gain coefficient is greater than 1; and adjusting brightness of the display screen to the target brightness value, and displaying the processed image.

* * * * *